United States Patent [19]

Recalde

[11] Patent Number: 5,533,834

[45] Date of Patent: Jul. 9, 1996

[54] PIPELAY STINGER

[75] Inventor: Carlos E. Recalde, Irvine, Calif.

[73] Assignee: Stena Offshore Limited, Westhill, United Kingdom

[21] Appl. No.: 211,249

[22] PCT Filed: Sep. 22, 1992

[86] PCT No.: PCT/GB92/01742

§ 371 Date: Jul. 22, 1994

§ 102(e) Date: Jul. 22, 1994

[87] PCT Pub. No.: WO95/06401

PCT Pub. Date: Apr. 1, 1993

[30] Foreign Application Priority Data

Sep. 25, 1991 [GB] United Kingdom ............... 9120432

[51] Int. Cl.[6] .................... F16L 1/04; B63B 35/04
[52] U.S. Cl. ................ 405/168.3; 405/166; 405/168.1
[58] Field of Search .................... 405/158, 166, 405/167, 168.1, 168.3, 168.4

[56] References Cited

U.S. PATENT DOCUMENTS

| | | | |
|---|---|---|---|
| H 945 | 8/1991 | Taliaferro et al. ............... 285/354 |
| 3,237,438 | 3/1966 | Tesson . | |
| 3,372,461 | 3/1968 | Tesson . | |
| 3,608,321 | 9/1971 | Richardson, Jr. et al. . | |
| 3,630,461 | 12/1971 | Suganti et al. . | |
| 3,641,778 | 2/1972 | Gibson .................. 405/168.3 X |
| 3,680,342 | 8/1972 | Mott et al. . | |
| 3,712,100 | 1/1973 | Key et al. . | |
| 3,747,356 | 7/1973 | Lochridge et al. . | |
| 3,822,559 | 7/1974 | Matthews et al. ............ 405/166 |
| 3,855,835 | 12/1974 | Tisdale, III et al. . | |
| 3,982,402 | 9/1976 | Lang et al. .................... 405/168.3 |
| 4,117,692 | 10/1978 | Oberg ............................ 405/166 |
| 4,157,023 | 6/1979 | Tisdale et al. . | |
| 4,230,421 | 10/1980 | Springett et al. ............. 405/168.3 |
| 4,243,345 | 1/1981 | Cha et al. ..................... 405/168 |
| 4,257,718 | 3/1981 | Rosa et al. .................. 405/166 X |
| 4,260,287 | 4/1981 | Uyeda et al. ..................... 405/168 |
| 4,260,288 | 4/1981 | Ellers et al. .................... 405/168 |
| 4,269,540 | 5/1981 | Uyeda et al. ................. 405/168.3 |
| 4,273,469 | 6/1981 | Lunde ............................. 405/158 |
| 4,274,799 | 6/1981 | Tisdale, III et al. ............. 414/747 |
| 4,297,054 | 10/1981 | Yenzer et al. .................. 405/168 |
| 4,340,322 | 7/1982 | Springett et al. ............... 405/168 |
| 4,345,855 | 8/1982 | Uyeda et al. ................ 405/168.3 |
| 4,687,376 | 8/1987 | Recalde ......................... 405/168 |
| 4,721,410 | 1/1988 | Recalde ......................... 405/166 |
| 4,721,411 | 1/1988 | Recalde ......................... 405/168 |
| 4,723,874 | 2/1988 | Recalde ..................... 405/166 X |
| 4,789,108 | 12/1988 | Recalde ..................... 405/166 X |
| 4,820,082 | 4/1989 | Recalde ......................... 405/168 |
| 4,913,080 | 4/1990 | Kindem et al. ................. 114/258 |
| 4,917,540 | 4/1990 | Recalde ......................... 405/168 |
| 4,961,671 | 10/1990 | Recalde ......................... 405/168 |
| 4,984,934 | 1/1991 | Recalde ..................... 405/166 X |
| 5,011,333 | 4/1991 | Lanan ............................ 405/166 |

FOREIGN PATENT DOCUMENTS

| | | |
|---|---|---|
| 2024176 | 8/1970 | France . |
| 601103 | 4/1948 | United Kingdom . |
| 1602549 | 11/1981 | United Kingdom . |
| 1601730 | 11/1981 | United Kingdom . |
| 2199631 | 7/1988 | United Kingdom . |
| 2224803 | 5/1990 | United Kingdom . |

Primary Examiner—Eric K. Nicholson
Assistant Examiner—John A. Ricci
Attorney, Agent, or Firm—Ratner & Prestia

[57] ABSTRACT

A reel pipelaying vessel includes pipe conditioning apparatus at its stern. The pipe conditioning apparatus includes a radius control device for imparting a substantially uniform curve to the pipe after it is unspooled from the reel, straightening apparatus for imparting a reverse bending force to the pipe opposite to the curvature imparted to the pipe by the reel, and apparatus for guiding the pipe into the water after it emerges from the straightening apparatus. The pipe conditioning apparatus is pivotable about a pivot axis to adjust the pipe entry angle at which the pipe enters the water. A stinger assembly is located at the downstream end of the pipe conditioning apparatus, extending sternwards of the vessel, and arranged to further increase the entry angle of the pipe after it exits the pipe conditioning apparatus. The stinger is curved and is provided with a series of pipe supporting rollers or pipe supporting endless conveyors apparatus.

36 Claims, 21 Drawing Sheets

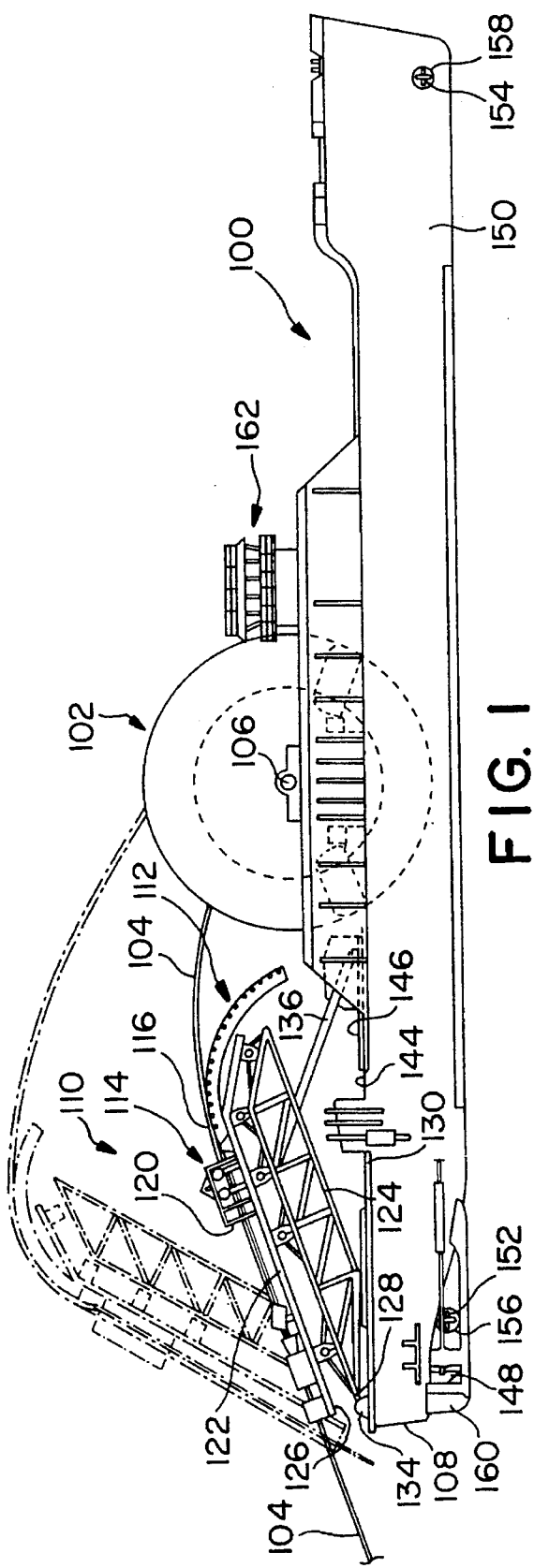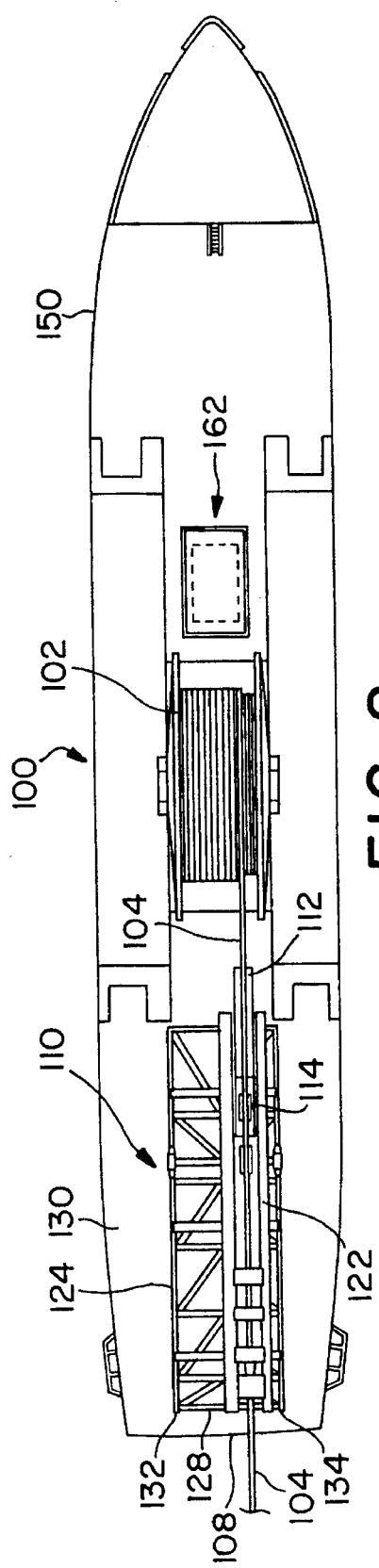

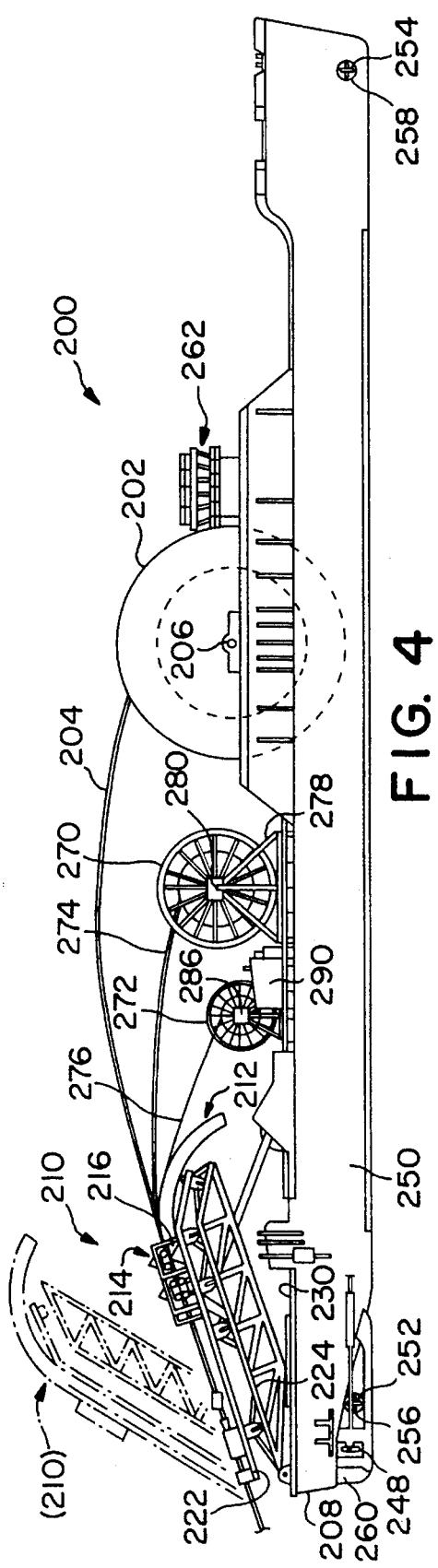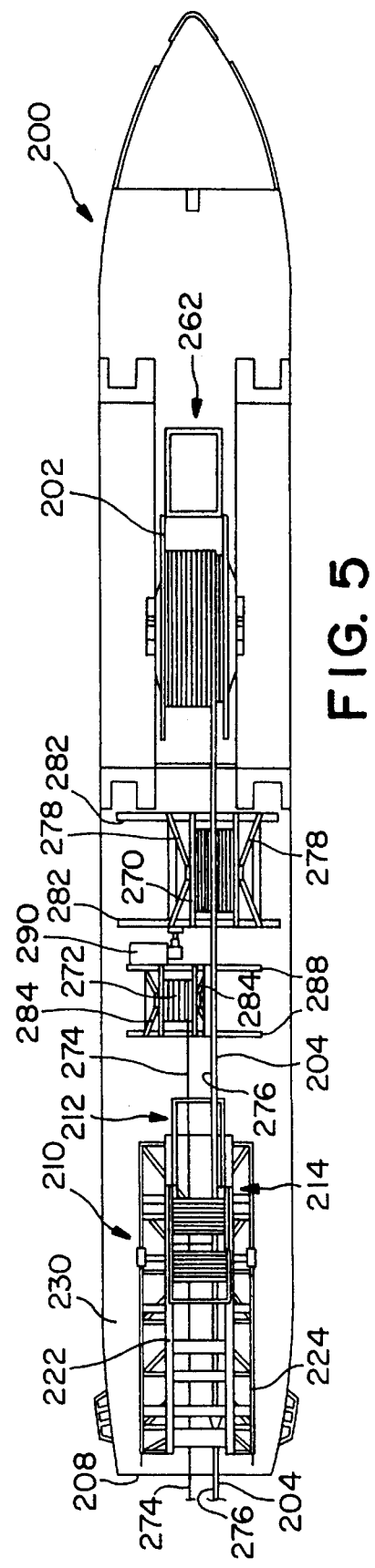

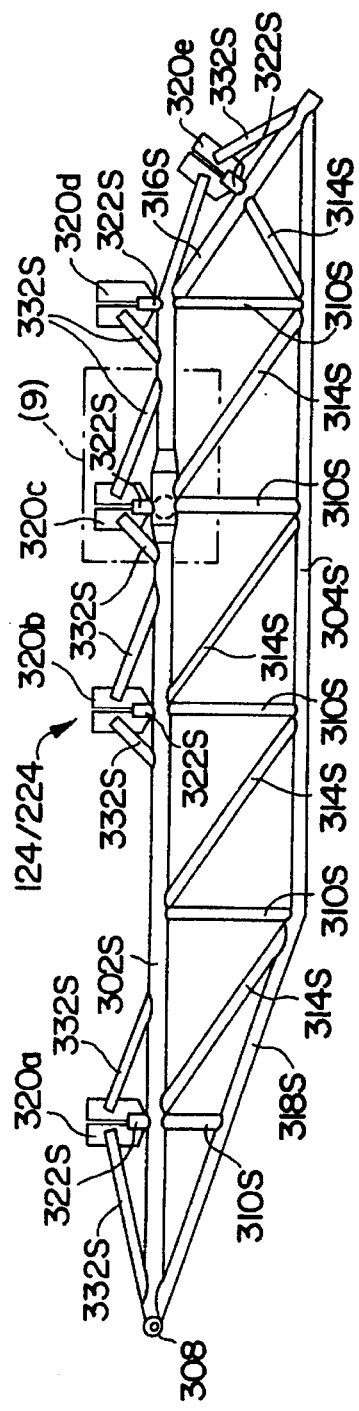
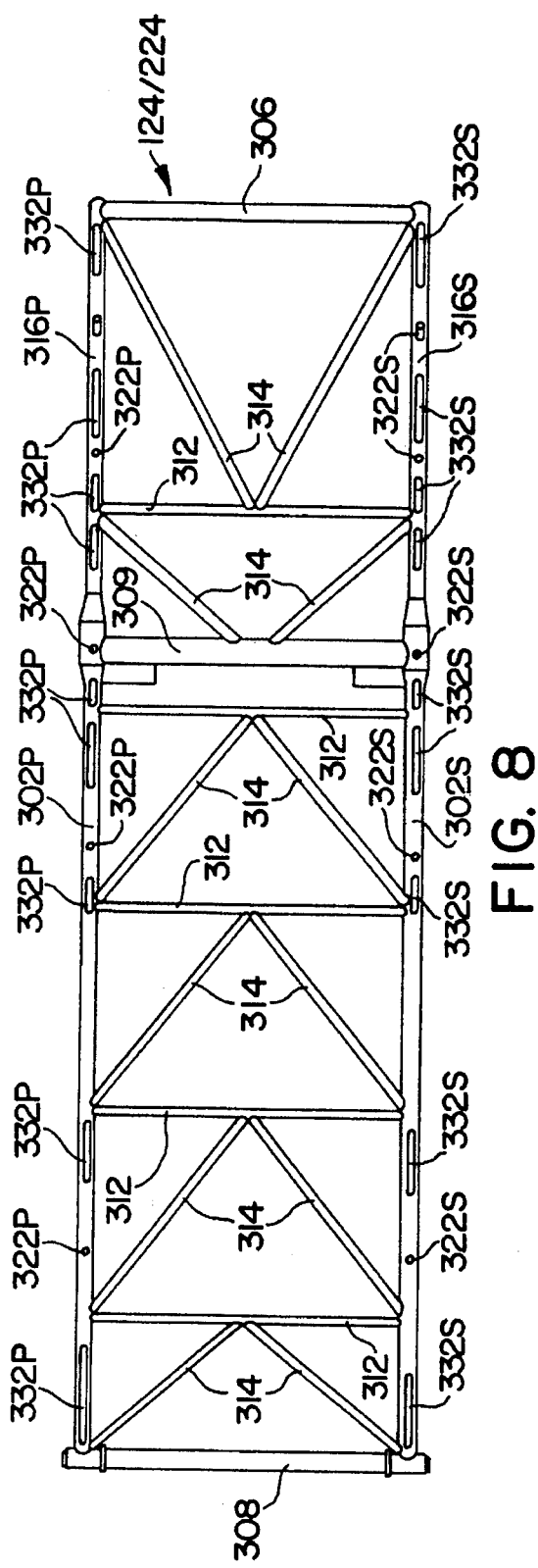
FIG. 7
FIG. 8

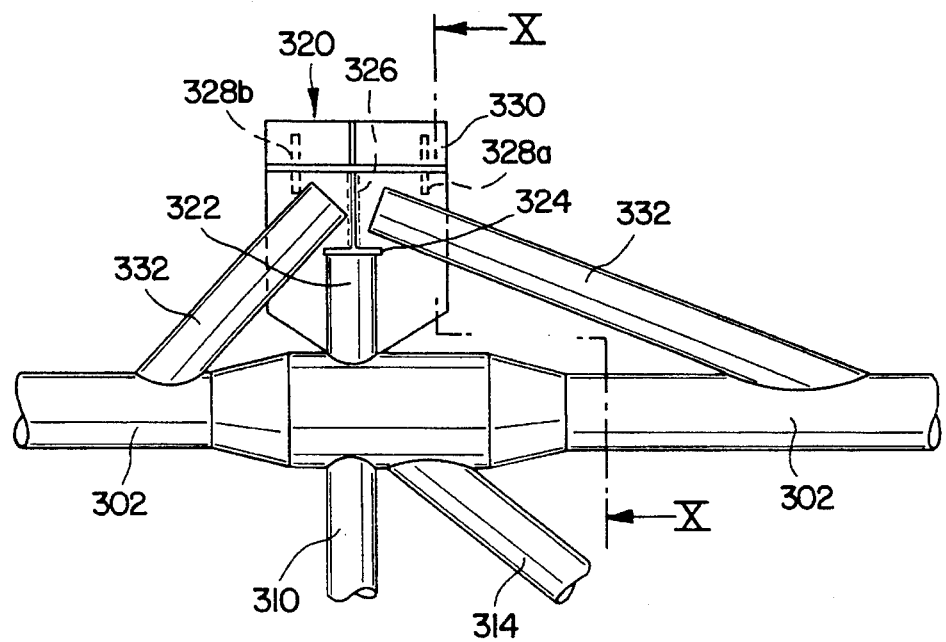
FIG. 9
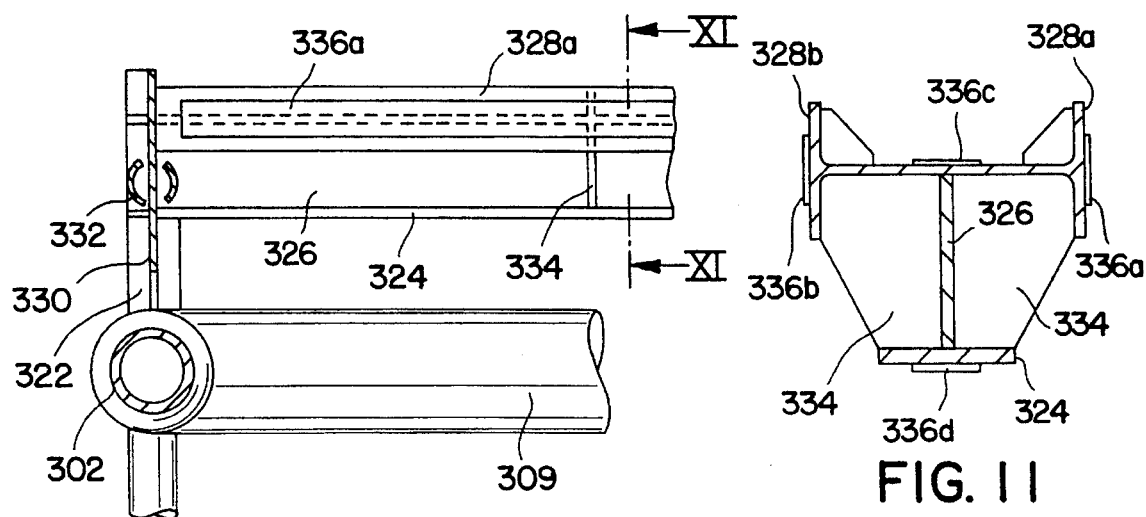
FIG. 10
FIG. 11

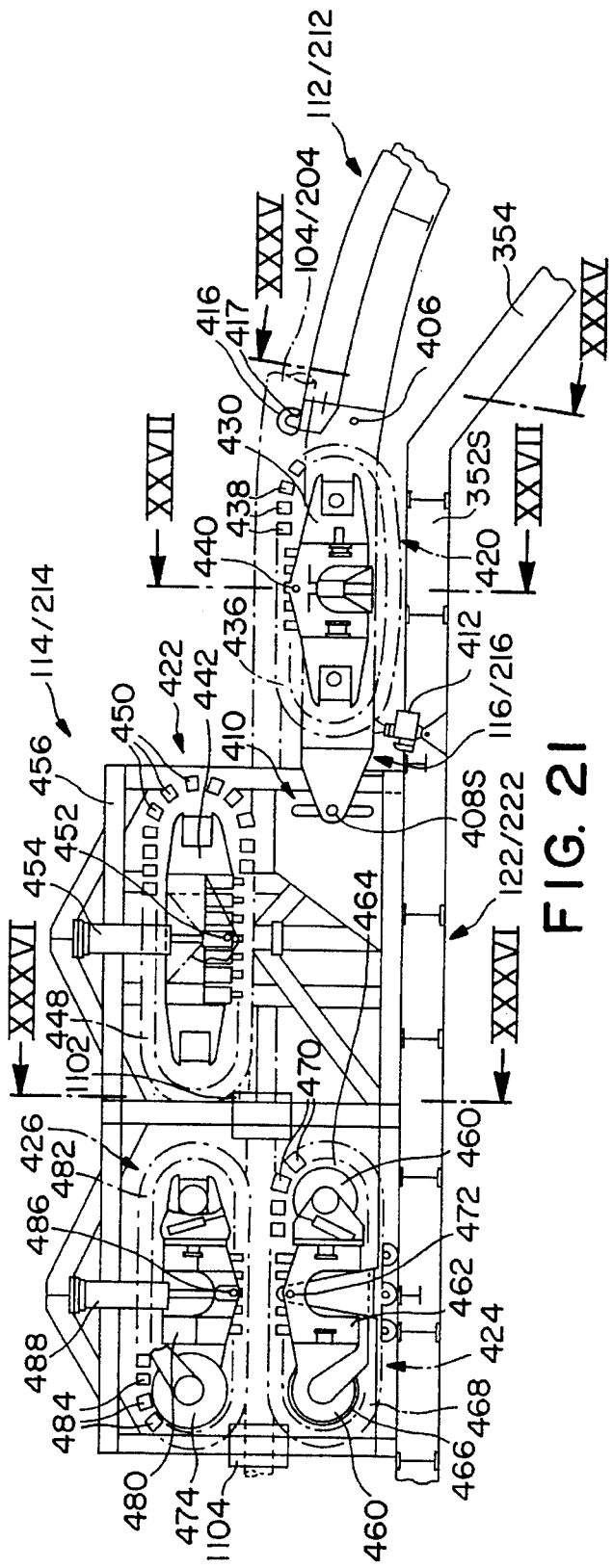
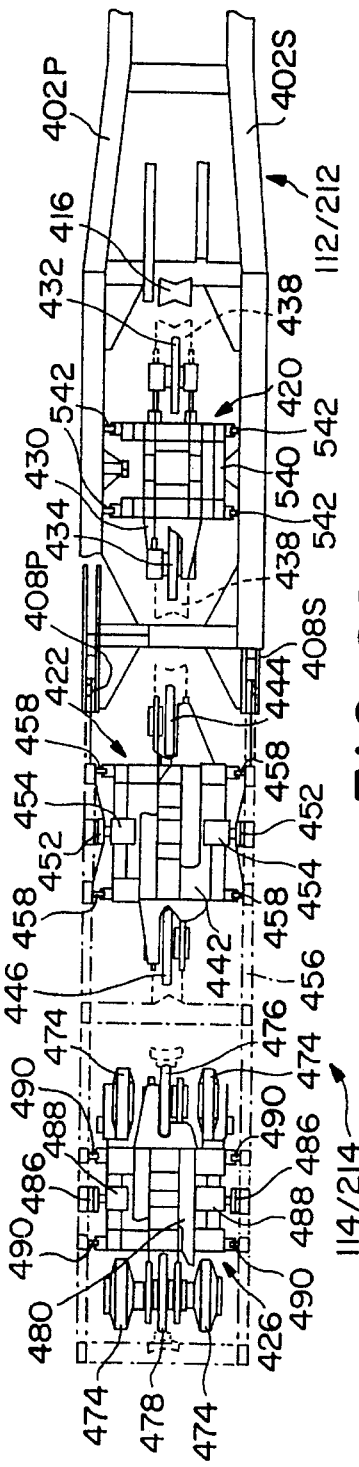
FIG. 21
FIG. 22

PIPELAY STINGER

This invention relates to a reel pipelaying vessel, and more specifically but not exclusively relates to a self-propelled and dynamically-positioned reel pipelaying ship in which a pipe-spooling reel and associated pipe handling equipment are integrated into the structure of the ship. In some embodiments of the pipelaying ship, there is provision for the simultaneous laying of a plurality of pipes, or the simultaneous laying of one or more pipes together with one or more cables.

In prior-art pipelaying vessels as employed in laying offshore subsea pipelines for such uses as the gathering of oil and/or gas from offshore subsea wells, as, for example, in the Gulf of Mexico, it has been conventional to use one of two main methods to lay the pipe. In the first, or "stovepiping" method, a pipeline is fabricated on the deck of a lay barge by welding together individual lengths of pipe as the pipe is paid out from the barge. Each length of pipe is about 40 feet or 80 feet long. Thus, the pay-out operation must be interrupted periodically to permit new lengths of pipe to be welded to the string. The stovepiping method requires that skilled welders and their relatively bulky equipment accompany the pipelaying barge crew during the entire laying operation; all welding must be carried out on site and often under adverse weather conditions. Further, the stovepiping method is relatively slow, with experienced crews being able to lay only one or two miles of pipe a day. This makes the entire operation subject to weather conditions which can cause substantial delays and make working conditions quite harsh.

The other principal conventional method is the reel pipelaying technique. In this method, a pipeline is wound on the hub of a reel mounted on the deck of a lay barge. Pipe is generally spooled onto the reel at a shore base. There, short lengths of pipe can be welded under protected and controlled conditions to form a continuous pipeline which is spooled onto the reel. The lay barge is then towed to an offshore pipelaying location and the pipeline spooled off the reel between completion points. This method has a number of advantages over the stovepiping method, among them, speed (one to two miles per hour); lower operating costs (eg smaller welding crews and less welding equipment must be carried on the lay barge); and less weather dependency.

Historically, the technique of laying undersea fluid-carrying pipelines had its rudimentary beginnings in England in the 1940's in a War-time project known as "Operation Pluto". In the summer of 1944, 3-inch nominal bore steel tubes, electrically flash-welded together, were coiled around floating drums. One end of the pipe was fixed to a terminal point; as the floating drums were towed across the English Channel, the pipe was pulled off the drum. In this manner, pipeline connections were made between the fuel supply depots in England and distribution points on the European continent to support the Allied invasion of Europe. (See Blair, J. S., "Operation Pluto: The Hamel Steel Pipelines", Transactions of the Institute of Welding, February 1946.)

The broad concept of reel pipelaying was also disclosed in British Patent No. 601,103 wherein it was suggested that lengths of pipe can be joined together at the manufacturing plant and coiled onto a drum, mounted on a barge or ship; the loaded barge would then be moved to the desired marine location and the pipe unwound from the drum by fixing one end of the pipe and towing the barge away from the fixed location.

While the concepts described in British Patent No. 601,103 and those actually used in Operation Pluto were adequate for wartime purposes, no known further development work or commercial use of the technique of laying pipe offshore from reels was carried out after World War II. After a hiatus of about fifteen years, research into the reel pipelaying technique was renewed and was carried on by Gurtler, Herbert & Co, Inc of New Orleans, La. (U.S.A.); by 1961, Gurtler, Herbert had sufficiently advanced the reel pipelaying technique to make it a commercially acceptable and viable method of laying pipe in the offshore petroleum industry, able to compete with the traditional stovepiping technique. The first known commercial pipelaying reel barge, called the U-303 was built by Aquatic Contractors and Engineers, Inc, a subsidiary of Gurtler, Herbert, in 1961. The U-303 utilised a large vertical-axis reel, permanently mounted on a barge and having horizontally orientated flanges (generally referred to in the trade as a "horizontal reel"). A combined straightener/level winder was employed for spooling pipe onto the reel and for straightening pipe as it was unspooled. The U-303 first laid pipe commercially in September 1961, in the Gulf of Mexico off the coast of Louisiana and was used successfully during the 1960's to lay several million linear feet of pipe of up to 6 inches diameter. The U-303 reel pipelaying barge is described in U.S. Pat. Nos. 3,237,438 (Tesson) and 3,372,461 (Tesson).

The successor to the U-303, currently in use in the Gulf of Mexico and known in the trade as the "Chickasaw", also utilises a large horizontal reel, permanently mounted to the barge such that it is not readily movable from one carrier vessel to another. Various aspects of "Chickasaw" are described in the following U.S. Patents:

| Sugasti, et al | U.S. Pat. No. 3,630,461 |
| Gibson | U.S. Pat. No. 3,641,778 |
| Mott et al | U.S. Pat. No. 3,680,432 |
| Key et al | U.S. Pat. No. 3,712,100 |

Commercial reel pipelaying techniques require the use of certain pipe handling equipment in addition to the reel. Among such pipe handling equipment essential to any commercial reel pipelaying system is a straightener mechanism. This may take the form of a series of rollers or tracks, or any other arrangement which imparts sufficient reverse bending force to the pipe to remove residual curvature such that after unspooling, the pipe will lay substantially straight on the sea bottom. No such pipe-conditioning apparatus was used in Operation Pluto or contemplated in the British Patent No. 601,103.

U.S. Pat. No. 3,982,402 and U.S. Pat. No. Re. 30,486 (Lang et al) describe an apparatus for laying pipe from a vertical reel in which the pipe conditioning apparatus is pivotable to adjust the lift-off angle of the pipe relative to the horizontal (e.g. the deck of a ship) as a function of the water depth in which the pipe is being laid. This has distinct commercial advantages, especially where the reel pipelaying system is incorporated into a self-propelled ship capable of travelling to different job sites, having different pipe size and/or lay depth requirements.

An early concept for a reel pipelaying ship is described in Goren, et al, "The Reel Pipelay Ship—A New Concept", Offshore Technology Conference Proceedings, May 1975 (Paper No OTC 2400). This paper (hereafter the Goren, et al 1975 OTC Paper) described advantages and operating features of a proposed reel pipelaying ship. However, the cost of construction of a ship as described there was estimated to be on the order of $100,000,000.

The research and development work for the ship described in the Goren, et al paper was subsequently materially revised in numerous major respects, and substantial changes and improvements were made to achieve the design of a substantially different reel pipelaying ship which is described in the following U.S. Patents:

| Springett, et al | U.S. Pat. No. 4,230,421 |
| Uyeda, et al | U.S. Pat. No. 4,269,540 |
| Yenzer, et al | U.S. Pat. No. 4,297,054 |
| Springett, et al | U.S. Pat. No. 4,340,322 |
| Uyeda, et al | U.S. Pat. No. 4,345,855 |

The vessel described in these patents was constructed and is currently in use in various offshore oil fields, being known in the offshore oil industry as the "Apache" (now re-named the "Stena Apache"). This vessel is a self-propelled dynamically-positioned single reel pipelaying ship which has a specially constructed hull comprising a reel support structure for rotatably mounting a vertical reel for unspooling a rigid-walled pipeline. Only a single pipeline is handled by this ship. Other pipe handling equipment includes a pipe bending radius controller; pipe straightening equipment; clamping assemblies; a stern pipe guide assembly and a level wind assembly. A tensioning assembly is also arranged on a support ramp assembly. The pipe exit angle or the water entry angle is from 18° to about 60° since this is the range of angular movement of the support ramp assembly. The upper part of this range of the pipe water entry angles is sufficient to accommodate laying a single pipeline in approximately 3,000 feet water depth. In order to lay pipe at greater depths it is necessary to increase the pipe water entry angle.

The "Stena Apache" vessel is not equipped to lay multiple lines since it has but a single main reel and does not have adequate unused deck space to permit the convenient placement of auxiliary reels. An early suggestion which was made during the vessel's construction phase and mentioned in the above patents, was that portable reels could be placed on the "Apache" deck to permit stern bundling of smaller lines with the pipeline from the main reel. These smaller lines were not required to be passed through the pipe handling equipment with the main reel pipeline according to the suggestion and there were no operative disclosures as to forming a juxtaposed plurality of operational lines by contact with a laying device which is adapted to move all the lines at a common velocity. This stern bundling suggestion was made in the OTC Paper No 3069, May 8–11, 1978.

There are increasing requirements in the offshore petroleum industry for laying multiple operational lines in deep water at depths greater than 3,000 feet and in remote areas far from supply bases. To be commercially viable a pipelaying vessel must also be capable of laying either single or multiple operational lines in shallow waters of less than 2,000 feet up to 3,000 feet depth. The reel pipelaying vessel of this invention (as defined below) represents a new and different concept for meeting these needs.

According to a first aspect of the present invention there is provided a reel pipelaying vessel comprising at least one reel for selectively spooling and de-spooling a length of pipe thereon, radius control means for imparting a substantially uniform radius of curvature to said length of pipe at least during de-spooling of said pipe from said reel in pipelaying operation of said vessel, pipe straightening means downstream of said radius control means in the direction of de-spooling of said length of pipe from said reel in pipelaying operation of said vessel, and pipelay stinger means extending sternwards of said vessel, said pipelay stinger means being arranged to increase the launch angle of said length of pipe from said vessel in pipelaying operation of said vessel.

Said pipelay stinger means is preferably curved in a substantially vertical plane to present pipe-supporting contact points which support said length of pipe in pipelaying operation of said vessel at angles which vary from a relatively lesser elevation above horizontal adjacent the upstream end of said stinger means to a relatively greater elevation above horizontal adjacent the downstream end of said stinger means. Said pipelay stinger means is preferably arranged such that said angles vary as aforesaid between the ends of said stinger means substantially without discontinuity.

Said curved pipelay stinger means may be formed as a cantilever mounting an array of pipe-supporting rollers distributed along the length of said cantilever, said array of rollers presenting pipe-supporting contact points thereon which collectively define the curve of said curved pipe stinger means. Said rollers may have individual rotational axes which are substantially horizontal and aligned transverse said cantilever.

Said curved pipelay stinger means may alternatively be formed as a cantilever mounting an endless pipe conveyor means disposed along the length of said cantilever to present pipe-supporting contact points therealong which collectively define the curve of said curved pipelay stinger means. Said endless pipe conveyor means may comprise an endless chain of mutually pivotally linked pipe supporting elements, said elements being slidably mounted or more preferably roller-mounted on an upper surface of said pipelay stinger means, said endless chain being suspended beneath said upper surface to complete the path of said endless pipe conveyor means around said pipelay stinger means. Each said pipe supporting element preferably comprises at least one pipe-cradling element disposed transverse the path of movement of said endless chain on said upper surface to cradle the length of pipe in the passage of said length of pipe over or through said pipelay stinger means. Each said pipe-cradling element is preferably V-shaped or U-shaped.

Said radius control means and said pipe straightening means are preferably both mounted on a common support means. Said common support means is preferably coupled to the remainder of said vessel in a manner allowing said common support means to be controllably inclined with respect to a nominal or actual horizontal whereby to allow substantial control of the angle relative to said horizontal at which pipe is launched from said vessel during pipelaying operation thereof, up to a maximum angle beyond which said pipelay stinger means is effective to provide a further-increased launch angle. (The term "actual horizontal" refers to a stable horizontal when said vessel is floating in neutral trim conditions on a calm sea in wind-free weather, whereas the term "nominal horizontal" refers to a datum deviated from actual horizontal by the effects on the vessel of waves and/or wind, and/or by the effects on the vessel of intentional or unintentional variations in the trim condition of the vessel).

Said pipelay stinger means is preferably pivotally coupled to the stern of said vessel or to the downstream end of said common support means (when provided) in a manner allowing said pipelay stinger means to pivot about a substantially horizontal axis aligned transverse the longitudinal axis of said vessel for pivoting movement of said pipelay stinger means in a substantially vertical plane substantially parallel to a further substantially vertical plane including the longitudinal axis of said vessel. Said pipelay stinger means may be pivotally coupled as aforesaid through the intermediary of an articulated arm means which is preferably telescopable and/or demountable whereby respectively to allow selective longitudinal repositioning and/or demounting of said pipelay stinger means.

Said common support means (when provided) preferably comprises a ramp means mounting a carriage means controllably traversable laterally across said ramp means, said carriage means mounting both said radius control means and said pipe straightening means, said ramp means being pivotally or otherwise coupled to the remainder of said vessel in said manner allowing controllable inclination of said common support means, whereby the controllable traversing of said carriage means laterally across said ramp means enables level winding of said length of pipe at least during de-spooling thereof from said reel in pipelaying operation of said vessel. Said pipelay stinger means is preferably coupled to said carriage means for traversing movement conjointly therewith.

In said first aspect of the present invention, said reel pipelaying vessel is preferably adapted to perform the simultaneous laying of said length of pipe together with one or more further pipes and/or one or more cables and/or one or more relatively flexible hoses for liquids and/or gases (collectively referred to as "auxiliary line(s)"). The adaptation of the vessel preferably comprises the provision of one or more auxiliary reels on said vessel, the or each said auxiliary reel being constructed or adapted to have one or a plurality of said auxiliary line initially spooled thereon, the or each said auxiliary reel being disposed on said vessel during pipelaying operation of said vessel to de-spool the auxiliary line or lines initially spooled thereon to launch said line or lines from said vessel together with said length of pipe, preferably as a bundle to be laid together on or in the sea-bed. Said vessel may be arranged such that said auxiliary line or lines pass over said radius control means and through said pipe straightening means in a respective path or paths substantially parallel to the path of said length of pipe after initial contact thereof with said radius control means.

By way of example, in a marine hydrocarbon field wherein an offshore producer well is coupled to an offshore or onshore centre by means of a pipe and auxiliary lines laid by the adapted reel pipelaying vessel described above, the main pipe can convey an unseparated gas/oil mixture produced by the well to the centre, an auxiliary pipe can convey separated gas from the centre to the well or to an adjacent well for re-injection into the hydrocarbon field, another auxiliary pipe can convey a field-treating chemical (e.g. methanol) from the centre to the field, one or more hoses can convey gases and/or liquids for any selected purpose, and one or more cables can convey electrical power and/or telecommunications signals (via conductors and/or optical fibres) in one or both directions between the well and the centre. The use of a main pipe and one or more auxiliary lines in parallel with the main pipe enables sophisticated hydrocarbon recovery operations to be carried out efficiently over long distances at sea or across other bodies of water, and the use of a reel pipelaying vessel in accordance with the present invention to install such pipe and auxiliary line systems over long distances in a single combined pipe and line laying operation gives considerable technical and economic benefits over vessels which lay only one pipe or one cable at a time. Even when laying only a single length of pipe, the unique abilities of the reel pipelaying vessel of the present invention in laying relatively long lengths of relatively large and relatively rigid pipe in a single on-going operation give considerable technical and economic advantages over conventional pipelaying vessels and techniques.

The vessel utilised for this invention can be a self-propelled dynamically-positioned ship or it can be a barge which requires a tug for motive power. The vessel deck may be utilised to mount auxiliary reels for the layout of additional operational lines (auxiliary lines) simultaneously with the layout of at least one rigid-walled pipeline from the main reel. At least one additional reel is preferred for this purpose.

Level wind carriages are preferably provided for the auxiliary reel(s).

In preferred embodiments of the present invention, pipe straightening and tensioning devices can be of two types. The first type of device is a straightening device which is operated independently from the tensioning device. The second type of device is a combined straightening/tensioning device comprising two multiple track assemblies which are employed on opposite sides of the pipe in order to provide both of the straightening and tensioning functions. The second type of device involves the use of a straightening/tensioning device which is capable of imparting controlled curvature to the rigid walled pipeline(s) within the operational lines array (ie the totality of the main pipe(s) being laid simultaneously) and is also capable of providing longitudinal tension force. The advantage of the second type of device is that only two such assemblies are required for both of the straightening and tensioning functions whereas in the first type of device, at least four separate track assemblies are required for the laying of even a single rigid-walled pipeline.

In each of the above described embodiments the operational lines laying device is preferably mounted on the vessel via a carriage which is capable of level winding transversely across the vessel deck to provide for controlled spooling and de-spooling of the pipelines array on to and off a plurality of storage reels. The pipe and line storage reels are preferably each fitted with hydraulic motors for imparting motive power to the reel flanges or rims in order to provide for spooling up of the lines. The hydraulic motors are preferably also fitted with hydraulic braking systems for controlling tension of the lines during de-spooling and to control the linear rate at which the pipe(s) and auxiliary line(s) are launched.

Certain of the embodiments of the present invention permit a plurality of operational lines, including one or more rigid-walled pipelines, to be laid in an array on the bottom of body of water in a controlled manner. The particular embodiment selected for a given pipelaying project depends upon the depth of water and the project budget available. Other technical and economic considerations such as the permissible capital investment, speed of pipeline layout, customer flexibility in respect of design characteristics, and sea state spectrum also enter into the selection process. Within the several embodiments of the present invention the full range of laying conditions are provided for. The main embodiments of the reel pipelaying vessel cover a range of sea-bed depths, whereas the use of specific straightening and tensioning devices is determined by various pipe handling technical characteristics and economic considerations.

Another feature of the present invention is that a dynamically positioned vessel can be alternately converted between a single pipeline laying capability such as described in the above mentioned Springett, et al, Uyeda, et al and Yenzer, et al patents and which is embodied in the "Stena Apache" pipelaying ship, and the adapted vessel described in the present application. In order to accomplish this alternate use, the main pipeline reel is preferably maintained in its fixed position and the remainder of the pipe handling equipment shown on the aft deck of the vessel in those U.S. patents is optionally replaced with the layout system herein described which includes one or two auxiliary reels and the operational lines laying devices described herein. Thus, a convertible feature for operation of a pipe laying vessel between a single reel vessel and a multi-reel vessel is also included within the present invention.

According to a second aspect of the present invention, there is provided a method of operating a reel pipelaying ship to increase the launch angle of a length of pipe laid by said vessel in pipelaying operation thereof, said method comprising the steps of providing a pipelay stinger means extending sternwards of said vessel, and laying said length of pipe by way of said pipelay stinger means, having arranged said pipelay stinger means to increase said launch angle.

Said pipelay stinger means is preferably arranged to be curved in a substantially vertical plane to present pipe-supporting contact points which support said length of pipe during pipelaying operation of said vessel at angles which vary from a relatively lesser elevation above horizontal adjacent the upstream end of said pipelay stinger means to a relatively greater elevation above horizontal adjacent the downstream end of said pipelay stinger means.

For convenience the following terms are selectively employed in the description of the invention:

1. A "turn" is that length of pipe wound through one complete revolution of the reel.
2. A "wrap" comprises a plurality of turns making up a layer of pipe wound on the reel across the full or substantially full width of the reel.
3. "Level Winding" refers to the transverse movement of the operational lines laying device or a storage reel across the deck of the vessel. The "level winding means" refers to apparatus for carrying out such movement.
4. "Multiple track straightening or tensioning assemblies" refers to flexible track systems having a plurality of pipe support pads mounted thereon and which are designed for either of the two functions of straightening or tensioning.
5. The term "multiple track straightening/tensioning assemblies" refers to tensioning assemblies which are designed to provide both straightening and tensioning functions in a single pair of such assemblies when positioned on opposite sides of the operational lines array.
6. "Carriage" refers to the support frame structure which is used to mount the operational lines laying device(s) on the vessel and to provide for level winding thereof.
7. "Main reel" refers to a large diameter storage reel which is permanently mounted within the vessel for spooling and unspooling rigid walled pipeline.
8. The notations "S" for starboard and "P" for port have been used for convenience as suffixes in numerical designations applied (as appropriate) to various components illustrated in the accompanying drawings.

Embodiments of the present invention will now be described by way of example, with reference to the accompanying drawings wherein:

FIG. 1 is a starboard-side elevation of a first embodiment of reel pipelaying vessel in accordance with the present invention;

FIG. 2 is a plan view from above of the vessel shown in FIG. 1;

FIG. 4 is a starboard-side elevation of a second embodiment of reel pipelaying vessel in accordance with the present invention;

FIG. 5 is a plan view from above of the vessel shown in FIG. 4;

FIG. 7 is a starboard-side elevation of a support frame for the radius controller and pipe straightener of FIG. 3 or of FIG. 6;

FIG. 8 is a plan view from above of the support frame of FIG. 7;

FIGS. 9, 10 and 11 show various structural details of the support frame of FIG. 7;

FIG. 21 is a detail of FIG. 20, to an enlarged scale;

FIG. 22 is a plan view from above of the detail of FIG. 21;

Figure 3:
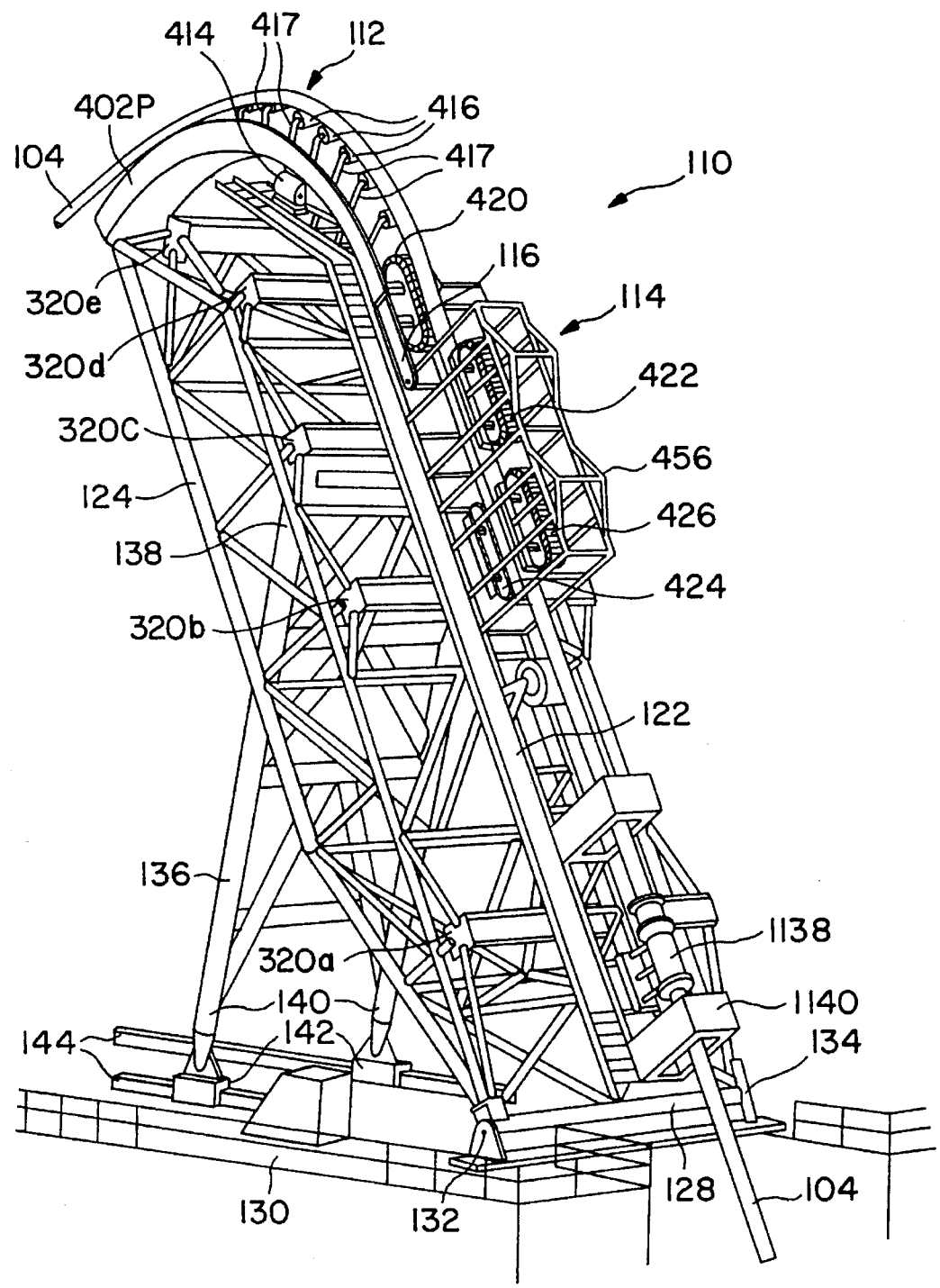
FIG. 3 is a perspective view from astern of the port side of a radius controller and pipe straightener comprised in the vessel shown in FIG. 1.

Referring first to FIGS. 1 and 2, these show a first embodiment of reel pipelaying vessel in accordance with the invention, in the form of a mono-reel pipelaying ship 100.

The ship 100 carries a single main reel 102 upon which a length of substantially rigid steel pipe 104 can be spooled for temporary storage, for transport, and for subsequent de-spooling (e.g. for laying as a pipeline). The reel 102 has a substantially horizontal axis 106 lying substantially at right angles athwart the longitudinal centre line of the ship 100. The reel 102 may conveniently be termed a "vertical reel".

Between the reel 102 and the ship's stern 108 (over which the pipe 104 passes when being de-spooled to be laid in pipelaying operation of the vessel 100) is a pipe-conditioning unit 110 which conditions the pipe 104 between its leaving the reel 102 and its passing over the stern 108 to be laid on or in the sea-bed (not shown).

The pipe-conditioning unit 110 (shown in greater detail in FIG. 3) serves to remove the plastic curvature imparted to the length of pipe 104 by its being spooled onto the reel 102 such that as the pipe 104 passes over the ship's stern 108, it is plastically re-formed to a substantially straight configuration, thus to ensure that the pipe 104 will lay properly on or in the sea-bed with minimal residual stress that would tend to displace the laid pipe from its intended laid position and/or that would tend to weaken the laid pipe.

The pipe-conditioning unit 110 comprises, in succession in the downstream direction of movement of the pipe 104 from being de-spooled from the reel 102 to being laid over the stern 108 (ie leftwards as viewed in FIGS. 1 and 2), a radius controller 112, and a pipe straightener 114. (Downstream of the pipe-conditioning unit 110, but not shown in FIGS. 1 to 3, is a pipelay stinger which is coupled to the downstream end of the unit 110 and which projects sternwards over the stern 108; this stinger will be detailed subsequently).

The radius controller 112 serves to impart a substantially uniform radius of curvature to the pipe 104 from the initial point of contact of the pipe 104 with the radius controller 112 to the departure of the pipe 104 from the downstream end 116 of the radius controller 112 and into the pipe straightener 114. The centre of the substantially uniform radius of curvature lies beneath the radius controller 112. Since the axis 106 of the reel 102 likewise lies generally beneath the pipe 104 as the pipe 104 is being de-spooled from the reel 102, the radius controller 112 renders the curvature of the newly de-spooled pipe 104 substantially uniform without reversing the direction of curvature of the pipe 104 (as would be the case of the pipe 104 were spooled onto and de-spooled from the reel 102 in a rotational direction opposite to that shown in FIG. 1).

Having been substantially uniformly curved by the time it leaves the downstream end 116 of the radius controller 112, the pipe 104 enters the pipe straightener 114 and is subjected therein to a reverse bending procedure (detailed in a later part of this specification) tending to impart a substantially equal but oppositely-directed uniform curvature to the pipe 104 that substantially cancels out the curvature imparted by the radius controller 112, such that the pipe 104 leaves the downstream end 120 of the pipe straightener 114 in the pipelaying (sternward) direction in a substantially straight condition and substantially free of non-uniform longitudinal stresses or deformations tending to deviate the conditioned pipe from straightness during and/or after laying.

The pipe straightener 114 and/or other parts of the pipe-conditioning unit 110 may be constructed or adapted additionally to re-form the pipe 104 during pipelaying operation of the ship 100 to diminish or substantially to eliminate any out-of-roundness (non-circularity) that may have intentionally or unintentionally been imparted to the pipe 104 during its fabrication, spooling, or de-spooling. Conversely, a predetermined and substantially controlled non-circularity of the pipe 104 as laid may be intended, and the pipe-conditioning unit 110 adapted and operated accordingly.

Within the overall pipe-conditioning unit 110, the radius controller 112 and the pipe straightener 114 are mounted on a common support carriage 122 which in turn is mounted on a common support frame 124. (Details of the support carriage 122 and of the support frame 124 will be given in a subsequent part of this specification). A traversing mechanism (not shown in FIGS. 1–3 but detailed in a subsequent part of this specification) is interposed between the support carriage 122 and the support frame 124 such that the support carriage 122 can be controllably reciprocated across the support frame 124 during spooling of the length of pipe 104 onto the reel 102, and more importantly, during de-spooling of the length of pipe 104 from the reel 102 during pipelaying operation of the ship 100. This traversing arrangement can therefore be operated as a level-wind mechanism substantially to eliminate lateral deviation of the pipe 104 between the reel 102 and the radius controller 112, thus ensuring correct layering of the pipe 104 on the reel 102 during spooling, and purely longitudinal entry of the pipe 104 onto the radius controller 112, without significant lateral deviation, lateral bending, or lateral stress, during de-spooling of the pipe 104 from the reel 102 in pipelaying operation of the ship 100.

Between the downstream end 120 of the pipe straightener 114 and the downstream end 126 of the support carriage 122 (approximately over the ship's stern 108) are auxiliary items or assemblies of further pipe-conditioning equipment or pipe-handling equipment, and which are merely schematically indicated in FIGS. 1–3 but which will be detailed in subsequent parts of this specification.

The support frame 124 has its sternmost end 128 pivotally mounted on the stern deck 130 of the ship 100 by means of pivot mountings 132 (port) and 134 (starboard) having a common axis of rotation orthogonally athwart the longitudinal (fore and aft) centre line of the ship 100. The pivot mountings 132 and 134 allow the support frame 122, and hence the whole of the pipe-conditioning unit 110, to be pivotally elevated to a selected angle with respect to the nominally horizontal stern deck 130. In FIG. 1, the lowest such elevation of the pipe-conditioning unit 110 is shown in full lines, while the highest such elevation is shown in chain-dash lines. The support frame 122 can be elevated by any suitable mechanism, one such elevating mechanism being illustrated in FIGS. 1 and 3 and comprising a jacking truss 136 pivotally linked at its upper end 138 to suitable points in the support frame 124. The lower end 140 of the jacking truss 136 is slidably coupled by slide shoes 142 to a parallel pair of rails 144 aligned fore and aft on the stern deck 130. The slide shoes 142 are forced to selected positions along the respective rails 144 by means of a horizontal jacking mechanism 146 (schematically depicted in FIG. 1, and omitted from FIGS. 2 and 3) thereby to cause corresponding movement of the lower end 140 of the jacking truss 136. In turn, such controlled movement of the lower end 140 of the jacking truss 136 causes its upper end 138 to rise or fall along an arc of movement defined by the pivotal link of the upper end 138 to the support frame 124, and the pivotal mounting of the lower end 128 of the support frame 124 on the stern deck 130 through the pivot mountings 132 and 134. From the kinematic point of view of the pivotally mounted support frame 124, the jacking truss 136 functions as a rigid propping strut which is pin-jointed at its upper end to the frame 124, and slide-mounted at its lower end on the horizontal plane constituted by the deck 130 which is common to the frame pivots 132 and 134.

The above-described controllable elevation of the pipe-conditioning unit 110 enables the angle, relative to actual or nominal horizontal, at which the pipe 104 is launched from the ship 100 into the sea to be controlled substantially to any desired angle within the available range of angles so as to facilitate optimisation of the pipe launch angle during pipelaying operation of the ship 100. A pipelay stinger arrangement (omitted from FIGS. 1 to 3) for increasing the pipe launch angle above the maximum launch angle provided for by elevation of the unit 110 will be subsequently detailed with particular reference to FIGS. 23 to 26.

For the purposes of its self-propulsion, the ship 100 is provided with twin main propellers, only the starboard main propeller 148 being visible in FIG. 1. These main propellers are driven by one or more main propulsion engines (not shown) within the hull 150 of the ship 100.

For the purposes of its dynamic self-positioning, the ship 100 is provided with a stern thruster 152 and a bow thruster 154 mounted within respective horizontal tunnels 156 and 158 penetrating the hull 150 from side to side. The thrusters 152 and 154 provide controllable lateral thrust respectively at the stern and at the bow of the ship 100 in order to control heading and side motion of the ship 100 without reliance on the forward motion of the ship 100 to provide a lateral reaction on the ship's rudder 160. The thrusters 152 and 154 can be powered by controlled power take-offs from the main propulsion engine(s), or by an independent thruster propulsion engine(s) (not shown) within the hull 150.

The ship 100 is subject to overall control, at least for navigation purposes, from a bridge superstructure 162 forward of the main reel 102.

Figure 6:
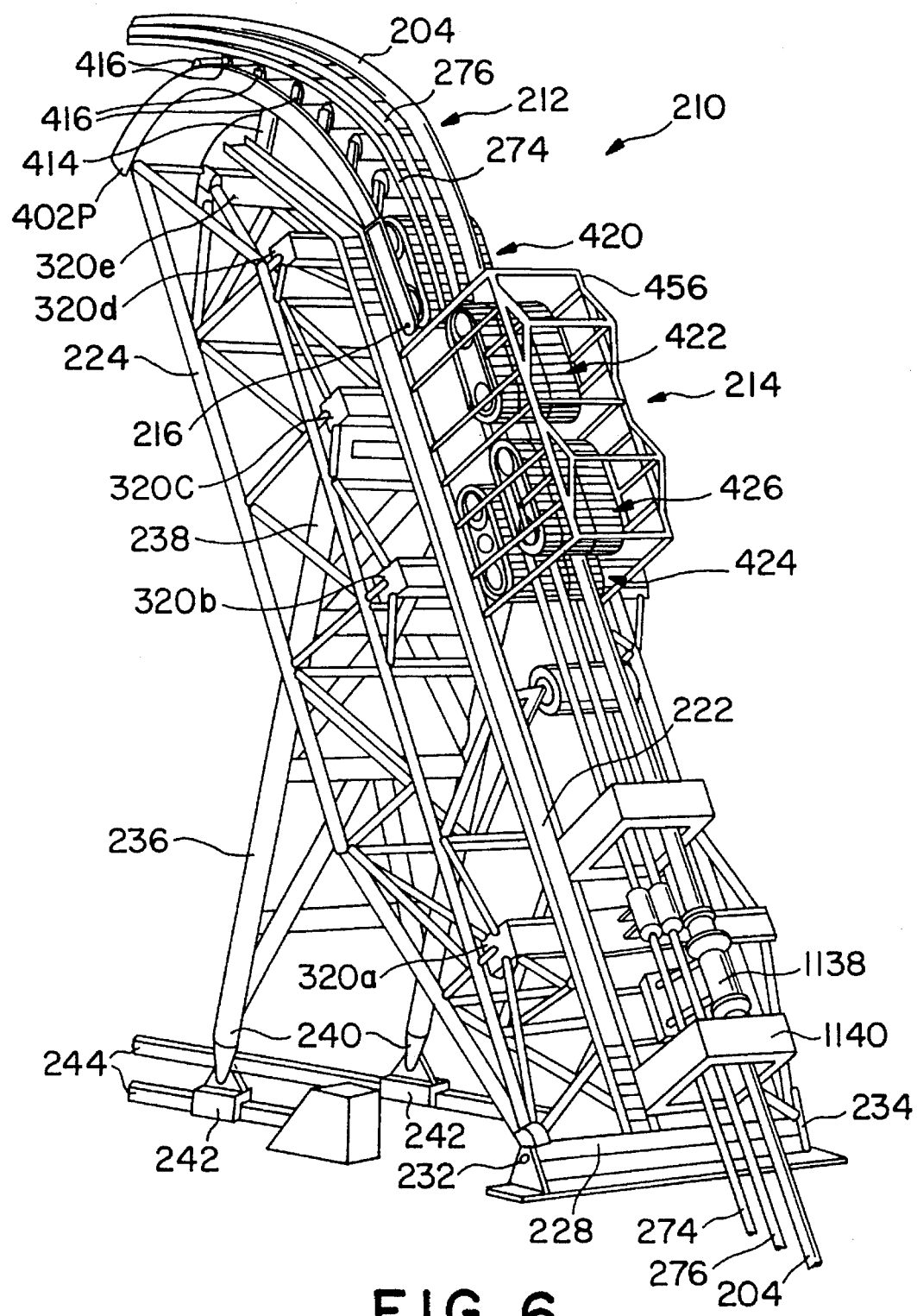
FIG. 6 is a perspective view from astern of the port side of a radius controller and pipe straightener comprised in the vessel shown in FIG. 4.

Turning now to FIGS. 4, 5 and 6, these show a second embodiment of reel pipelaying vessel in accordance with the invention, in the form of a multi-reel pipelaying ship 200.

In general terms, the ship 200 is basically similar to the above-described ship 100 (though differing in certain details of dimension and proportion), and differs principally in the provision of two auxiliary reels 270 and 272 for the laying of up to two auxiliary lines simultaneously with pipe 204 initially spooled on a main reel 202.

In view of the basic similarity of the ship 200 to the ship 100, those parts of the ship 200 which are identical or functionally equivalent to parts of the ship 100 are given the same reference numerals, but modified by replacing the initial "1" with a "2" (ie appropriate FIG. 4–6 reference numerals are equivalent FIG. 1–3 reference numerals plus one hundred). Accordingly, for a full description of any part of the ship 200 not given below, reference should be made to the foregoing description of the same or equivalent part of the ship 100. The following description of the ship 200 with reference to FIGS. 4–6 will concentrate on substantive differences in the ship 200 with respect to the ship 100 (as described above with reference to FIGS. 1–3).

As with the ship 100, in the ship 200 a relatively rigid steel pipe 204 is initially spooled on the main reel 202 for subsequent de-spooling and passage through the pipe-conditioning unit 210 to be laid over the ship's stern 208 to become a sea-bed pipeline. At the same time as the main pipe 204 is being laid in pipelaying operation of the ship 200, an auxiliary pipe 274 initially spooled on the first auxiliary reel 270 and a cable 276 initially spooled on the second auxiliary reel 272 are simultaneously de-spooled and passed through the pipe-conditioning unit 210 in parallel with the main pipe 204 and at substantially the same linear rate. The auxiliary pipe 274 is relatively less rigid than the main pipe 204 but nevertheless requires, and is therefore subjected to, the same uniform bending and subsequent straightening as the main pipe 204. The cable 276 has relatively less rigidity, but is also subjected to the same conditioning measures as the pipes 204 and 274 in its passage through the pipe-conditioning unit 210.

It is to be noted that auxiliary lines in the form of a single auxiliary pipe 274 and a single cable 276 are given by way of example only, and auxiliary lines in the form of two auxiliary pipes, or two cables are equally within the scope of the present invention. One or more of the auxiliary lines could be in the form of a bundle of two or more individual pipes and/or cables, and handled either in the manner of a single auxiliary line or in a modified manner appropriate to the different characteristics of a pre-formed bundle. It is further to be noted that without departing from the scope of the invention, the number of auxiliary reels could be other than the two given by way of example only, and also that not every auxiliary reel need be employed in any given pipelaying operation of the ship 200; in the extreme case, the ship 200 could be employed within the scope of the invention solely to lay only the main pipe 204 without any auxiliary lines being simultaneously laid during the pipelaying operation, and conversely, the ship 200 could also be employed within the scope of the present invention solely to lay one or more auxiliary lines without simultaneously laying a main pipe.

Reverting to the specific exemplary arrangement illustrated in FIGS. 4–6, level-wind facilities for the auxiliary lines are provided in the following manner. The first auxiliary reel 270 is mounted on a pair of trestles 278 for rotation about a substantially horizontal axis 280 which is aligned substantially orthogonally athwart the longitudinal (fore and aft) centre line of the ship 200. The trestles 278 are mounted in turn for conjoint movement on a parallel pair of rails 282 secured on the stern deck 230, the rails 282 being substantially orthogonally transverse the longitudinal centre line of the ship 200.

Similarly, the second auxiliary reel 272 is mounted on a pair of trestles 284 for rotation about a substantially horizontal axis 286 which is aligned substantially orthogonally athwart the longitudinal (fore and aft) centre line of the ship 200. The trestles 284 are mounted in turn for conjoint movement on a parallel pair of rails 288 secured on the stern deck 230, the rails 288 being substantially orthogonally athwart the longitudinal centre line of the ship 200.

(It may be noted here that since both the auxiliary reels 270 and 272 have respective horizontal rotation axes 280 and 286, the auxiliary reels 270 and 272 may conveniently be termed "vertical" reels in conformity with the convention by which the main reel 202 is likewise a "vertical" reel).

The above-described trestle and rail mounting arrangements for the auxiliary reels 270 and 272 allow these reels to be selectively and mutually independently traversed across the stern deck 230. A traversing drive arrangement for this purpose is schematically depicted at 290. Thus, as the support carriage 222 is traversed back and forth across the support frame 224 to level-wind the main pipe 204 off the main reel 202 and onto the radius controller 212, the first auxiliary reel 270 can be traversed along the rails 282 both to track the level-wind traversing movement of the carriage 222 and to level-wind the auxiliary pipe 274 as it is de-spooled from the reel 270 onto the radius controller 212; similarly and simultaneously the second auxiliary reel 272 can be traversed along the rails 288 (independently of the traversing movement of the first auxiliary reel 270) both to track the level-wind traversing movement of the carriage 222 and to level-wind the cable 276 as it is de-spooled from the reel 272 onto the radius controller 212. These various level-wind traversing movements can most easily be seen in FIG. 5.

Progressing now to the overall perspective view of the pipe-conditioning unit 210 shown in FIG. 6, the unit 210 is essentially similar to the pipe-conditioning unit 110 as shown in FIG. 3, save for the addition of certain further items of auxiliary equipment mounted on the support carriage 222 downstream of the pipe straightener 214; these further items of auxiliary equipment will be detailed in a subsequent section of this specification. Compared to FIG. 3, FIG. 6 particularly additionally shows the auxiliary pipe 274 and the cable 276 progressing across and down the pipe-conditioning unit 210 on respective paths parallel to the main pipe 204. A more detailed description of the functioning of the pipe-conditioning unit 210 in pipelaying operation of the ship 200 will be given in a subsequent section of this specification.

Structural features of the pipe-conditioning units 110 and 210 that are common to both these units will now be described.

First to be described will be the support frame 124/224 which is shown overall, as a separate component, in FIG. 7 (starboard-side elevation) and in FIG. 8 (plan view from above), together with structural details in FIGS. 9, 10 and 11.

The support frame 124/224 comprises a double-sided open truss framework (FIGS. 7 and 8) having upper and lower frame members 302 and 304, respectively (denoted in FIGS. 7 and 8 with a suffix "P" or "S" according to whether they are port-side or starboard-side members, respectively). Transverse end members 306 and 308 link the longitudinal members 302 and 304 at the upper and lower ends of the support frame 114/214 respectively, and an intermediate transverse member 309 links the upper frame members 302P and 302S intermediate the frame ends (see FIGS. 8 and 10). The longitudinal frame members 302 and 304 are interconnected by vertical, horizontal and diagonal bracing members 310, 312 and 314 respectively, for additional strength. The upper frame 302 and 304 are longitudinally offset from each other and are mutually connected at their forward ends by structural members 316 and at their aft ends by structural members 318.

The support frame 114/214 mounts five level-wind tracks 320a–320e extending transversely across the support frame 114/214. The tracks 320a–320d are mounted on the upper frame members 302 so as to be substantially co-planar with each other. The track 320e is located on the forward connecting members 316 to lie below the plane of the tracks 320a–320d. (In the plan view of FIG. 8 these tracks 320a–320e are broken away to show the underlying frame members 302P and 302S).

FIGS. 9–11 show details of a typical frame-mounted level-wind track 320. (FIG. 9 is a starboard-side elevation of the detail denoted "(9)" in FIG. 7, to an enlarged scale. FIG. 10 is a section taken on the line X—X in FIG. 9. FIG. 11 is a section taken on the line XI—XI in FIG. 10, to an enlarged scale). A track base support member 322 extends vertically upwards from each of the upper frame members 302S and 302P. A track base plate 324 extends between and is secured (e.g. by welding) to the track base support members 322S and 322P at each side of the frame 114/214. A T-shaped track member 326 having flared ends 328a and 328b extends upwardly from the track base plate 324 and transversely between the upper frame members 302S and 302P. The axially opposite ends of the track member 326 are secured (eg by welding) to end support plates 330S and 330P which, in turn, are secured to the upper frame members 302S, 302P and to the track base support members 322S and 322P. Struts 332 longitudinally brace the support plates 330. Additional intermediate track support members 334 are provided to give the track member 326 additional strength. Guide strips 336a and 336b are secured to the track ends 328a and 328b respectively, and further guide strips 336c and 336d are secured respectively on top of and beneath the track member 326, for support and guidance of the support carriage 122/222 in its traversing level-wind movements (see FIG. 14).

The laterally opposite ends of the transverse end member 308 constitute the attachment points of the support frame 114/214 to the pivot mountings 132/232 and 134/234 (see FIGS. 2, 3, 5 and 6). The angle, (called pipe exit or lay angle) which the support frame 114/214 and hence the pipe-conditioning unit 110/210 makes with a horizontal plane approximating the water surface plane is adjustable between about 18° and 60°. For a particular pipe laying operation, the angle at which the support frame 114/214 is set is determined primarily as a function of (1) water depth along the pipeline right of way (ie the path on the sea-bed along which the pipe is to be laid); and (2) characteristics of the main pipe 102/202 to be laid, including pipe diameter, strength and weight.

It is anticipated that during transit of the ship 100/200 between jobs or to/from its base (ie when not in its pipelaying mode), the angle of the support frame 114/214 will be advantageously and preferably set at about 30° with respect to the horizontal. This setting minimises stresses on the jacking truss 136 without significantly adversely affecting ship stability.

Figure 12:
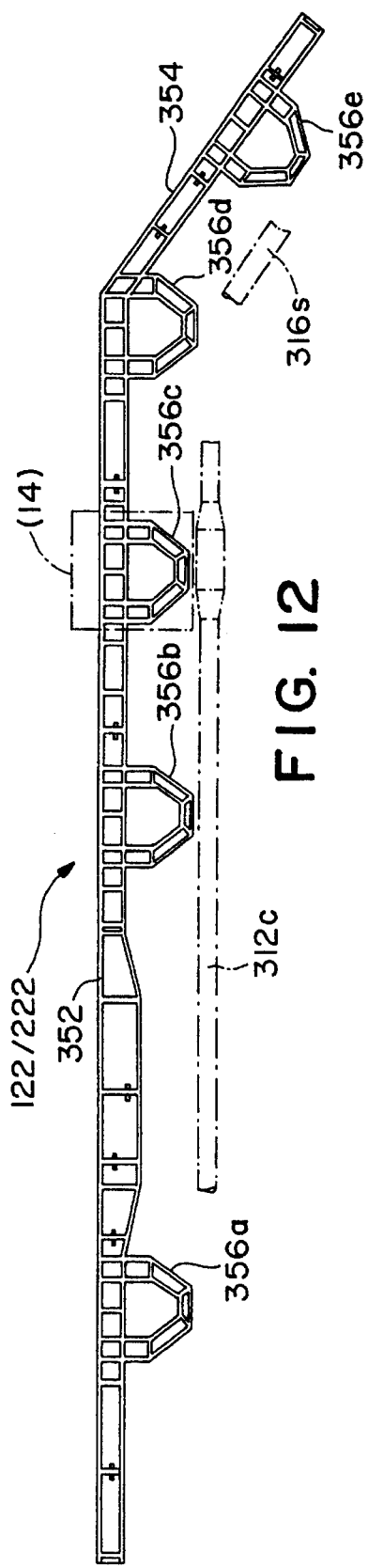
FIG. 12 is a starboard-side elevation of a support carriage for the radius controller and pipe straightener of FIG. 3 or of FIG. 6.
Figure 13:
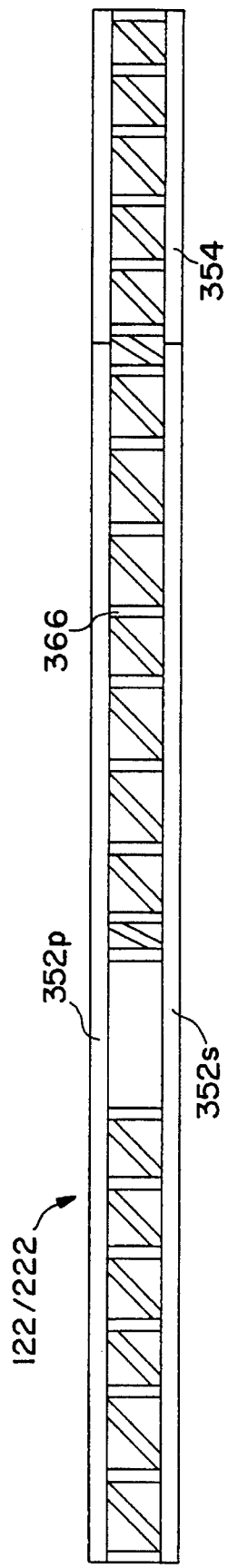
FIG. 13 is a plan view from above of the support carriage of FIG. 12.
Figure 14:
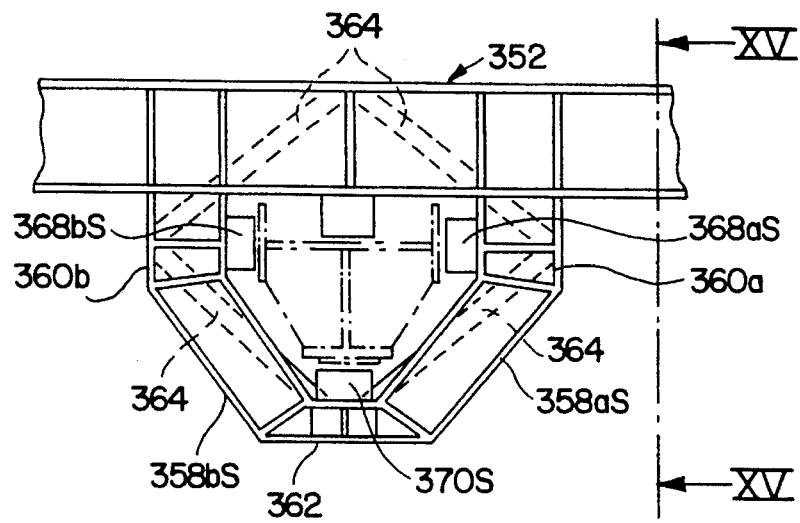
FIGS. 14, 15 and 16 show various structural details of the support carriage of FIG. 12.
Figure 15:
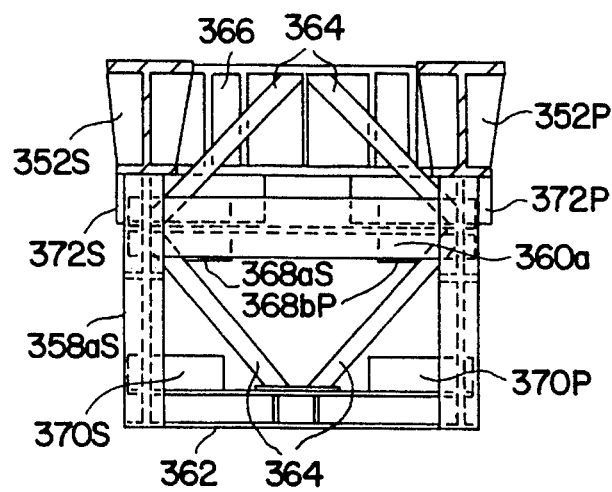
Figure 16:
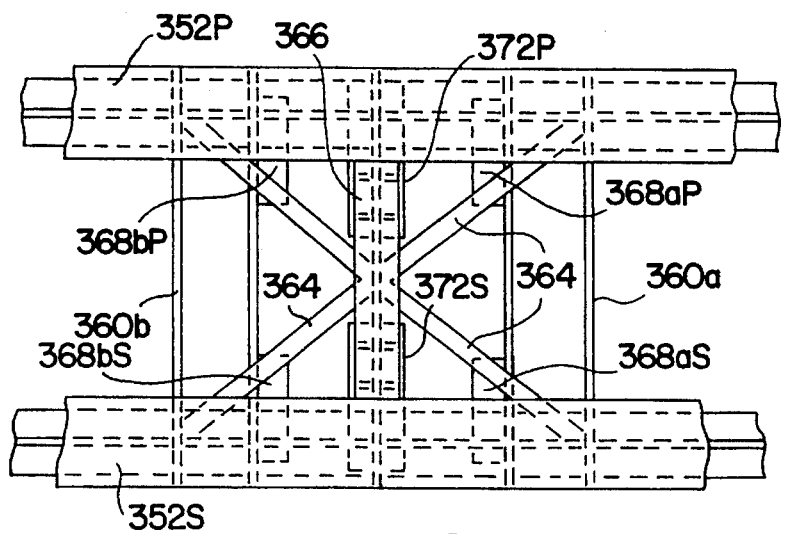

Next to be described will be the support carriage 122/222 which is shown overall, as a separate component, in FIG. 12 (starboard-side elevation) and in FIG. 13 (plan view from above), together with structural details in FIGS. 14, 15 and 16. (FIG. 14 is an enlarged view of the detail denoted "(14)" in FIG. 12; FIG. 15 is a transverse section of the detail (14), taken on the line XV—XV in FIG. 14; and FIG. 16 is a plan view from above of the detail (14).

The support carriage 122/222 comprises a main frame 352 (FIGS. 12 and 13) having frame members 352S and 352P, and a forward frame section 354 extending downwardly from the forward end of the main frame 352 at an angle corresponding to the angle of the structural member 316 (FIG. 7) relative to the longitudinal frame member 302 as may be particularly seen from a comparison of FIG. 12 with FIG. 7.

Five roller trunnions 356a–356e (FIG. 12) extend below the support carriage 122/222 and relative positions corresponding to the relative positions of the five transverse tracks 320a–320e (FIG. 7) on the support frame 124/224. The roller trunnions 356a–356e are each substantially identical, and a typical trunnion (356c) together with adjacent parts of the frame 352 (detail "(14)" in FIG. 12) are shown to an enlarged scale in FIGS. 14–16 which will now be detailed.

Each roller trunnion 356 comprises a pair of oblique members 358a and 358b, with those at opposite sides of the support carriage 122/222 being joined by transverse top members 360a and 360b and a transverse bottom member 362. The trunnion 356 is heavily cross-braced by rigid tubular struts 364 welded diagonally between the fore and aft transverse top members 360a and 360b, the transverse bottom member 362, and an overlying transverse frame member 366 forming part of the main frame 352. (An equivalent arrangement applies in respect of the forward trunnion 356e lying under the forward frame section 354).

A spaced-apart pair of linear roller assemblies (detailed below) is mounted on each of the transverse members 360a, 360b, 362 and 366, with one roller assembly (distinguished by the suffix "P") at the port end of these members and the other roller assembly (distinguished by the suffix "S") at the starboard end of these members. These linear roller assemblies are schematically depicted in FIGS. 14–16, and may comprise any suitable proprietary units capable of bearing high static and dynamic loads while supporting the carriage 122/222 together with the surmounted radius controller 112/212, pipe straightener 114/214, and auxiliary pipe-conditioning equipment during their traversing level-wind movements on the support frame transverse rails 320 (shown in chain-dashed ghost outline in FIG. 14). This roller arrangement will now be detailed.

The transverse top members 360a and 360b mount respective linear roller assemblies 368aS, 368aP, 368bS and 368bP on the mutually facing surfaces of these members. The transverse bottom member 362 mounts linear roller assemblies 370S and 370P on its upper surface. The overlying transverse frame member 366 mounts linear roller assemblies 372S and 372P on its undersurface. These various roller assemblies present mutually inwardly directed linear roller bearing contact surfaces which, in the operative assembly of the support carriage 122/222 on the support frame 124/224, contact and bear against respective ones of the guide strips 336a–336d (FIG. 11) on the respective one of the support frame transverse rails 320a–320e for mutual relative linear traversing movement.

Figure 17:
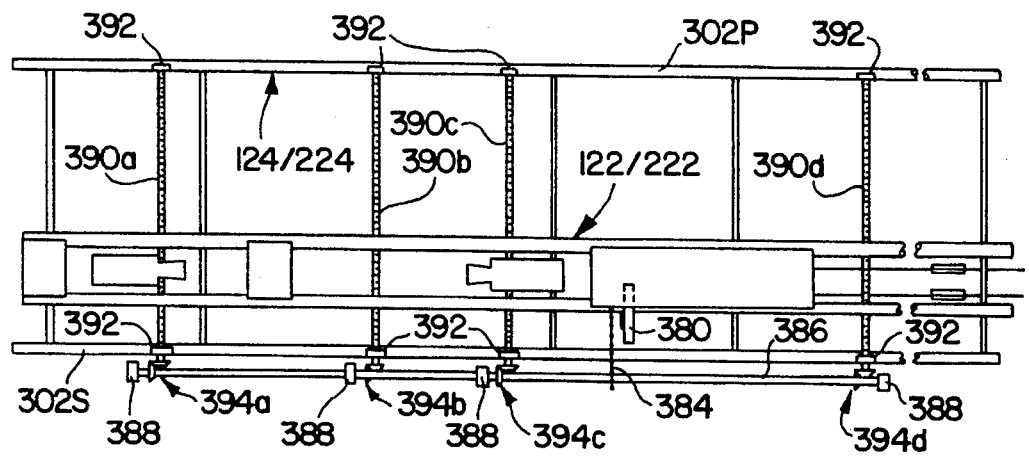
FIG. 17 is a schematic plan view of the support carriage of FIG. 12 mounted on the support frame of FIG. 7 by means of an interposed traversing mechanism.
Figure 18:
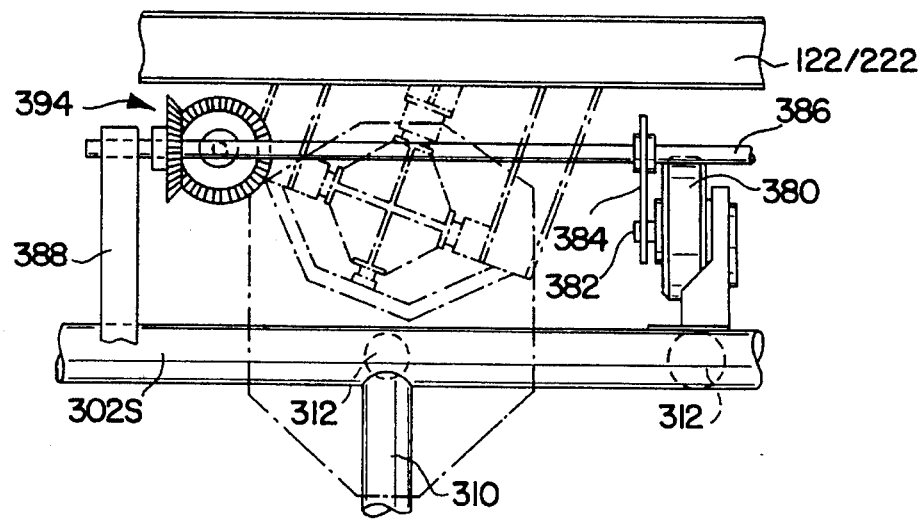
FIGS. 18 and 19 are respectively starboard-side and end elevations of part of the traversing mechanism of FIG. 17.
Figure 19:
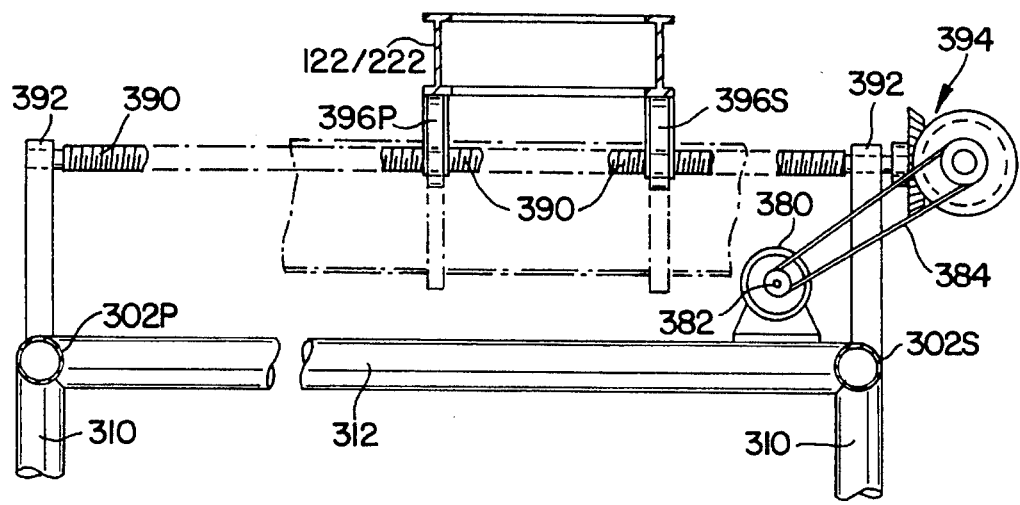

Having described the arrangements by which the pipe-conditioning unit 110/210 is capable of traversing level-wind movements, a drive system for powered operation of level-winding will now be detailed with reference to FIGS. 17, 18 and 19 which are, respectively, a schematic plan view of the level-wind drive system, a schematic starboard-side elevation of a detail of the level-wind drive system, and a schematic aft-end forward-looking transverse section of the level-wind drive system. (In FIGS. 17–19, numerous parts of the pipe-conditioning unit 110/210 are omitted so as more clearly to show essential parts of the level-wind drive system).

A rotary hydraulic motor (schematically depicted at 380) is mounted on one of the horizontal bracing members 312 of the support frame 124/224. The output shaft 382 of the motor 380 is coupled by a chain and sprocket drive 384 to a line shaft 386 mounted parallel to the upper longitudinal side member 302S on shaft bearing units 388. Four lead-screws 390a–390d are mounted transversely across the full width of the support frame 124/224 by respective pairs of bearing units 392 secured to the upper longitudinal side members 302S and 302P. Bevel gear-sets 394a–394d act as power take-offs from the line shaft 386 to drive the lead-screws 390a–390d respectively, simultaneously and conjointly with operation of the hydraulic motor 380 to rotate its output shaft 382. Four laterally-spaced pairs of lead-nuts 396 (only one pair being illustrated, in FIG. 19 only) are secured to the support carriage 122/222 to depend therefrom into operational screw-threaded contact with respective ones of the transverse lead-screws 390a–390d such that operation of the motor 380 causes the support carriage 122/222 to traverse across the support frame 124/224 in a direction and at a speed dependent on the direction and speed of rotation of the motor output shaft 382 for controlled power-driven level winding of the pipe 104/204 as it is de-spooled from the main reel 102/202 onto the pipe-conditioning unit 110/210 during pipelaying operation of the ship 100/200. (The transverse support rail and linear roller bearing support arrangement shown in chain-dash outline in FIG. 18 is similar in principle to that previously detailed with reference to FIG. 14, but different in detail).

Having already detailed the support frame 122/222, the support carriage 124/224, and the interposed traversing mechanism for level-winding the main pipe 104/204, details will now be given of the remainder of the pipe-conditioning unit 110/210, specifically of the radius controller 112/212, the pipe straightener 114/214, and subsequently of other, auxiliary pipe-conditioning and handling equipment.

Figure 20:
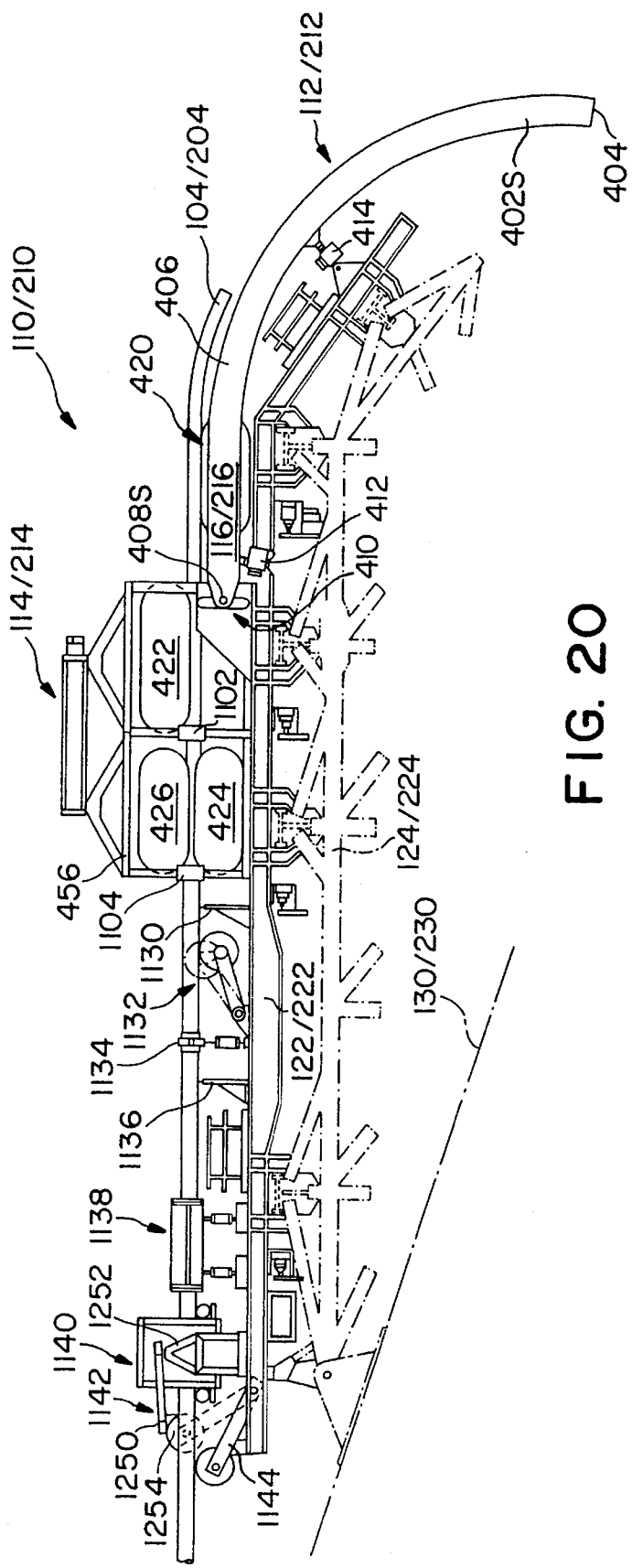
FIG. 20 is a semi-schematic starboard-side elevation of one possible arrangement of the radius controller and pipe straightener of FIG. 3 or of FIG. 6.

FIG. 20 semi-schematically depicts a starboard-side elevation of one possible arrangement of a pipe-conditioning unit 110/210 suitable for use on both the mono-reel pipelaying ship 100 and the multi-reel pipelaying ship 200. The unit 110/210 will be described principally in respect of the handling and conditioning of the main pipe 104/204, and modifications that are necessary or preferable for the simultaneous handling and conditioning of auxiliary lines will be mentioned where appropriate, such modifications generally not affecting the suitability of the FIG. 20 unit for use on both mono-reel and multi-reel ships.

In the semi-schematic form shown in FIG. 20, the radius controller 112/212 comprises side frames 402 which substantially uniformly curve from their leading (upstream) ends 404 back to an intermediate point 406 from which they continue substantially straight to trailing (downstream) end pivots 408 by which the side frames 402 are coupled to the pipe straightener 114/214. (The references to "upstream" and "downstream" relate to the direction of movement of the pipe 104/204 during de-spooling thereof from the main reel 102/202 onto and through the pipe-conditioning unit 110/210 in pipelaying operation of the ship 100/200, with "upstream" being towards the reel 102/202, and "downstream" being towards the ship's stern 108/208 over which the pipe 104/204 is laid). Transverse members (not shown in FIG. 20) and cross-braces (not shown) rigidly link the side frames 402 such that the radius controller 112/212 is a rigid unitary structure.

The trailing end pivots 408 allow the rigidly linked radius controller side frames 402 to pivot as a whole about the downstream end 116/216 of the radius controller 112/212.- The trailing end pivots 408 permit and constrain the radius controller 112/212 to a range of pivotal movement in the plane of curvature of the side frames 402 between the leading end 404 and the intermediate point 406. This plane of curvature of the side frames 402 and hence of the radius controller 112/212 as a whole is substantially vertical with respect to the nominally horizontal stern deck 130/230 to conform to the substantially vertical planes in which the pipe 104/204 is spooled on the reel 102/202 as the reel 102/202 rotates about its horizontal axis 106/206. This spooling-induced curvature of the pipe 104/204 when on the main reel 102/202 is modified by the radius controller 112/212 to a substantially uniform radius of curvature during de-spooling of the pipe 104/204 for conditioning and laying, as will subsequently be detailed.

A selectively operable bi-directional jacking mechanism 414 is interposed between the support carriage 122/222 and a portion of the radius controller 112/212 which is somewhat closer to the upstream end 404 than to the downstream end 116/216. The jacking mechanism 414 generally controls the position of the radius controller 112/212, other than at its downstream end 116/216, relative to the support carriage 122/222. The jacking mechanism 414 can be any suitable proprietary jacking unit, e.g. an electrically powered or a hydraulically powered screw jack, or a direct-acting hydraulic piston/cylinder unit, the jacking unit 414 being linked at each end respectively to the side frames 402 and to the support carriage 122/222 by any suitable arrangement, eg by horizontal pivots orthogonally aligned to the plane of curvature of the radius controller 112/212, or by deformable elastomeric couplings, or the like.

The radius controller side frames 402 support an array of transverse fixed-axis rollers 416 (not visible in FIG. 20, but shown in FIGS. 3 and 6) which support the pipe 104/204 from its point of first contact with the radius controller 112/212 until the pipe 104/204 leaves the radius controller 112/212 to enter the pipe straightener 114/214. The point of first contact of the pipe 104/204 with the radius controller 112/212 is not necessarily at the upstream end 404, and may be at any point intermediate the upstream end 404 and the intermediate point 406 (at which the radius controller 112/212 becomes tangentially straight) dependent on a number of factors, as follows:

(a) The physical characteristics of the pipe 104/204, such as its diameter, wall thickness, material, and work hardening during spooling onto the main reel 102/202;

(b) The effective distance of the pipe 104/204 from the main reel axis 106/206 as the pipe 104/204 is de-spooled, dependent on pipe diameter and the number of underlying layers (if any) of pipe 104/204 on the reel 102/202;

(c) The angle above nominal horizontal to which the support frame 124/224 of the pipe-conditioning unit 110/210 is elevated for control of the launch or exit angle at which the pipe 104/204 is laid from the ship 100/200 during pipelaying operation thereof; and (d) Longitudinal forces on the pipe 104/204 as it is de-spooled from the main reel 102/202, due at least in part to whether the main reel 102/202 is being rotationally driven or rotationally braked in the direction of de-spooling rotation about its axis 106/206, or whether the reel 102/202 is being neither driven nor braked, but allowed to rotate freely about its axis 106/206 by pulling of the pipe 104/204 thereoff during de-spooling.

From the point of first contact of the pipe 104/204 with the radius controller 112/212 and at least as far as the intermediate point 406 on the radius controller 112/212, the array of rollers 416 imposes forces on the pipe 104/204 that impart a substantially uniform radius of curvature to the length of pipe 104/204 in contact therewith, the centre of this radius of curvature lying substantially vertically beneath the radius controller 112/212. The effective radius of this imparted curvature is preferably equal to or less than the radius of the bare hub of the reel 102/202 such that whatever the actual radius of curvature of the pipe 102/202 immediately it is de-spooled, such curvature is tightened (ie the radius of curvature is reduced) or maintained in the extreme case, to provide a uniform radius of curvature of the pipe 104/204 as it enters the pipe straightener 114/214 whereby the pipe straightener 114/214 works under uniform conditions to minimise or obviate the need for on-going adjustment to produce substantially straight pipe during pipelaying operations.

Figure 35:
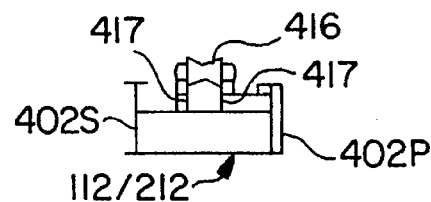
FIG. 35 is an end elevation of a pipe-supporting roller forming part of the arrangement shown in FIG. 21.

The peripheries of the rollers 416 are preferably formed as U-shape or v-shape saddles (eg as illustrated in FIG. 35), ie the rollers 416 are preferably approximately bi-conical, to assist in laterally centralising the pipe 104/204 as it passes over the rollers 416.

The array of fixed-axis rollers 416 may be replaced by an endless conveyor (not shown in FIGS. 3, 6 or 20, but subsequently detailed in connection with an alternative arrangement of the present invention).

Near the downstream end 116/216 of the radius controller 112/212, and downstream of the intermediate point 406 at which the curvature and hence the radius-controlling effect of the controller 112/212 ceases, a first track unit 420 is mounted between the side frames 402. The track unit 420 is shown only in schematic outline in FIG. 20, but is illustrated in greater detail in FIG. 21, and various embodiments are fully detailed in FIGS. 28 to 34. In essence, the track unit 420 is mechanically similar to the track unit of a track-laying vehicle (eg a tank or a bulldozer), and is here employed as a short-range linear pipe conveyor. The track unit 420 is preferably disposed and aligned to have its upper or pipe-conveying surface substantially tangential to the array of rollers 416 to provide continuity of pipe transport. The track unit 420 may be rigidly fixed between the side frames 402, or the track unit 420 may be pivotally mounted for rocking movement between the side frames 402 by means of a transverse pivot (not shown in FIG. 20, but illustrated in FIGS. 21, 28 and 31), or the track unit 420 may be slidingly mounted for overall vertical adjustment between the side frames 402 (as will be detailed with reference to FIGS. 22 and 27). In various forms of the track unit 420 subsequently detailed in this specification, the track unit 420 is unpowered and is moved in a "free-wheeling" mode by contact with the pipe which it is supporting and conveying, but it is within the scope of the invention that the track unit 420 may be power-driven and/or braked.

Within the scope of the present invention, the pipe straightener 114/214 can take any suitable form, being depicted in the present specification by way of example only as a so-called "three-roll" straightener of the type in which two spaced-apart end rolls are placed against the pipe on the inside of the curvature of the pipe to be straightened, the remaining one of the three rolls is placed against the pipe on the outside of the curvature at a point intermediate the two end rolls, and the rolls on opposite sides of the pipe are urged towards one another as the pipe passes longitudinally between them so as to exert a bending force on the pipe tending to counteract the initial curvature of the pipe.

Such a "three-roll" straightener is constituted in the arrangement shown in FIG. 20 by the first track unit 420 as the upstream-end "roll", a second track unit 422 as the intermediate "roll", and a third track unit 424 as the downstream-end "roll". The first and third track units 420 and 424 lie under the pipe 104/204, ie on the inside of the initial curvature of the pipe 104/204, while the second track unit 422 is disposed over the pipe 104/204, ie on the outside of the initial curvature of the pipe 104/204. (The fact that each of the three track units 420, 422 and 424 provides extended contact along a length of the pipe 104/204 rather than the nominal point contact of a circular "roll" does not affect the function of these track units as individual "rolls" for the purpose of pipe straightening in a "three-roll" pipe straightener).

There is in fact a fourth track unit 426 mounted above the pipe 104/204 directly opposite the third track unit 424, but the fourth track unit 426 is not a fourth "roll" for the purposes of the pipe straightener 114/214. Instead, the fourth track unit 426 functions in conjunction with the third track unit 424 as part of a pipe tension control system which will be detailed in a subsequent part of this specification. In this respect, the third track unit 424 has a dual purpose, being both part of the pipe straightener and part of the pipe tension control system.

The track units 420 and 422 are preferably mutually identical, and the track units 424 and 426 are preferably also mutually identical, with consequent benefits in their supply, installation and maintenance.

Although actually mounted on the side frames 402 of the radius controller 112/212 upstream of its downstream end 116/216, the first track unit 420 nevertheless constitutes part of the pipe straightener 114/214. In this respect, the radius controller 112/212 and, in particular, its downstream end 116/216, physically overlaps the pipe straightener 114/214. Such overlap of the radius controller with the pipe straightener will also be manifest in the subsequently detailed alternative arrangement in which the first track unit 420 is substituted by a sternwards (downstream-directed) extension of the endless pipe conveyor optionally replacing the array of fixed-axis rollers 416, where this extension of the pipe conveyor of the radius controller functionally serves as the first "roll" of the "three-roll" pipe straightener since the same functional effects of pipe straightening pertain.

In any event, such exemplary pipe straightening arrangements could alternatively be considered as "two-roll" straighteners without affecting the scope of the present invention since the precise location of the upstream pipe reaction point of the straightener is not of substantive consequence provided that the requisite pipe straightening function obtains from the provision of at least three spaced-apart reaction points.

The pipe straightener 114/214, shown in FIG. 20 within the context of the overall pipe-conditioning unit 110/210, is shown separately and still semi-schematically but in somewhat greater detail in FIG. 21 (enlarged-scale starboard-side elevation) and FIG. 22 (plan view from above of the FIG. 21 arrangement), together with the contiguous or overlapping downstream end of the adjacent radius controller 112/212.

The first track unit 420 basically comprises a frame 430 rotatably supporting an upstream-end roller 432 and a downstream-end roller 434 on which an endless chain 436 is mounted. As schematically depicted in FIGS. 21 and 22, the chain 436 is surmounted by V-blocks 438 to provide a suitable pipe contacting and supporting arrangement for the pipe 104/204 as it is conveyed by the track unit 420. The track unit frame 430 is mounted on transverse pivots 440 to allow the track unit 420 as a whole to rock between the radius controller side frames 402 and so conform more readily to transient variations in the curvature of the pipe 104/204 as it comes out of the radius controller 112/212 on the rollers 416 (only the most downstream one of which is illustrated in FIGS. 21 and 22). (This pivotal mounting of the track unit 420 is optional, and additional or alternative track unit mounting arrangements will be subsequently detailed).

In a structure essentially identical to that of the first track unit 420, the second track unit 422 correspondingly comprises a frame 442 rotatably supporting an upstream-end roller 444 and a downstream-end roller 446 on which an endless chain 448 is mounted, the chain 448 being surmounted by V-blocks 450. The track unit frame 442 is mounted on transverse pivots 452 which are coupled through respective hydraulic linear thrusters 454 to the straightener frame 456 which is rigidly secured to the support carriage 122/222. (The function of the thrusters 454 will be detailed subsequently). The track unit 422 is constrained by vertical guides 458 for purely vertical movement within the straightener frame 456, the track unit 422 thereby being constrained against longitudinal and transverse movements within the pipe straightener 114/214. (In this context, the term "vertical" means a direction generally at right angles to the centreline of a proximate length of the pipe 104/204 in a truly vertical plane including this proximate length of the pipe 104/204; this so-called "vertical" direction is displaced from true vertical by about the angle of elevation of the support frame 124/224 above nominal horizontal).

The basic structure of the third track unit 424 differs from that of the first and second track units 420 and 422 in comprising four direct-coupled low-speed high-torque hydraulic motors 460 (also usable as hydraulic pumps for dynamic braking), but otherwise similarly comprises a frame 462 rotatably supporting an upstream-end sprocket assembly 464 and a downstream-end sprocket assembly 466 which mount and couple to an endless chain assembly 468 surmounted by pipe-engaging V-blocks 470. Two of the motors 460 directly drive the sprocket 464 and the other two of the motors 460 directly drive the sprocket 466 such that the four motors 460 collectively drive the chain 468 and the array of V-blocks 470. The frame 462 is mounted by transverse pivots 472 for limited rocking movement of the track unit 424 as a whole within the straightener frame 456, but the track unit 424 is in all other respects fixed in its position within the pipe straightener 114/214. (In respect of the track unit 426, the term "vertical" has the same qualified meaning as it does in the context of the track unit 422).

Directly above the third track unit 424 is the structurally similar (and preferably identical) fourth track unit 426 which is likewise driven or braked by four direct-coupled low-speed high-torque hydraulic motors 474 (doubling as braking pumps) coupled in pairs respectively to an upstream-end sprocket assembly 476 and a downstream-end sprocket assembly 478 rotatably mounted in a track unit frame 480. The sprocket assemblies 476 and 478 mount and couple to an endless chain assembly 482 surmounted by pipe-engaging V-blocks 484. The track unit frame 480 is mounted on transverse pivots 486 which are coupled through respective linear thrusters 488 (for a purpose detailed below) to the straightener frame 456. The track unit 426 is constrained by vertical guides 490 for purely vertical movement within the straightener frame 456, the track unit 426 thereby being constrained against longitudinal and transverse movements within the pipe straightener 114/214.

In pipelaying operation of the ship 100/200, the support frame 124/224 is elevated to an angle above nominal horizontal appropriate to the requisite launch angle of the pipe 104/204 over the ship's stern 108/208 (dependent, inter alia, on the depth of the sea-bed at the pipelaying location) by suitable positioning of the base 140/240 of the jacking truss 136/236 along the deck rails 144/244 (see FIGS. 3 and 6). (In the event that the requisite launch angle exceeds that obtainable by maximal elevation of the support frame 124/224, the pipelay stinger described below with reference to FIGS. 23 to 26 comes into use to provide an effective increase in the pipe launch angle, as will subsequently be detailed). The pipe 104/204 is de-spooled from the main reel 102/202, fed over the radius controller 112/212, and then through the pipe straightener 114/214, eventually to leave the downstream end of the pipe-conditioning unit 110/210 and be launched over the ship's stern 108/208 (see FIGS. 1 and 4). In its passage over the curved array of fixed-axis rollers 416 on the radius controller 112/212, the pipe 104/204 has a substantially uniform radius of curvature imparted thereto in its passage over that part of the radius controller 112/212 from the first point of contact up to about the intermediate point 406 on the radius controller 112/212 (see FIG. 20).

In its subsequent passage through the pipe straightener 114/214, the second track unit 422 exerts a downward force on the uniformly curved pipe 104/204, this downward force being reacted by upward forces exerted on the pipe 104/204 by the first and third track units 420 and 424 which are located respectively upstream and downstream of the intermediate (second) track unit 422 (see FIGS. 21 and 22).

Bending force control is effected by suitably pressurising the linear thrusters 454 to cause the second track unit 422 to exert a downward force on the pipe 104/204 tending to cause bending of the pipe 104/204 with a magnitude substantially equal to but in a direction substantially exactly opposite to the curvature imparted to the pipe 104/204 by the prior conditioning effect of the radius controller 112/212, resulting in net cancellation of curvature and straightening of the pipe 104/204 to condition the pipe 104/204 for laying as a pipeline.

A limited range of pivoted adjustment of the radius controller 112/212 about its downstream end pivots 408, relative to the support carriage 122/222, is achievable by selective operation of the jacking unit 414; such pivotal adjustment causes little or no change in the effective position of the radius controller downstream end 116/216 relative to the pipe straightener frame 456.

The mutually opposed third and fourth track units 424 and 426 grip the pipe 104/204 therebetween with a force established by controlled hydraulic pressurisation of the linear thrusters 488 acting directly on the upper (fourth) track unit 426, the thrust being reacted by the lower (third) track unit 424. This grip on the pipe 104/204 enables the track unit hydraulic motors 460 and 474 to be hydraulically energised to pull the pipe 104/204 off the main reel 102/202 into and through the pipe conditioning unit 110/210 under conditions of substantially controlled longitudinal tension in the pipe 104/204, ie the pair of track units 424 and 426 serve as a pipe tension control system, with the track unit 424 simultaneously serving the dual function of the third "roll" or third reaction point in the "three-roll" or three-reaction-point pipe straightener 114/214.

As progressively increasing lengths of the pipe 104/204 are launched over the ship's stern 108/208, a progressively increasing weight of launched pipe 104/204 will be hanging in mid-water downstream of the pipe tension control system constituted by the track units 424 and 426. This progressively increasing weight of launched pipe increasingly drags the pipe 104/204 in the direction of initial motoring of the track units 424 and 426. To avoid excessive tension on the de-spooling pipe 104/204 between the reel 102/202 and the pipe-conditioning unit 110/210 and/or to avoid excessive linear speed of the de-spooling pipe 104/204, motoring operation of the track unit motors 460 and 474 can be more or less gradually switched to dynamic braking operation, eg by running the motors 460 and 474 as open-circuit or closed-circuit hydraulic pumps with output flow throttling to permit back-pressure braking operation thereof.

The thrusters 454 are designed or selected such that their pressurisation ability and their output force capacity are at least adequate for the production of requisite pipe-straightening forces.

The thrusters 488 are designed and selected such that their pressurisation ability and their output force capacity are at least adequate for the production of requisite pipe-gripping forces, preferably without potentially pipe-damaging slippage of the pipe-engaging V-blocks 470 and 484 on the periphery of the pipe 104/204.

The thrusters 454 and 488 are preferably further designed or selected such that their ranges of functional movement are at least adequate to cope with variations in the outside diameter of pipe laid in different operations of the ship 100/200, from a minimum diameter to a maximum, eg from about 4 inches (100 millimeters) to about 16 inches (400 millimeters). (In any given pipelaying operation, the outside diameter of the main pipe 104/204 is normally substantially constant, but the scope of the present invention does not exclude variations in outside diameter due to variations in the outside diameter of the pipe per se and/or due to variations in the thickness of a coating applied thereto).

Auxiliary items of pipe-conditioning equipment in the pipe-conditioning unit 110/210 downstream of the pipe straightener 114/214 (as illustrated in FIGS. 3, 6 and 20) will be described subsequent to the following description of a pipelay stinger utilised in conjunction with the pipe-conditioning unit 110/210, since such auxiliary items are optional with regard to the principal aspects of the present invention and may also be employed in alternative forms of pipe-conditioning unit. Adaptations or modifications of the pipe-conditioning units from single-reel operation to suit multi-reel operation will also be subsequently described.

Figure 23:
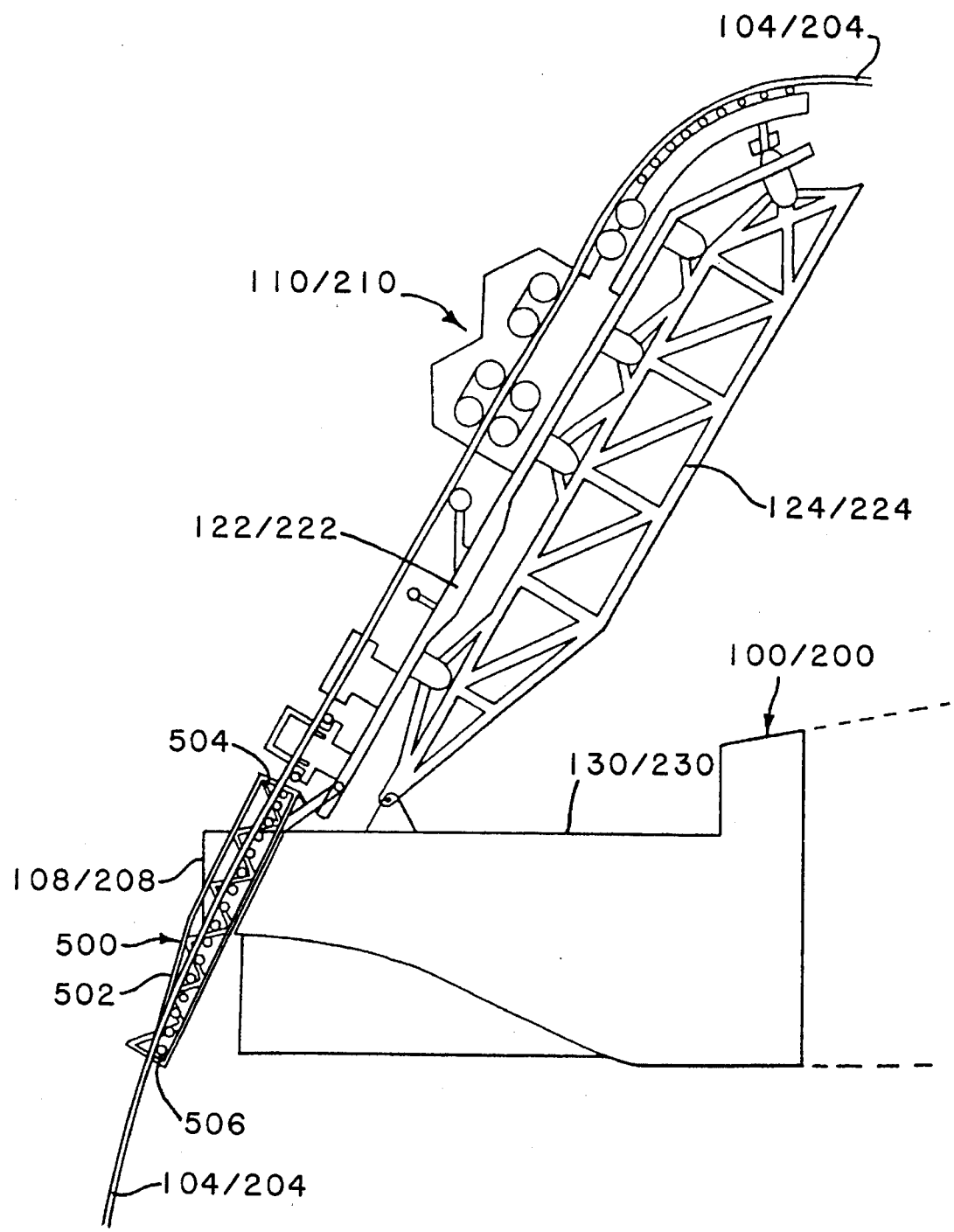
FIG. 23 is a schematic starboard-side elevation of the radius controller and pipe straightener of FIG. 20, in operative association with a pipelay stinger.
Figure 24:
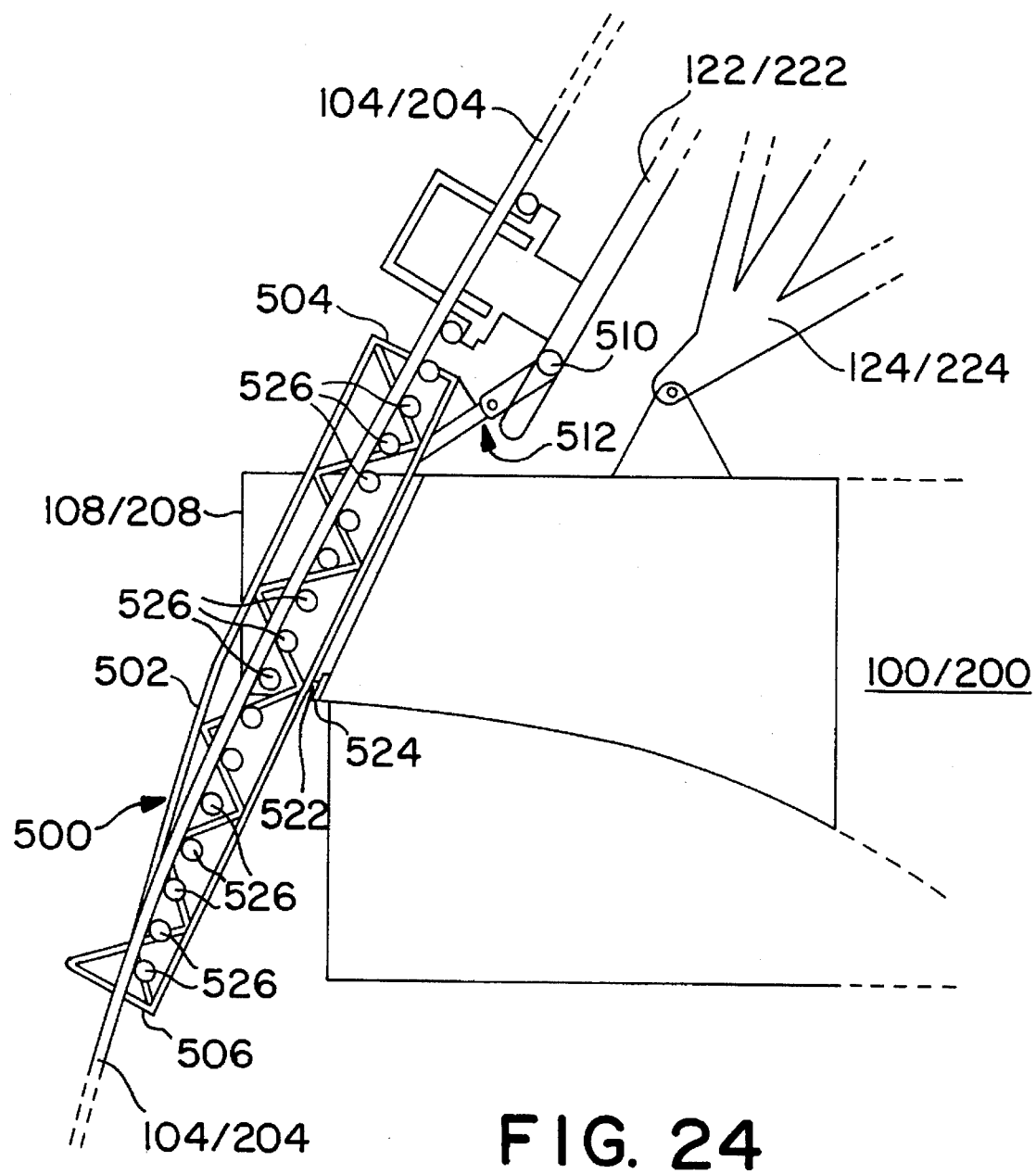
FIG. 24 is a detail of FIG. 23, to an enlarged scale.

Progressing now to FIGS. 23 and 24, these drawings schematically depict a starboard-side elevation of a form of pipelay stinger unit 500 suitable for use in either the single-reel pipelaying ship 100 (FIGS. 1 and 2) or the multi-reel pipelaying ship 200 (FIGS. 4 and 5) in conjunction with the above-described pipe-conditioning unit 110 or 210, respectively.

FIG. 23 shows the pipelay stinger unit 500 in its overall relationship to the pipe-conditioning unit 110/210 and to the stern 108/208 of the ship 100/200, while FIG. 24 is an enlarged-scale detail of part of FIG. 23 showing the stinger unit 500 together with immediately adjacent parts of the downstream end of the pipe-conditioning unit 110/210 and of the ship's stern 108/208.

The stinger unit 500 is a cantilever structure comprising two lattice-form Side girders 502P and 502S which extend longitudinally from the upstream (forward) end 504 of the unit 500 to the downstream (aft) end 506 of the unit 500. Transverse beams 508 (FIG. 26) distributed along the length of the stinger unit 500 rigidly link the side girder 502P with the side girder 502S to form a rigid cantilever structure capable of sustaining substantial static and dynamic loads, including those due to weight of the pipe 104/204, level-wind movements, and sea currents.

Figure 25:
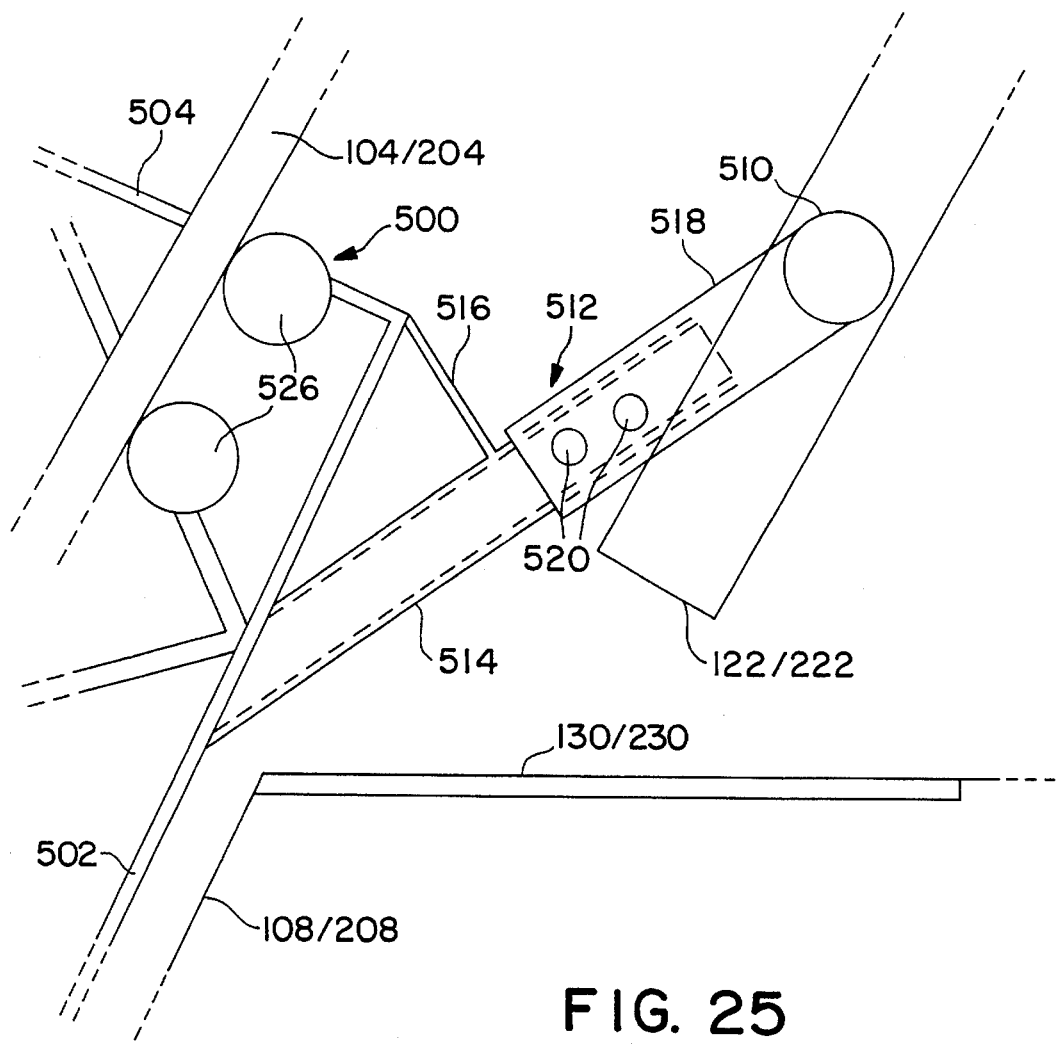
FIGS. 25 and 26 are respectively a schematic starboard-side elevation and a schematic transverse section of the pipelay stinger forming part of the arrangement shown in FIG. 23.

The stinger unit 500 is articulated at its upstream end 504 to the downstream end of the support carriage 122/222 for pivotting movement about a horizontal axle 510 thereon as detailed to a much-enlarged scale in FIG. 25. Linkage of the stinger unit 500 to the axle 510 is by means of a laterally spaced pair of telescopic arm assemblies 512 extending forwardly and upwardly from the stinger upstream end 504 to the axle 510. Each of the arm assemblies 512 comprises a square tubular arm 514 rigidly attached to a respective one of the side girders 502 and stayed thereto by a respective strut 516. Each of the arms 514 telescopes inside a square tube 518 mounted on the axle 510. Each of the arms 514 is anchored at a normally fixed position inside the respective tube 518 by means of a pair of lateral through pins 520, or by any other suitable fastener means. These articulating arm assemblies 512 support the pipelay stinger unit 500 on the downstream end of the support carriage 122/222 and carry the stinger unit 500 laterally across the ship's stern 108/208 as the support carriage 122/222 undergoes the previously detailed level-wind traversing movements across the support frame 124/224. The capability of horizontal pivotting movement about the horizontal axle 510 allows the stinger unit 500 to depend at a substantially constant angle over the ship's stern 108/208 as the support frame 124/224 undergoes changes in its elevation angle.

The pipelay stinger unit 500 is further supported against the ship's stern 108/208 by means of laterally spaced sets of linear rollers 522 (FIG. 24) mounted on the undersides of the side girders 502 and bearing against a flat steel strip 524 mounted transversely across the ship's stern 108/208. The linear roller sets 522 provide additional support for the stinger unit 500 during traversing level-wind movements of the support carriage 122/222.

Removal of the pins 520 from the arm assemblies 512 permits the pipelay stinger unit 500 to be detached from the support carriage 122/222 and removed from its normal operating position (which is illustrated in FIGS. 23 to 25).

Figure 26:
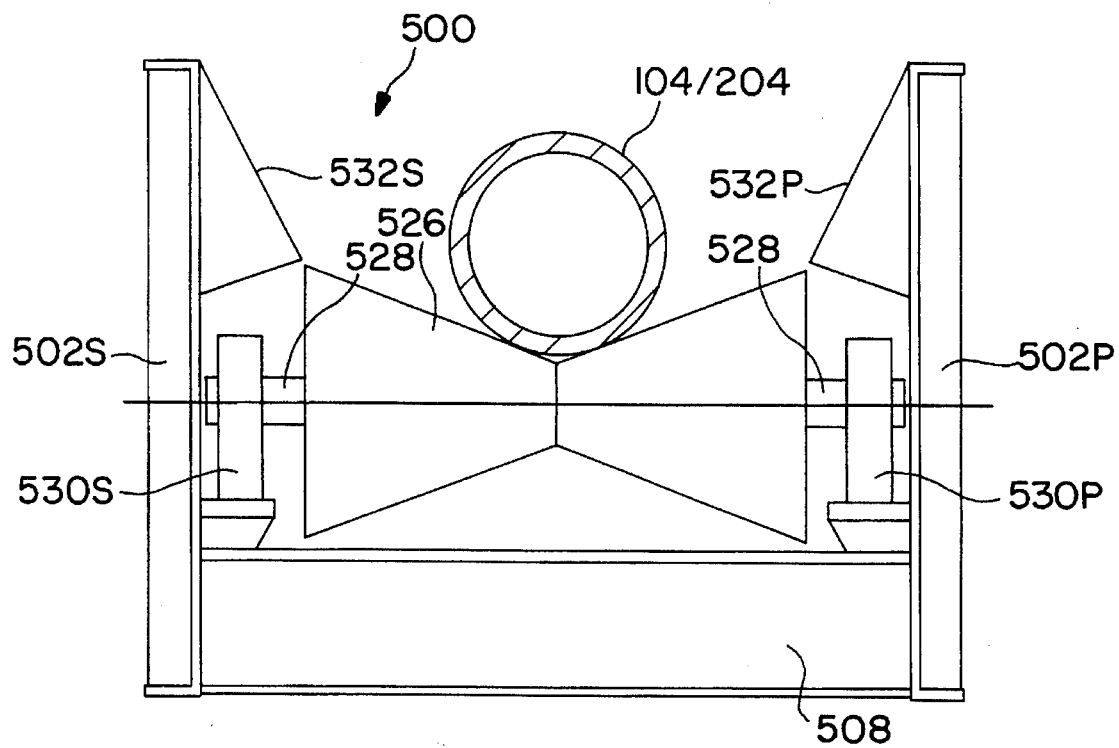

FIG. 26 is a transverse section (to an enlarged scale) of the pipelay stinger unit 500 at a point therealong selected to show the typical structure of the unit 500. It will be seen from FIG. 26 that the structural combination of the side girders 502P and 502S with the transverse beams 508 gives the stinger unit 500 a generally U-shaped section. Within and towards the lower side of this U-shaped section, the stinger unit 500 mounts a longitudinally distributed array of pipe-supporting rollers 526. Each of the rollers 526 is V-shaped or bi-conical and is mounted on a respective transverse horizontal axle 528 rotatably carried on roller axle mountings 530 between the side girders 502P and 502S. The rollers 526 may be formed of plastics-coated steel.

As shown in FIG. 26, the rollers 526 support the pipe 104/204 during laying thereof against static and dynamic vertical loadings exerted thereby against the stinger unit 500, together with support against limited lateral loadings. Greater lateral loadings tending to displace the pipe 104/204 laterally off the rollers 526 are countered by side-girder-mounted lateral deflector plates 532 on each side of each roller 526. The lateral deflector plates 532 may be substituted by upright-axis rollers (not illustrated).

It is of particular significance that the array of pipe-supporting rollers 526 does not form a straight line along the length of the stinger unit 500 from its upstream end 504 to its downstream end 506, but instead form a curve which is concave downwards and forwards (with respect to normal forward motion of the ship 100/200 in pipelaying operation thereof), ie the curved array of pipe-supporting rollers 526 present pipe-supporting contact points to the pipe 104/204 which collectively support the pipe 104/204 at elevation angles which progressively vary from a relatively lesser elevation angle adjacent the upstream end 504 to a relatively greater elevation angle adjacent the downstream end 506 for a given inclination of the stinger unit 500. The curvature of the array of pipe-supporting rollers 526 in a given form of the pipelay stinger unit 500 will be selected to increase the effective launch angle of the pipe 104/204 from the angle at which it leaves the downstream end of the pipe-conditioning unit 110/210 at the maximum elevation angle of the support frame 124/224 thereof and tangentially enters the upstream end 504 of the stinger unit 500, to a greater effective launch angle as the pipe 104/204 exits the downstream end 506 of the stinger unit 500, and is ideally optimised to obviate excessive stresses on the pipe 104/204 as it passes down through the stinger unit 500. For example, in the case where the maximum elevation of the support frame 124/224 gives an effective launch angle of about 60°, the curvature of the array of pipe-supporting rollers 526 in the pipelay stinger unit 500 can be designed to make the final pipe launch angle substantially closer to 90°, ie a near-vertical launch angle for deep-water pipelaying operations of the ship 100/200 which is thereby modified for pipelaying operations in greater water depths than its inherent capabilities in the absence of the pipelay stinger unit 500.

(For pipelaying operation in shallower water, e.g. at the beginning and/or end of a deep-water pipelaying operation, the elevation of the pipe-conditioning unit 110/210 will be lowered below its maximum elevation, and the pipe 104/204 leaving the downstream end of the pipe-conditioning unit 110/210 will then pass over the stinger unit 500 (resting at a virtually constant angle because of its articulation on the axle 510) without touching the array of rollers 526, or with the pipe 104/204 supported only on relatively small number of the rollers 526 at the upstream end 504 of the stinger unit 500).

During a pipelaying operation intended to utilise the pipelay stinger unit 500 during at least part of such operation, the point along the length of the stinger unit 500 at which the pipe 104/204 is actually departing from the array of pipe-supporting rollers 526 can be monitored in real time by the provision of pressure switches (not shown) or load cells (not shown) or other suitable devices disposed to sense the loadings on individual ones of the rollers 526 (eg by being incorporated into suitable forms of the roller axle mountings 530). Electrical signals from these load sensing devices can be transmitted to the ship's bridge 162/262 and/or to the ship's main control computer to facilitate pipe tension control, thus, for example, to detect an increase in pipe tension causing the pipe 104/204 to lift off support rollers 526 adjacent the downstream end 506 of the stinger unit 500.

The lateral deflector plates 532 may be similarly fitted with load sensing devices for monitoring the lateral position of the pipe 104/204 on the stinger unit 500.

As an alternative to the use of a longitudinally curved array of pipe-supporting rollers 526, the rollers can be substituted by a pipe-supporting conveyor (not illustrated in FIGS. 23 to 26, but subsequently detailed with reference to FIGS. 28 to 34). Such a conveyor would attend the length of the stinger unit 500 from a point adjacent its upstream end 504 to a point adjacent its downstream end 506, and at least the upper parts of the conveyor which directly support the pipe 104/204 would be curved in aggregate to provide a collective pipe-supporting function supporting the pipe 104/204 with an overall curvature which is identical to or functionally equivalent to the above-described curvature of the array of pipe-supporting rollers 526. As will be subsequently described, such a pipe-supporting conveyor preferably has the form of an endless chain of pipe-supporting elements which conveniently slide or more preferably are roller-supported on a suitably curved conveyor support surface forming part of the structure of the stinger unit 500. Such a conveyor may be a passive assembly moving in a "free-wheeling" mode, or the conveyor assembly may alternatively be associated with motors and/or brakes to be dynamically driven and/or braked.

Generally speaking, the stinger is designed to increase the departure angle of the pipeline beyond the maximum angle of inclination of the support frame 124/224 to a desired value depending on particular project conditions. This desired angle can be up to 90 degrees. The length and curvature of the stinger determine the final departure angle of the line, the curvature being optimised such that the pipeline supporting elements on the stinger (ie either the rollers illustrated or the conveyor elements in the alternative discussed above) are set to define a curvature which provides the best uniform support to the pipeline. The curvature of the stinger is not necessarily part-circular in configuration.

Whether fitted with a curved array of pipe-supporting rollers or a curved pipe-supporting pipe conveyor, the effective curvature of a given pipelay stinger unit 500 may be adjustable or may be substantially invariable. In the latter case, a plurality of pipelay stinger units having mutually different curvatures may be provided for a reel pipelaying ship in accordance with the present invention in order to make available for any given pipelaying operation a stinger unit having a curvature optimised for stinger duties requisite to that pipelaying operation. The curvature may be made adjustable by providing for the positions of the support rollers (or the idler rollers or corresponding support elements in a conveyor system as discussed above) to be varied along an axis substantially normal to the path of the pipe. A stinger having a given curvature functions over a range of departure angles by adjusting the lay tension of the line. Shorter stingers are relatively easy to handle, but are generally designed only for a particular project. In general, the stinger will only function with the support frame at its maximum angle of elevation, and is preferably dismounted when not required.

Figure 27:
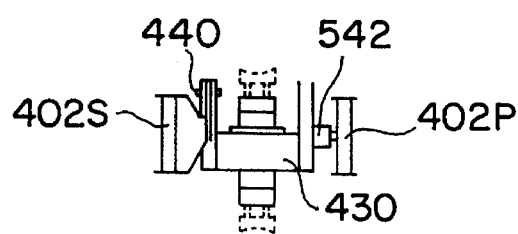
FIG. 27 is a transverse section of a track unit forming part of the arrangement shown in FIG. 21.

In the pipe-conditioning units 110/210 (FIGS. 20 and 21), the first track unit 420 may be pivotally mounted on transverse pivots 440 for rocking movement between the radius controller side frames 402; the first track unit 420 may additionally or alternatively be mounted for substantially vertical movement between the side frames 402 as will now be described with reference to FIG. 22 and 27, FIG. 27 being a schematic transverse cross-section of the modification taken on the line XXVII to XXVII in FIG. 21. In this modified form of the track unit 420, the unit 420 is pivotally mounted by way of its transverse pivots 440 (or alternatively the unit 420 is rigidly mounted) on a cradle frame 540 which is constrained for substantially vertical movement between the radius controller side frames 402 by means of substantially vertical guides 542 secured on the inside faces of the side frames 402, the track unit 420 thereby being constrained against longitudinal and transverse movements within the radius controller 112/212. (In this context, the term "vertical" means a direction generally at right angles to the centreline of a proximate length of the pipe 104/204 in a truly vertical plane including this proximate length of the pipe 104/204; this so-called "vertical" direction is displaced from true vertical by about the angle of elevation of the support frame 124/224 above nominal horizontal together with the angle of pivotal adjustment of the radius controller 112/212 relative to the support carriage 122/222 by pivoting of the radius controller 112/212 about its downstream end pivots 408 under the control of the jacking mechanism 414). Such "vertical" movement of the cradle frame 540 and hence of the track unit 420 between the radius controller side frames 402 is controlled by any suitable means (not shown), for example by means of linear hydraulic thrusters similar to the linear hydraulic thrusters 454 and 488 employed to control respective equivalent movements of the track units 422 and 426 relative to the straightener frame 456.

Figure 28:
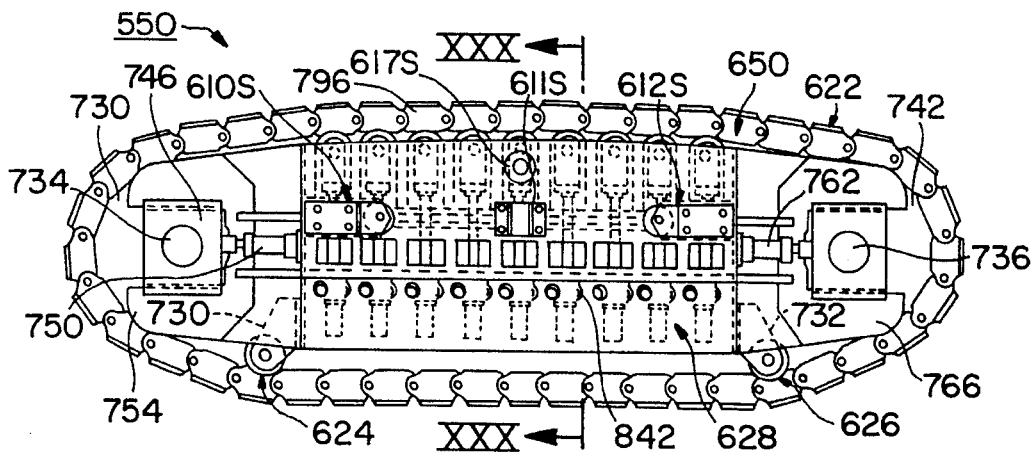
FIGS. 28, 29 and 30 are respectively a side elevation, a plan view (with peripheral components removed), and a transverse section of one form of a track unit capable of forming part of the arrangements shown in FIGS. 20 and 23.
Figure 29:
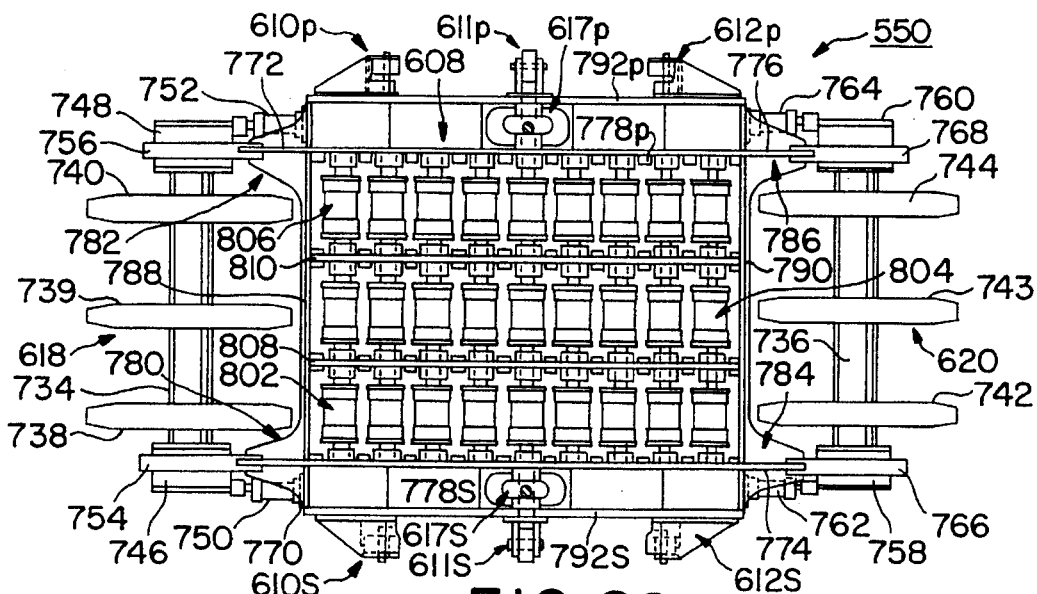
Figure 30:
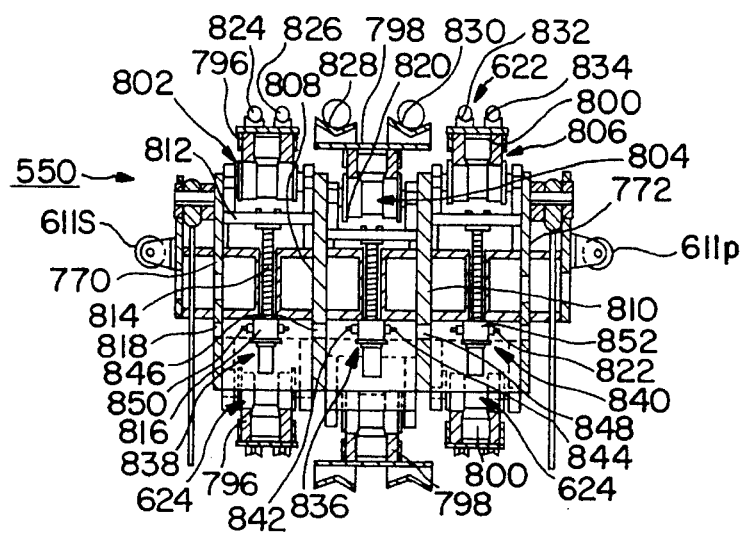

Referring now to FIGS. 28, 29 and 30, these show views of a form of track unit 550 suitable for use in place of the track units 420 and 422 detailed earlier in this specification. By way of example, the track unit 550 is adapted (as detailed below) for the simultaneous contact with and straightening in conjunction with other track units of the pipe straightener) of two equal-sized main pipes, and four mutually-equal-sized auxiliary pipes of lesser outside diameter than the two main pipes.

The track unit 550 is generally similar to (though different in detail from) the track units 420 and 422 in comprising a frame or carriage 608 rotatably mounting sprockets or rollers 618, 620 at each end and carrying an endless chain or track 622 surmounted by pipe-engaging/line-engaging V-blocks or pads 824 to 834, as will now be detailed with particular reference to FIGS. 28 to 30.

Guide rollers 610$p$, 611$p$ and 612$p$ are rotatably mounted on the port side of the carriage 608 in a position to contact port-side internal guides (not shown) in the radius controller, while further guide rollers 610$s$, 611$s$ and 612$s$ are rotatably mounted on the starboard side of the carriage 608 to contact equivalent starboard-side internal guides (not shown). Operation of the track unit hydraulic adjustment rams (not shown, but similar to the thrusters 454 and 488 in FIG. 21) permits both sliding and pivotal adjustment of the track unit 550 with respect to the upper and lower internal guides. The hydraulic ram pistons are pivotally connected to the port and starboard sides of the main carriage 608 via connections 617$p$ and 617$s$. Sprocket wheel sets 618 and 620 are rotatably mounted in bearings at both ends of the main carriage 608 for supporting a corresponding series of tracks 622, each in the form of an endless chain. Adjustable roller sets 624 and 626 are mounted on the underside of the main carriage 608 on hydraulic cylinder mounts 625 and 627, respectively, for additionally supporting the return legs of the series of tracks 622.

The track unit 550 has an idler assembly generally designated as 628 which provides a series of idler roller sets which force the flexible chain tracks 622 into contact with the main pipes and the array of auxiliary operational lines. The track return leg support rollers 624 and 626 are mounted by fixed brackets 730 and 732. Static tension is exerted on the tracks 622 by the sprocket wheel sets 618 and 620 which are integrally mounted on axles 734 and 736, respectively, at either end of the track unit 550. The sprocket wheel set 618 comprises transversely spaced sprocket wheels 738, 739 and 740 which are mounted on axle 734. The sprocket wheel set 620 comprises transversely spaced sprocket wheels 742, 743 and 744 which are mounted on axle 736. Axle 734 is mounted in a bearing housing 746 on the starboard side and in bearing housing 748 on the port side. These bearing housings 746 and 748 are adjustable linearly outwardly from the carriage 608 by means of hydraulic cylinders 750 and 752, respectively. The bearing housings 746 and 748 are slidably mounted in fixed C-brackets 754 and 756, respectively. Identical bearing housings 758 and 760 are provided on the opposite end of the main housing 628 for rotatably mounting axle 736 and these are slidably adjusted by hydraulic cylinders 762 and 764, respectively, within the C-brackets 766 and 768. The C-brackets 754, 756, 766 and 768 are slidably mounted on respective extensions 770, 772, 774 and 776 of the starboard side plate 778$s$ and of the port side plate 778$p$. Reinforcements 780, 782, 784 and 786 are also provided for the C-brackets 754, 756, 766 and 768 respectively.

Operation of the hydraulic cylinders 750, 752, 762 and 764 permits tensioning of the assembly of chain tracks 622 about the main track carriage frame 628. This frame 628 consists of sides 788 and 790 which are joined to the starboard and port side walls 778$s$ and 778$p$ in order to complete a box frame structure. Starboard and port side mounting brackets 792s and 792p are also attached to the main frame 628.

The guide roller assemblies 610s, 611s and 612s are attached to the mounting bracket 792s, and similarly the guide roller assemblies 610p, 611p and 612p are mounted on the port side bracket 792p. Thus, movement of the track unit 550 toward and away from the pipeline array is provided for by operation of the track unit hydraulic adjustment rams. The piston rod connection mounts for the hydraulic rams are denoted as 617s and 617p and are formed in the carriage side walls 778s and 778p and also in the mounting brackets 792s and 792p in a centrally disposed location close to the pipeline contacting position.

The use of only two guide roller assemblies on either side of the track unit 550 which are spaced from the force plane in which the track unit hydraulic adjustment rams function permits a slight rocking motion of the track unit 550 as required to adjust to various pipeline diameters and auxiliary line array configurations. This rocking motion is in addition to the primary sliding, linear "vertical" movement of the track unit 550 due to operation of the hydraulic adjustment rams.

As shown in FIGS. 29 and 30 the three pairs of main sprocket wheels in the sprocket wheel sets 618 and 620 are positioned laterally across the track unit 550 and are spaced from one another along the respective axles 734 and 736. Each of these pairs of sprocket wheels supports a separate chain 796, 798 and 800 as particularly shown in FIG. 30. When placed about the track unit 550, the chain 796 then contacts sprocket gears 738 and 742 (as well as idler support rollers 624 and 626 on the underside of the track unit 550). The upper side of the track unit 550 comprises three mutually parallel longitudinal rows of idler rollers 802, 804 and 806, each row containing a series of nine longitudinally-spaced idler rollers which are slidably mounted within the box frame of the main carriage 608. Mounting of the idler set 802, as well as of the parallel idler sets 804 and 806, is effected by placing partition walls 808 and 810 parallel to the side walls 778s and 778p within the carriage frame 628 in order to divide the same into three compartments. The idler roller sets 802, 804 and 806 are then slidably mounted within these three compartments.

FIG. 30 shows one of the idlers in the set 802 mounted on a mounting frame 812 which is slidably mounted between side wall 770 and partition wall 808. The mounting frame 812 is connected to an adjustment screw 814 which is in turn controlled by a jactuator 816 which can be adjusted from a side port 818 in order to move the carriage 812 relative to the main carriage housing walls. These walls 770, 808, 810 and 772 together with the spacer walls 820 and 822 form the support assembly for the idler sets 802, 804 and 806.

Each of the idlers in the idler sets 802, 804 and 806 is similarly provided with an adjustment screw and a jactuator for adjusting the position of the idlers in order to contact the operational lines array with pipeline support pads or V-blocks 824, 826, 828, 830, 832 and 834 mounted on the chains of the tracks 622 as particularly shown in FIG. 30. This individual adjustability feature for each idler roller in the sets 802, 804 and 806 then permits various curvatures to be established for each of the operational lines in the array.

If desired, the pipeline support pads 824 to 834 can be joined into a single transverse pad extending across the width of the array of operational lines when mutually different curvatures between the operational lines are not needed.

The set of jactuators 836 which adjust the position of the middle set of idlers 804 are longitudinally offset from the jactuator set 838 (of which jactuator 816 is shown in FIG. 30) and the jactuator set 840 which adjusts the idler set 806. The conversely offset positioning of the jactuator operators 842 and 844 with respect to the middle set of jactuators 836 then permits adjustment of this middle set of jactuators 836 through the openings 846 and 848. The two outer sets of jactuators 838 and 840 are adjusted by the operators 850 and 852 as shown in FIG. 30.

Figure 31:
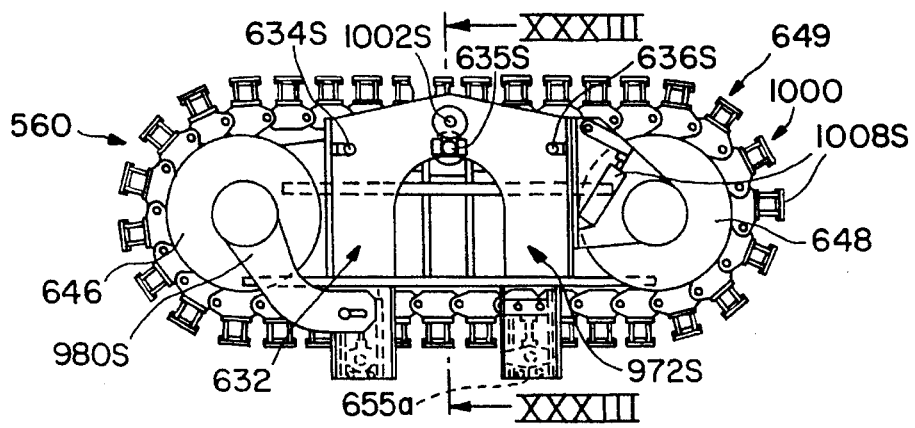
FIGS. 31, 32 and 33 are respectively a side elevation, a plan view (with peripheral components removed), and a transverse section of another form of track unit capable of forming part of the arrangements shown in FIGS. 20 and 23.
Figure 32:
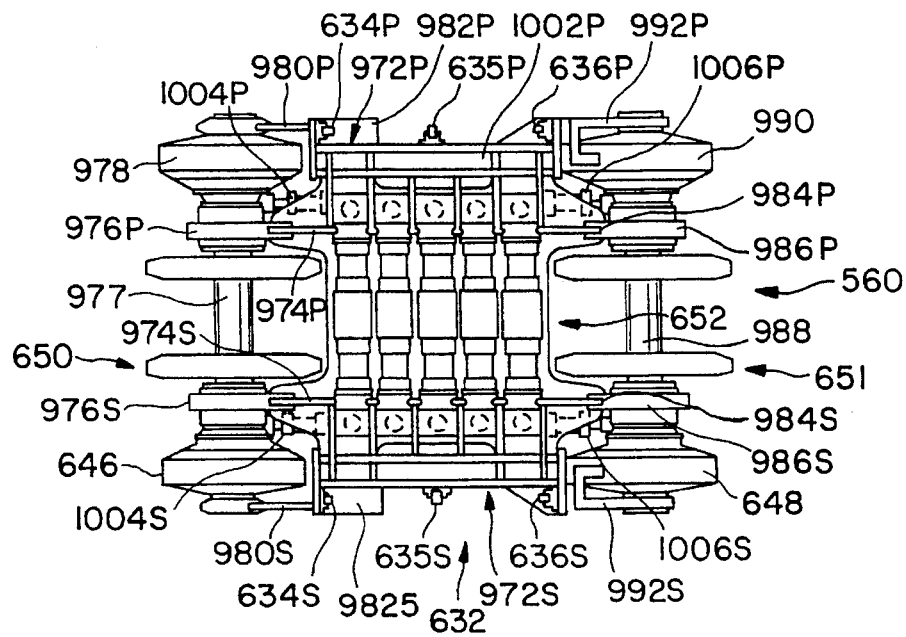
Figure 33:
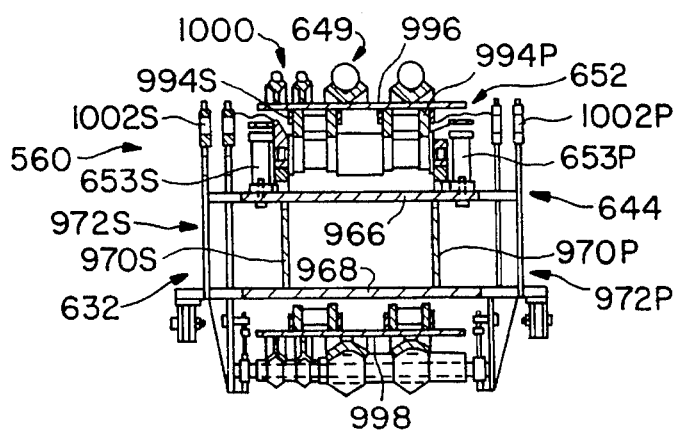

Referring now to FIGS. 31, 32 and 33, these show views of a form of track unit 560 suitable for use in place of the track units 424 and 426 detailed earlier in this specification. By way of example, the track unit 560 is adapted (as detailed below) for simultaneous contact with and straightening (when part of the pipe straightener, and in conjunction with the other track units thereof) and/or tensioning (when part of the pipe tensioning system, and ill conjunction with the other track unit thereof) of two equal-sized main pipes, and two mutually-equal-sized auxiliary pipes of lesser outside diameter than the two main pipes.

The track unit 560 is generally similar to (though different in detail from) the track units 424 and 426 in comprising a frame or carriage 632 rotatably mounting rollers or sprockets 650, 651 at each end and carrying an endless chain or track 649 surmounted by pipe-engaging/line-engaging V-blocks or pads 1000, as will now be detailed with particular reference to FIGS. 31 to 33. (In FIG. 32, the pipe-engaging chain tracks are omitted for clarity).

In the track unit 560, the main carriage 632 consists primarily of an upper plate 966 and a lower plate 968 which are spaced by an internal starboard wall 970s and an internal port wall 970p. Starboard and port track unit mounting brackets 972s and 972p are positioned in a longitudinally central location as shown in FIGS. 31 and 32. These brackets 972s and 972p consist of inner and outer spaced inverted U-shaped members which are connected to extensions of the spaced upper and lower plates 966 and 968.

FIG. 32 shows downstream mounting extensions 974s and 974p for mounting associated bearing housings 976s and 976p. A downstream-end driven axle 977 is rotatably mounted within these bearing housings 976s and 976p, and hydraulic motors 646 and 978 are provided on either end thereof in order to supply rotational power to the axle 977 (or alternatively to exert dynamic braking on the axle 977). Motor torque reaction levers 980s and 980p are fixed to extensions 982s and 982p of the mounting brackets 972s and 972p to anchor the motor stators against rotation. Similar upstream mounting extensions 984s and 984p are provided for mounting bearing housings 986s and 986p for providing rotational support for an upstream-end driven axle 988 which is in turn rotated by hydraulic motors 648 and 990 which have motor torque reaction levers 992s and 992p similarly fixed to extensions of the mounting brackets 972p and 972s on either side of the main carriage 632 to anchor the respective motor stators against rotation.

The hydraulic motors 646, 648, 978 and 990 are thus arranged to rotate the driven axles 977 and 988 in order to rotate respective sprocket wheel sets 650 and 651 about which endless chain track sets 649 are positioned. As shown in FIGS. 31 and 33 two endless chains 994s and 994p are provided in order to support a series of transverse mounting plates represented by plates 996 and 998 in FIG. 33. A set of individual pipeline support pads 1000 for engaging two pairs of operational lines having two different diameters are affixed to the mounting plates as shown in FIG. 33. This arrangement is distinguishable from that shown in FIG. 30 where separate mounting plates are used for each operational line or pair of lines so that various curvatures can be established for different lines.

29

The idler roller assembly 652 is formed by five transversely disposed axles having two rollers on each axle. The rollers contact the underside of the endless chain track sets 649. Each of the five axles is independently mounted on pairs of hydraulic adjustment cylinders exemplified by cylinders 653s and 653p in FIG. 33. Each of these hydraulic cylinders can also be seen in ghost outline in the FIG. 32 plan view.

The track unit mounting brackets 972s and 972p are formed with hydraulic ram connection points 1002s and 1002p through both of the inverted U-spaced members thereof. Guide roller assemblies 640s, 640p, 641s, 641p, 642s and 642p are provided on each side of the track unit carriage 632 for sliding contact with frame-mounted guide members (not shown) on the straightener frame 456 (FIGS. 3, 6, 20, 21).

Adjustment of tension in the chain track sets 649 can be made by the individual hydraulic cylinders 653s and 653p and also by hydraulic cylinders 1004s and 1004p which operate to move the driven axle 977 with respect to the main carriage 632. Similar hydraulic cylinders 1006s and 1006p are attached to the bearing housings 986s and 986p respectively for moving the driven axle 988 with respect to the main carriage 632. Additional hydraulic cylinders 1008s and 1008p can be provided on either side of the driven axle 988 in order to provide for minor advancement adjustments in the track sets 649 during pipelaying operation.

The track unit 560 described above with respect to FIGS. 31 to 33 is preferably designed so that each of the axle adjustment hydraulic cylinders (such as 353s and 353p in FIG. 33) for each of the five idler roller axles operate at the same hydraulic pressure and therefore exert the same force, and tend to take up the same position. This technical fact together with the rather short distance from one end of the roller assembly 652 to the other in the direction of track travel means that this type of track unit is not specifically designed for curvature adjustment. Also the adjustment dimensions for movement of the axles 977 and 988 with respect to the upper transverse mounting plate 966 is too small to accommodate curvature adjustments of the type described with respect to the track unit 550 in FIGS. 28 to 30 above. For these reasons, the tensioner track units 424 and 426 as shown in FIGS. 20 and 21 are utilised solely for tensioning the operational lines array. These are not usable for straightening independently of other track units since they do not permit curvature adjustment of the type required.

The actual structure of the pipe conveyor proposed to be substituted for the array of pipe-supporting rollers 526 in the pipelay stinger unit 500 (FIGS. 23 to 26) can be made substantially identical to that of the track unit 560 (FIGS. 31 to 33), with appropriate longitudinal lengthening and curvature to suit the length and curvature of the pipelay stinger unit 500. In a corresponding manner, the structure of the pipe conveyor proposed for the stinger unit 500 can alternatively be formed similarly to the structure of the track unit 550 (FIGS. 28 to 30). (Similar considerations for a further possible form of pipe conveyor apply in respect of yet another form of track unit, described below with reference to FIG. 34).

Figure 34:
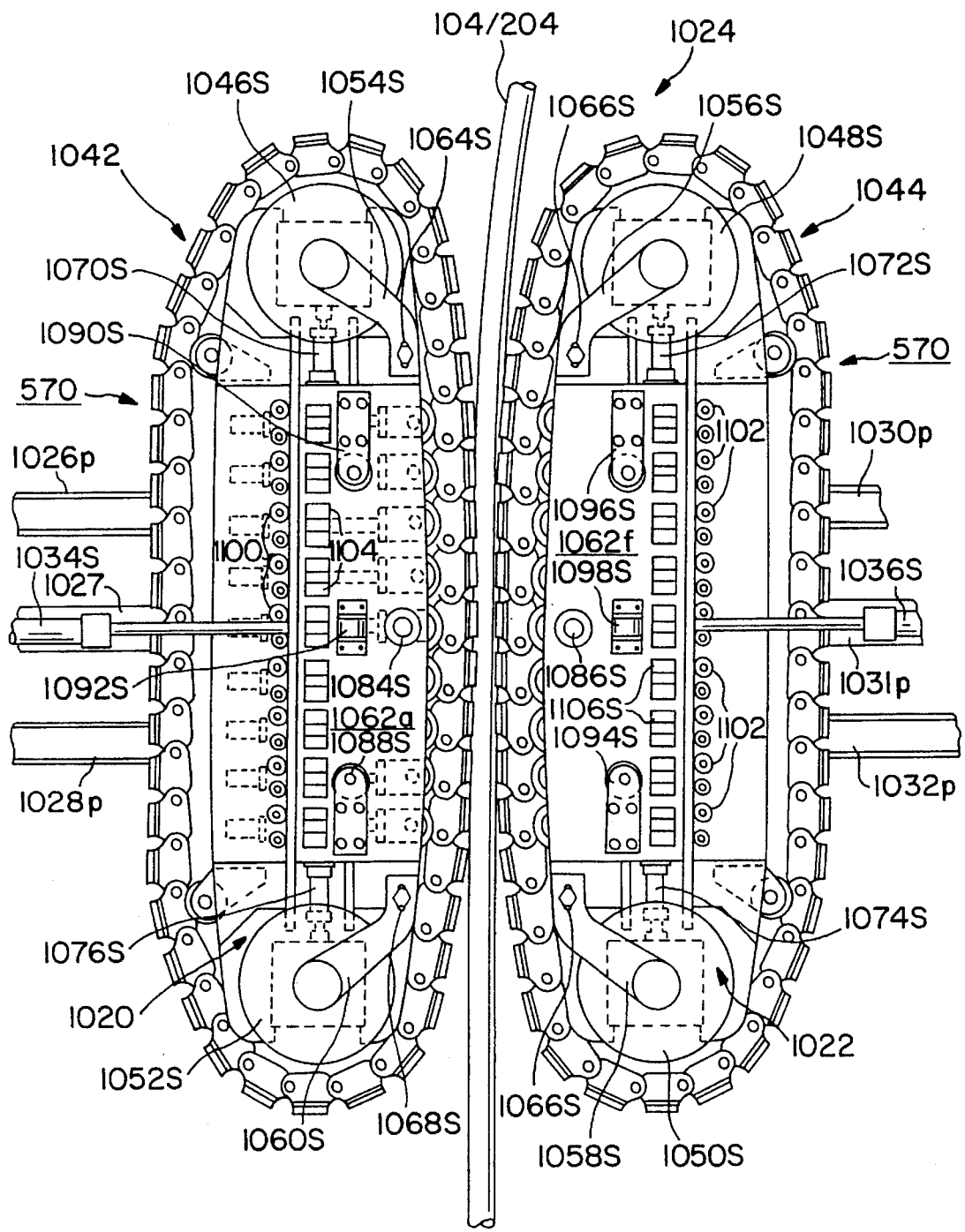
FIG. 34 is a starboard-side elevation of an opposed pair of track units capable of forming part of the arrangements shown in FIGS. 20 and 23.

FIG. 34 illustrates yet another alternative form of track unit 570, in a matched pair thereof functioning as a pipe tension control system 1024 for the pipe 104/204, and, in the case of one of the track units 570, as the third "roll" of a "three-roll" pipe straightener, ie in the manner of the track units 424 and 426 (FIGS. 20 and 21).

In this form, the track unit 570 has the capability of imparting an adjustable curvature to the main pipe(s) in the operational lines array. The track units 570 are fitted with hydraulic motors in order to exert tension on the multiple lines. Thus, the adjustable curvature established by the idler roller assembly of each track unit 570 provides a pipeline straightening function and the use of hydraulic motors to power the multiple chain tracks in each track unit 570 provides a pipe-tensioning function. By use of this type of straightener/tensioner track unit only two opposing track units are needed to constitute a straightening/tensioning device which can then be positioned within the pipe-conditioning unit.

The operational lines array and the pipe(s) 104/204 are gathered and set into a juxtaposed array prior to entry of the pipe/line array between two opposing straightener/tensioner multiple track assemblies 1020 and 1022 which constitute the straightener/tensioner device 1024. A co-planar array positioning in which the operational lines' centres are in the same plane is preferred. Each of the straightening/tensioning assemblies 1020 and 1022 are slidably mounted on starboard and port structural guides illustrated by guide members 1026p and 1028p for assembly 1020 and members 1030p and 1032p for assembly 1022. As set forth with respect to FIGS. 28 to 30, hydraulic ram pairs 1034 and 1036 are pivotally connected by upstanding connectors 1038s, 1038p and 1040s, 1040p in order to provide adjustment in positioning for the straightening/tensioning assemblies. The engagement of guide rollers on the structural members 1026p, 1028p, 1030p and 1032p is the same as described with respect to the embodiment illustrated in FIGS. 28 to 30.

The tensioning function of the straightening/tensioning device 1024 requires the use of motive power for the pipeline array-contacting track sets 1042 and 1044. This traction power is provided by eight hydraulic motors which are mounted on the two ends of each of the four main axles in the straightening/tensioning device 1024. The starboard set of these hydraulic motors are shown as 1046s, 1048s, 1050s and 1052s in FIG. 34.

The two assemblies 1020 and 1022 which comprise device 1024 are of identical construction except that each of the assemblies has the track sets mounted thereon in a configuration to grasp the various lines in the pipe/line array in order to exert tension therealong. This positioning of the track sets then constitutes a difference between the assemblies when viewed side by side. In view of the identical construction only a single set of identifying numerals have been employed for the same elements in the two assemblies except that the designations "a" for aft and "f" for fore have been used to designate the operating position of the assembly under description.

The straightening/tensioning assemblies 1020 and 1022 are similar in basic construction to the straightening assembly illustrated in detail in FIGS. 28 to 30 with the important difference that in the straightening/tensioning assemblies 1020 and 1022 hydraulic motors are provided for driving the main axles which are illustrated in FIG. 29 as 534 and 536. Reaction levers 1054s, 1056s, 1058s and 1060s are provided for connecting the stationary bases of the hydraulic motors to the assembly starboard and port side mounting brackets 1062a and 1062f as illustrated in FIG. 34. The connections of these lever arms 1054 to 1060 with the assemblies is through slot and pin connections 1064, 1066s, 1066p and 1068s, respectively, in order to allow for adjustments in tensioning of the track sets 1042 and 1044 by the hydraulic pistons 1070s, 1072s, 1074s and 1076s.

In operation the relative positions of the two assemblies 1020 and 1022 are adjusted by operation of hydraulic cylinders 1034s and 1036s which are shown in FIG. 34 in front of the support frames 1027*p* and 1031*p*, respectively. A pipeline array can then be passed downwardly through the device 1024. Upon activation of the hydraulic ram pairs 1034 and 1036 the two assemblies 1020 and 1022 can be closed on either side of the pipeline array so that the individual lines are caught between the opposing line support pads which are mounted on the endless sprocket chain track sets 1042 and 1044 as shown in FIG. 34. As in FIGS. 28 to 30 the two straightening/tensioning assemblies are connected at the port and starboard sides of each of the main carriages 1080 and 1082 by pivotal connections 1084*s*, 1084*p* and 1086*s*, 1086*p* respectively.

As in FIGS. 28 to 30 guide rollers 1088*s* and 1090*s* are positioned to support assembly 1020 on the frame tracks 1026*s* and 1028*s* which can be understood from FIG. 34. The centrally positioned guide roller 1092*s* is positioned to contact the intermediate structural frame member 1027*s*. Corresponding guide rollers 1094*s* and 1096*s* and 1098*s* are provided on the starboard side bracket 1062*f*.

The internal structure of each of the assemblies is the same as described with respect to FIGS. 28 to 30. A series of jactuator adjustment openings 1100 and 1102 are shown in assemblies 1020 and 1022 respectively. These jactuator adjustment openings 1100, 1102 permit the turning of internally mounted screws in order to position the multiple roller guides independently. As shown in FIG. 34 nine roller guide sets are provided for each of three endless chains which are employed to support the pipe pads for three pairs of lines which constitute the pipe/line array (as shown in FIG. 30). Sight openings 1104 and 1106 are also provided through the various walls of the two assemblies to observe rotation of the jactuators' screws therein.

The operation of the straightening/tensioning device 1024 permits the two track units 570 to be opened and closed about the pipeline array via the hydraulic ram pairs 1034 and 1036 whereas operation of the internal hydraulic cylinder pairs 1070, 1072, 1074 and 1076 allows the tension on the endless track sets 1042 and 1044 to be changed. The track curvature necessary to impart the straightening function while preserving the pipeline ovality and other dimensions by this straightening/tensioning device 1024 is established by the mechanical adjustment of the various jactuators screws in order to set the guide rollers at varying positions linearly along the pipe array. The jactuator adjustment openings are formed on both the top and bottom sides of the individual jactuator screws as described with respect to FIGS. 28 to 30 above since it is necessary to adjust the central set of screws as well as the two outer sets of screws in a three track set system such as illustrated in FIG. 34.

The pipe-tensioning function is provided by longitudinal motive force input through the hydraulic motors 1046*s*, 1046*p*, 1048*s*, 1048*p*, 1050*s*, 1050*p*, and 1052*s*, 1052*p*, which are connected to the main axles as described above. The input power from these motors permits the application of tension along the pipeline array in an upward direction, as shown in FIG. 34, in order to maintain desired operating tension on the pipeline array which passes downwardly through the pipe-conditioning unit and then into the water.

The multiple line track sets 1042 and 1044 of each of the assemblies 1020 and 1022 are interconnected to one another through the sprockets and the main axles 534 and 536. This interconnection provides for moving the lines in the operational array at a common velocity. The pipeline support pads on the track sets provide the supporting means for the array of pipes and auxiliary lines.

Certain optional auxiliary features of the pipe-conditioning unit 110/210 will now be described with reference to FIGS. 35 to 49.

FIG. 35 is a semi-schematic transverse section of the radius controller 112/212 near its intermediate point 406, the section being taken on the line XXXV—XXXV in FIG. 21. FIG. 35 shows the preferred bi-conical saddle-form or V-shape of the pipe-supporting rollers 416 for transversely stabilising the lateral position of the pipe 104/204 in its passage over the radius controller 112/212. FIG. 35 also shows roller support brackets 417 (semi-schematically depicted in somewhat different forms in FIGS. 3 and 6).

Figure 36:
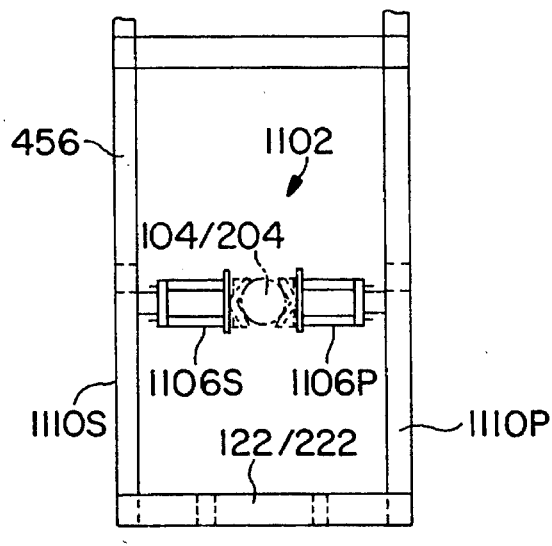
FIG. 36 is a schematic end elevation of a lateral pipe-supporting unit forming part of the arrangement shown in FIG. 20.

FIG. 20 schematically illustrates tensioner pipe clamp assemblies 1102 and 1104 mounted on the straightener frame 456 respectively upstream and downstream of the opposed pair of track units 424 and 426 which mutually co-operate as the aforementioned pipe tension control system within the pipe-conditioning unit 110/210. FIG. 36 is an upstream-end downstream-directed view of the tensioner pipe clamp assembly 1102 (to which the assembly 1104 is substantially identical), FIG. 36 being a transverse section of the pipe straightener 114/214 taken on the line XXXVI—XXXVI in FIG. 21.

The tensioner pipe clamp assemblies 1102 and 1104 are advantageously employed when it is desirable or necessary to keep the pipe 104/204 longitudinally anchored and constrained against lateral movements, for example during operations such as pipe tie-in or pipelay termination. To this end, each assembly 1102, 1104 comprises a horizontally opposed pair of mutually identical adjustable jaws 1106P and 1106S.

Figure 37:
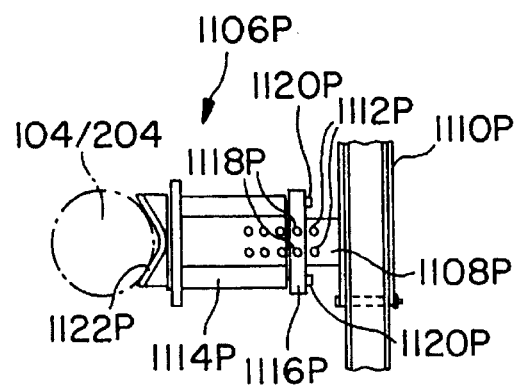
FIG. 37 is a detail of FIG. 36 to an enlarged scale.

The jaw 1106P is shown per se and to an enlarged scale in FIG. 37, the associated jaw 1106S being identical (other than being oppositely handed to function on the starboard side, as distinct from the port-side jaw 1106P detailed in FIG. 37). The jaw 1106P is an assembly comprising a square tubular column 1108P welded or bolted to a side member 1110P of the straightener frame 456 to be aligned horizontally inboard thereof. The column 1108P has several laterally spaced pairs of holes 1112P on each side thereof. A jaw head 1114P has a central square bore dimensioned to be a sliding fit over the inboard end of the column 1108P. A collar 1116P having a central square hole therein dimensioned to be a sliding fit over the column 1108P is fitted over the column 1108P between the outboard end of the jaw head 1114P and the straightener frame side member 1110P. The collar 1116P has pairs of holes 1118P on each side thereof such that the collar 1116P can be pinned or bolted to a selected pair of the column holes 1112P as a coarse adjustment of the position of the jaw head 1114P along the column 1108P. Threaded through holes in the collar 1116P mount inboard-directed fine-adjustment screws 1120P which force against the outboard end of the jaw head 1114P as a fine adjustment of the position of the jaw head 1114P along the column 1108P. The inboard end of the jaw head 1114P mounts a V-shaped pipe-gripping saddle 1122P.

According to the outside diameter of the pipe 104/204, a suitably positioned pair of the column holes 1112P is selected to have the collar 1116P pinned or bolted thereto, and the fine-adjustment screws 1120P are then adjusted to force the saddle 1122P carried by the jaw head 1114P into tight or loose grip on the outside of the pipe 104/204 according to whether the pipe 104/204 is to be anchored or merely laterally aligned without being anchored such that the pipe 104/204 can continue to slide through the tensioner pipe clamp assembly 1102. The similarly constructed tensioner pipe clamp assembly 1104 is set up and adjusted likewise.

Mounted on the support carriage 112/222 downstream of the pipe straightener 114/214 are the further optional auxiliary items of the pipe-conditioning unit 110/210 (see FIGS. 3, 6 and 20): a first pipe support roller assembly 1130, an upstream abandonment and recovery sheave assembly 1132, a pipe tie-in clamping assembly 1134, a second pipe support roller assembly 1136, a main pipe clamping assembly 1138, a downstream pipe guide assembly 1140, a pipe launch angle measuring device 1142, and a downstream abandonment and recovery sheave assembly 1144. Certain of these items will now be detailed with reference to FIGS. 38 to 49. (In the following parts of this specification, the term "abandonment and recovery" will be abbreviated as "A & R").

Figure 38:
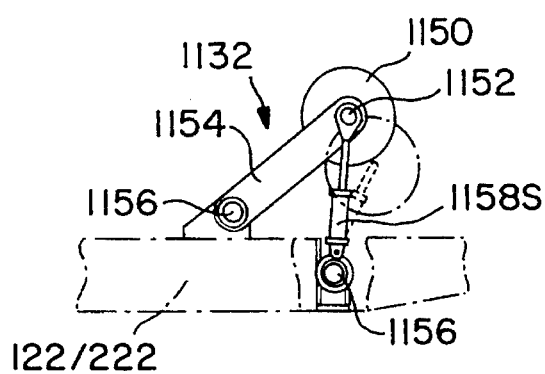
FIGS. 38 and 39 are respectively starboard-side and upstream-end elevations of a forward sheave assembly forming part of the arrangement of FIG. 20.
Figure 39:
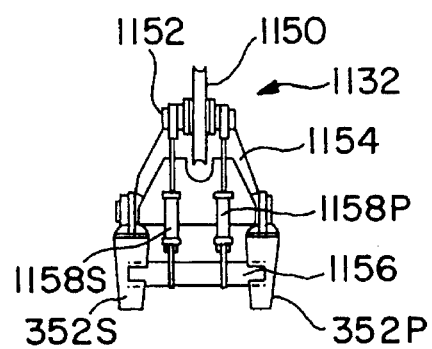

The upstream A & R sheave assembly 1132 is separately detailed in FIGS. 38 and 39, which are, respectively, a starboard-side elevation and an upstream-end elevation of the assembly 1132. FIG. 38 shows the sheave assembly 1132 in solid lines in its raised position for use in A & R operations, while the assembly 1132 is shown in chain-dashed lines in its lowered, inoperative position (as occupied during normal pipelaying operations).

The upstream A & R sheave assembly 1132 is mounted on the support carriage 122/222 between the first pipe support roller assembly 1130 and the pipe tie-in clamping assembly 1134. The sheave assembly 1132 comprises a sheave 1150 mounted for rotation about a substantially horizontal axle 1152 orthogonally transverse the general line of the passage of the pipe 104/204 down the pipe conditioning unit 110/210 in pipelaying operation of the ship 100/200. The sheave 1150 is rotatably mounted at the free end of a wishbone 1154 whose other end is pivotally mounted on the support carriage 112/222 for rotation about a similarly horizontal and orthogonally transverse axle 1156. Selectively extensible/retractable hydraulic piston/cylinder assemblies 1158P and 1158S extend between outboard ends of the sheave axle 1152 and a further horizontal and orthogonally transverse axle 1160 on the support carriage 122/222 for selective raising and lowering of the sheave 1150, for a purpose to be detailed subsequently.

Figure 40:
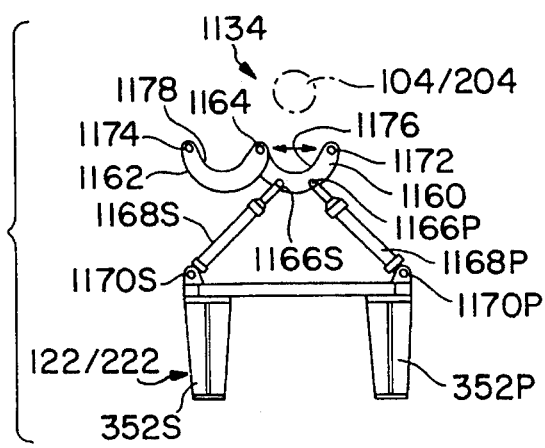
FIG. 40 is an end elevation of a pipe tie-in clamp assembly forming part of the arrangement of FIG. 20.
Figure 41:
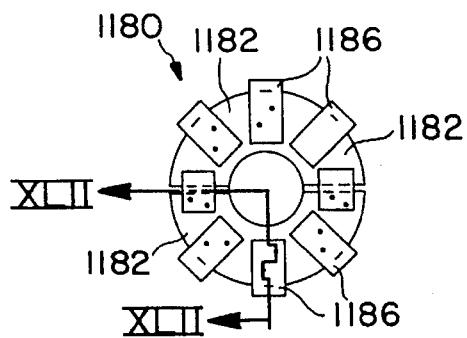
FIG. 41 is an end elevation of an insert for use in the clamp assembly shown in FIG. 40.
Figure 42:
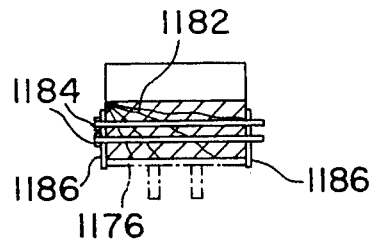
FIG. 42 is a vertical longitudinal cross-section of the insert shown in FIG. 41.

The pipe tie-in clamping assembly 1134 is detailed separately in the upstream-end elevational view of FIG. 40, with further details of part of the assembly 1134 being shown in FIGS. 41 and 42. The clamping assembly 1134 is mounted on the support carriage 122/222 between the upstream A & R sheave assembly 1132 and the second pipe support roller assembly 1136.

The pipe tie-in clamping assembly 1134 comprises a lower semi-circular clamp half 1160 and an upper semi-circular clamp half 1162 mutually hinged at one side thereof by a horizontal hinge pin 1164. The clamp half 1160 is mounted on the upper ends 1166S and 1166P of a pair of selectively extensible/retractable hydraulic piston/cylinder assemblies 1168S and 1168P whose lower ends 1170S and 1170P are pivotally anchored on the support carriage 122/222. When extended, the hydraulic piston cylinder assemblies 1168S and 1168P raise the clamp halves 1160 and 1162 to positions in which they are capable of being clamped around the pipe 104/204 as detailed below. Conversely, retraction of the assemblies 1168S and 1168P lowers the clamp halves 1160 and 1162 to positions clear of the normal position of the pipe 104/204.

When the lower clamp half 1160 is lifted (by extension of the piston/cylinder assemblies 1168S and 1168P) to cradle the pipe 104/204, the upper clamp half 1162 is swung around the hinge pin 1164 to complete encirclement of the pipe 104/204 and the two clamp halves 1160 and 1162 are then mutually secured by respective latches 1172 and 1174 at the respective free ends thereof. The inner faces 1176 and 1178 of the clamp halves 1160 and 1162 respectively are preferably each formed as a respective hemi-cylindrical steel plate whose effective inside diameter can be varied to suit the outside diameter of the pipe 104/204 currently being handled, by means of a hollow cylindrical adapter block 1180 (shown separately and to an enlarged scale in the end elevational view of FIG. 41). As more particularly shown in the radial section in FIG. 42 (taken on the line XLII—XLII in FIG. 41), the adaptor block 1180 preferably comprises hardwood staves 1182 clamped endwise by full-length bolts 1184 between end plates 1186 which radially extend beyond the peripheries of the staves 1182 so as to anchor the adaptor block 1180 within the mutually closed and secured clamp halves 1160 and 1162. Use of the pipe tie-in clamping assembly 1134 will be described subsequently.

The main pipe clamping assembly 1138 is substantially larger than the clamping assembly 1134 described above, and is mounted on the support carriage 122/222 between the second pipe support roller assembly 1136 and the downstream pipe guide assembly 1140. The clamping assembly 1138 is shown separately in the starboard-side elevation of FIG. 43 and the upstream-end elevation of FIG. 44.

The main pipe clamping assembly 1138 comprises a longitudinally-extended hemi-cylindrical lower clamp half 1190 supported for vertical movement relative to the support frame 122/222 on three longitudinally-spaced depending columns 1192 which slide vertically in three vertical sockets 1194 integral with the assembly base 1196 which is secured on top of the support carriage frame members 352P and 352S. (In this context, the term "vertical" means at right angles with respect to the motional plane of the upper surface of the support carriage 122/222; this so-called "vertical" is displaced from true vertical by about the angle of elevation of the support frame 124/224 above nominal horizontal). This "vertical" movement of the lower clamp half 1190 relative to the assembly base 1196 and to the support carriage 122/222 is controlled by four selectively extensible/retractable hydraulic piston/cylinder assemblies 1198 each pivotally coupled at each end respectively to the lower clamp half 1190 and to the assembly base 1196.

Figure 43:
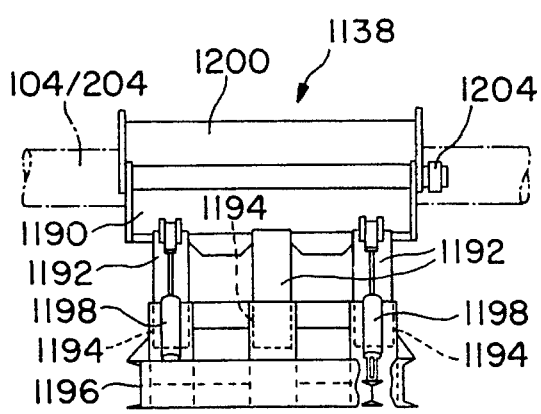
FIGS. 43 and 44 are respectively starboard-side and end elevations of a main pipe clamp assembly forming part of the arrangement of FIG. 20.
Figure 44:
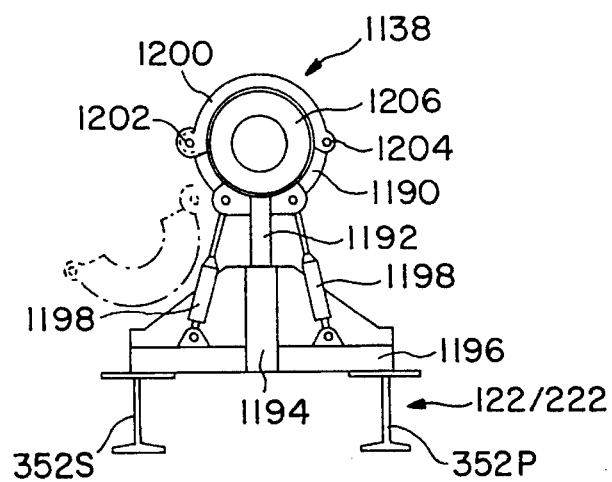

A hemi-cylindrical upper clamp half 1200 is hinged at one edge to one edge of the lower clamp half 1190 by a common hinge pin 1202 such that the upper clamp half 1200 can be selectively swung over the lower clamp half 1190 (as shown in FIGS. 43 and 44) to encompass the pipe 104/204 whereupon the clamp halves 1190 and 1200 can be locked around the pipe 104/204 by a suitable fastener 1204. To suit varying pipe sizes, the clamping assembly 1138 incorporates a hollow cylindrical adaptor block 1206 which is preferably formed, with suitable dimensions, similarly to the adapter block 1180 described above with reference to FIGS. 41 and 42. Use of the main pipe clamping assembly 1138 will be described subsequently.

Figure 45:
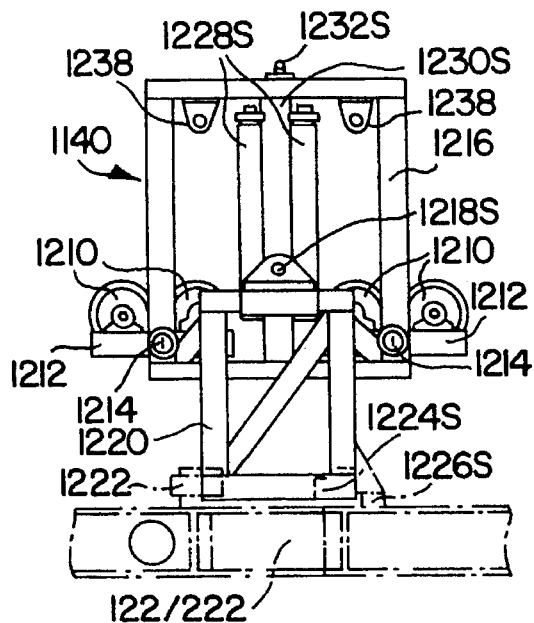
FIGS. 45, 46 and 47 are respectively a starboard-side elevation, an end elevation, and a plan view from above of a stern pipe guide assembly forming part of the arrangement of FIG. 20.
Figure 46:
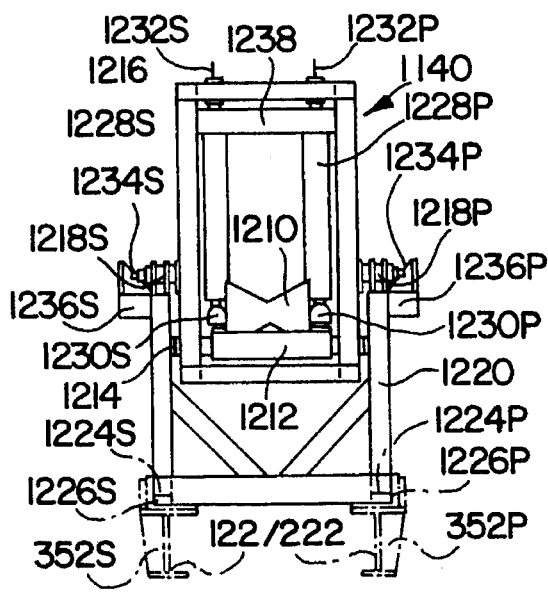
Figure 47:
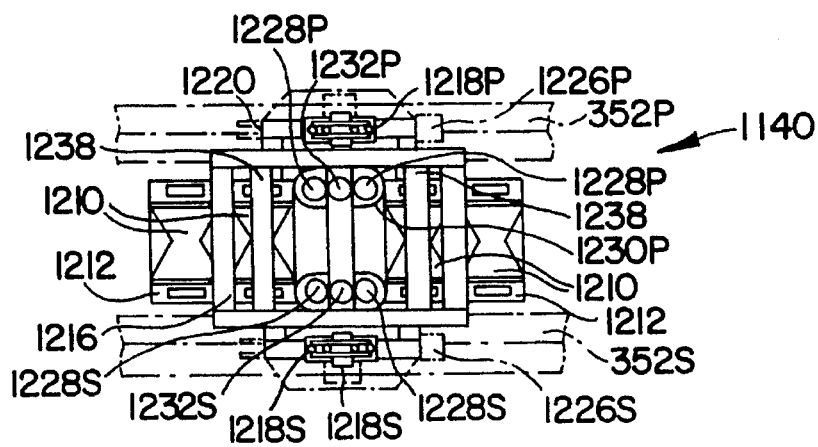
Figure 48:
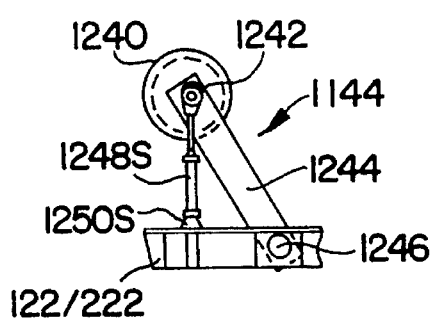
FIGS. 48 and 49 are respectively starboard-side and end elevations of an aft sheave assembly forming part of the arrangement of FIG. 20.
Figure 49:
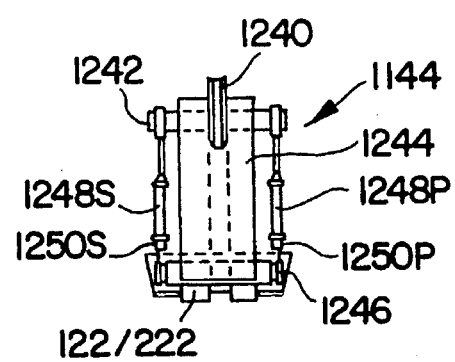

The downstream pipe guide and force-measuring assembly 1140 is shown separately in the starboard-side elevation of FIG. 45, the upstream-end elevation of FIG. 46, and the plan view of FIG. 47. In general terms, the guide and force-measuring assembly 1140 comprises a pipe-conforming set of support rollers (detailed below) for supporting the pipe 104/204 as it leaves the downstream end of the pipe-conditioning unit 110/210, together with further sets of auxiliary rollers (detailed below) to limit lateral deviations and heave of the pipe 104/204, the various sets of rollers being associated with force-measuring load cells (detailed below) for measuring concomitant forces on the pipe 104/204 for ship guidance and control purposes.

In detail, the assembly 1140 comprises two pairs of bi-conical support rollers 1210 mounted in pairs on two longitudinally-spaced roller cradles 1212 each horizontally pivoted about a longitudinally-central transverse roller cradle axle 1214 on an assembly upper sub-frame 1216. The upper sub-frame 1216 is pivotally mounted on a horizontal transverse axis by trunnions 1218P and 1218S atop a lower sub-frame 1220. The downstream end of the lower sub-frame 1220 is pivotally anchored by a pivot 1222 for limited rotational movement about a substantially horizontal axis. Coupling pins 1224P and 1224S link the upstream end of the lower sub-frame 1220 of the support carriage 122/222 for such limited rotational movement of the lower sub-frame 1220 while preventing the assembly 1140 becoming detached from the support carriage 122/222. A laterally-spaced pair of load cells 1226P and 1226S under the upstream end of the lower sub-frame 1220 bear down against the support carriage 122/222 to measure static and dynamic forces exerted by the pipe 104/204 vertically towards the notional upper surface of the support carriage 122/222.

Two pairs of vertical-axis auxiliary side rollers 1228P and 1228S are mounted in respective auxiliary roller cradles 1230P and 1230S each mounted in the upper sub-frame 1216 for rocking movement about respective vertical axes 1232P and 1232S. (As before, in this context the term "vertical" means orthogonal relative to the notional upper surface of the support carriage 122/222, and is displaced from true vertical by the elevation angle of the support frame 124/224 above notional horizontal, as marginally modified by the relatively limited rocking movement of the lower sub-frame 1220 about its downstream pivot 1222, and as further modified by the potentially greater rocking movement of the upper sub-frame 1216 about the horizontal transverse axis defined by the trunnions 1218P and 1218S on top of the lower sub-frame 1220). The peripheries of the auxiliary side rollers 1228P and 1228S are arranged to be substantially contiguous with the lateral edges of the main support rollers 1210 (see FIG. 46), such that the side rollers 1228P and 1228S prevent the pipe 104/204 becoming laterally dislodged from the main support rollers 1210 (eg by yawing and/or rolling of the ship 100/200).

Whether the pipe 104/204 is laterally supported purely on the main support rollers 1210 or partly on these and partly (or wholly) on the auxiliary side rollers 1228P or 1228S, lateral force exerted on or by the pipe 104/204 is measured by load cells 1234P and 1234S interposed between the outboard ends of the upper sub-frame trunnions 1218P, 1218S and outrigger brackets 1236P, 1236S on the shoulders of the lower sub-frame 1220.

The top of the upper sub-frame 1216 directly mounts a transversely aligned pair of horizontal-axis rollers 1238 for rolling-contact limitation of possible upward movement of the pipe 104/204 in extreme conditions (e.g. pitching and/or heaving of the ship 100/200); the rollers 1238 would normally remain out of contact with the underlying pipe 104/204 (normally in contact with the main support rollers 1210).

Read-outs from the load cells 1226P, 1226S, 1234P and 1234S may be made on the bridge 162/262 and/or directly in the main control computer (not shown) of the ship 100/200, together with the read-outs from the load-sensing devices in the stinger unit 500, with a view to monitoring stress on the pipe 104/204 and, if necessary, taking remedial measures such as changing the course and/or the speed of the ship 100/200, e.g. by suitable operation of the lateral thrusters 152/252 and/or 154/254, the rudder 160/260, or the engine driving the main propellors 148/248.

The angle of the pipe 104/204 immediately downstream of the pipe guide and force-measuring assembly 1140, relative to the notional upper surface of the support carriage 122/222, is continuously monitored by the pipe launch angle measuring device 1142. A measuring arm 1250 of the device 1142 is pivoted at one end on a static device base frame 1252 secured to the support carriage 122/222. The other end of the measuring arm 1250 rides on top of the pipe 104/204 through the intermediary of a pivotally-coupled rubbing block 1254. Angle measurement signals from the device 1142, modified by the angle by which the support frame 124/224 is elevated above the nominally horizontal rear deck 130/236 and by the design curvature of the piplay stinger unit 500, are utilised as a measure of pipe launch angle in conjunction with the above-described load-cell signals from the assembly 1140 and load-sensing-device signals from the unit 500, for monitoring and control purposes.

The downstream A & R sheave assembly 1144 is the most downstream of the optional auxiliary items of the pipe-conditioning unit 110/210 as collectively assembled in the particular arrangement schematically illustrated in FIG. 20. The sheave assembly 1144 is separately illustrated in the starboard-side elevation of FIG. 48 and in the upstream-end elevation of FIG. 49.

The downstream A & R sheave assembly 1144 is generally similar to (though different in detail from) the upstream A & R sheave assembly 1132 previously described with reference to FIGS. 38 and 39. The assembly 1144 comprises a sheave 1240 rotatably mounted on a horizontal axle 1242 at the free end of a wishbone 1244 pivotally anchored at its lower end on a further horizontal axle 1246 set into the support carriage 122/222. A pair of selectively extensible/retractable hydraulic piston/cylinder assemblies 1248P and 1248S are pivotally coupled at their upper end to the sheave axle 1242, and pivotally coupled at their lower ends to brackets 1250P and 1250S secured to the top of the support carriage 122/222. Extension of the piston/cylinder assemblies 1248P and 1248S raises the sheave 1240 to its operating position for A & R procedures (detailed subsequently), whereas retraction of the piston/cylinder assemblies 1248P and 1248S lowers the sheave 1240 to a position clear of the pipe 104/204 during normal pipelaying operations. Use of the sheave assembly 1144 will be described below.

It will be noted by comparing FIG. 6 with FIG. 3 that certain of the above-described items of auxiliary equipment are triplicated in the pipe-conditioning unit 210 as compared with the pipe-conditioning unit 110, in order to deal with the auxiliary lines 274 and 276. The provision and use of such extra items will be determined by the number and nature of the auxiliary lines to be laid in any given pipelaying operation of the ship 200.

Use of the above-described clamping and sheave assemblies in abandonment and recovery procedures will now be described.

In a given pipelaying operation of the ship 100/200, completion of the operation may require the laying of a greater length of pipe 104/204 than can be carried at one time on the main reel 102/202. In such a case, it is necessary to lay the first length of pipe, cap or plug its end to prevent flooding, and drop it overboard ("abandonment"). The ship 100/200 returns to base, reloads its reel 102/202 with a further length of pipe, returns to the abandonment location, retrieves the capped or plugged end of the first length of pipe ("recovery"), joins the two lengths of pipe, and recommences pipelaying operation. (Unplanned abandonments may also be required in emergencies, e.g. in the event of a sudden storm).

To prevent the end of the first length of the pipe 104/204 dropping uncontrollably into the water after it has came off the reel 102/202 and through the tension control system constituted by the track units 424 and 426, the main pipe clamping assembly 1138 is raised into its operating position and clamped around the pipe 104/204 to anchor it. The trailing end of the pipe 104/204 is capped or plugged (if this was not done on shore prior to initial spooling), an anchor cable (not shown) is attached to the end of the pipe (this cable having a marker buoy (not shown) secured to its other end), the clamping assembly 1138 is opened to free the end of the pipe 104/204, and the pipe is allowed overboard to settle on the sea-bed on the end of the anchor cable, with the buoy marking its location.

The ship 100/200 returns to its base and spools the further length of pipe onto the reel 102/202. The re-loaded ship 100/200 then retraces its path to the buoy-marked abandonment location.

At the abandonment location, the ship 100/200 adopts suitable heading and position, and dynamically maintains these by suitable operation of its propellors 148/248, rudder 160/260, and/or its thrusters 152/252, 154/254. The A & R sheave assemblies 1132 and 1144 are raised to their operative positions, and an A & R cable (not shown) is deployed over the sheaves 1150 and 1240 and down through the stinger unit 500 from a ship-mounted winch (not shown). The free end of the A & R cable is deployed over the ship's stern 108/208 and attached to the marker buoy anchor cable. The winch is then reversed to haul in the end of the first length of pipe, the A & R cable and the anchor cable being initially supported on the stinger rollers 526 and on the sheaves 1150 and 1240. As the end of the first length of pipe comes aboard, the downstream sheave assembly 1144 is dropped to avoid potentially damaging contact with the pipe, whose weight is transferred to the pipe guide assembly 1140. The end of the first length of the pipe is drawn up the pipe-conditioning unit 110/210 until it lies over the clamping assemblies 1138 and 1134, whereupon the recovery winch is halted, and the clamping assemblies 1138 and 1134 are raised and clamped around the recovered pipe.

The recovered pipe is cut between the clamping assemblies 1134 and 1138, and the short length with the cap or plug, and the anchor cable attachment, is released from the upstream (tie-in) clamping assembly 1134 and discarded. The leading end of the further length of the pipe is unspooled from the main reel 102/202, and deployed over and through the pipe-conditioning unit 110/210 until it passes through the tie-in clamping assembly 1134 to abut the cut end of the first length of pipe. The pipe ends are welded together, the joint is tested and coated, and the clamping assemblies 1134 and 1138 are both released and retracted after the track units 424 and 426 are brought firmly against the now-continuous pipe 104/204 to ensure tension control.

Appropriate similar operations are performed on the auxiliary line(s) (if any).

The ship 100/200 is now ready to recommence pipelaying operation.

(It will be appreciated that the above-described A & R items will be redundant and need not be provided in the event that the ship 100/200 can carry and lay an adequate length of pipe 104/204 to complete pipelaying operations with that one length).

While certain modifications and variations of the pipelaying arrangements and procedures have been described above, the present invention is not restricted thereto, and other modifications and variations can be adopted without departing from the scope of the invention.

I claim:

1. A reel pipelaying vessel comprising at least one reel for selectively spooling and de-spooling a length of pipe thereon, radius control means for imparting a substantially uniform radius of curvature to said length of pipe at least during de-spooling of said pipe from said reel in pipelaying operation of said vessel, and pipe straightening means downstream of said radius control means in the direction of de-spooling of said length of pipe from said reel in pipelaying operation of said vessel, wherein said radius control means and said pipe straightening means are both mounted on a common support means, said common support means being coupled to the remainder of said vessel in a manner allowing said common support means to be controllably inclined with respect to a nominal or actual horizontal, characterised in that said vessel includes a pipelay stinger means extending sternwards of said vessel and being located downstream of said radius control means and said straightening means in the direction of de-spooling of said length of pipe from said reel in pipelaying operation of said vessel, said pipelay stinger means being arranged to increase the launch angle of said length of pipe, relative to said nominal or actual horizontal, from said vessel in pipelaying operation of said vessel.

2. The vessel of claim 1, wherein said pipelay stinger means is curved in a substantially vertical plane to present pipe-supporting contact points which support said length of pipe in pipelaying operation of said vessel at angles which vary from a relatively lesser elevation above horizontal adjacent the upstream end of said stinger means to a relatively greater elevation above horizontal adjacent the downstream end of said stinger means.

3. The vessel of claim 2, wherein said pipelay stinger means is arranged such that said angles vary as aforesaid between the ends of said stinger means substantially without discontinuity.

4. The vessel of claim 1, wherein said pipelay stinger means is curved and is formed as a cantilever mounting an array of pipe-supporting rollers distributed along the length of said cantilever, said array of rollers presenting pipe-supporting contact points thereon which collectively define the curve of said curved pipe stinger means.

5. The vessel of claim 4, wherein said rollers have individual rotational axes which are substantially horizontal and aligned transverse said cantilever.

6. The vessel of claim 1, wherein said pipelay stinger means is curved and is formed as a cantilever mounting an endless pipe conveyor means disposed along the length of said cantilever to present pipe-supporting contact points therealong which collectively define the curve of said curved pipelay stinger means.

7. The vessel of claim 6, wherein said endless pipe conveyor means comprises an endless chain of mutually pivotally linked pipe supporting elements, said elements being slidably mounted on an upper surface of said pipelay stinger means, said endless chain being suspended beneath said upper surface to complete the path of said endless pipe conveyor means around said pipelay stinger means.

8. The vessel of claim 7, wherein said pipe supporting elements are roller-mounted on said upper surface of said pipelay stinger means.

9. The vessel of claim 7, wherein each said pipe supporting element comprises at least one pipe-cradling element disposed transverse the path of movement of said endless chain on said upper surface to cradle the length of pipe in the passage of said length of pipe over or through said pipelay stinger means.

10. The vessel of claim 9, wherein each said pipe-cradling element is V-shaped or U-shaped.

11. The vessel of claim 1, wherein said pipelay stinger means is pivotally coupled to the stern of said vessel in a manner allowing said pipelay stinger means to pivot about a substantially horizontal axis aligned transverse the longitudinal axis of said vessel for pivoting movement of said pipelay stinger means in a substantially vertical plane substantially parallel to a further substantially vertical plane including the longitudinal axis of said vessel.

12. The vessel of claim 11, wherein said pipelay stinger means is pivotally coupled as aforesaid through the intermediary of an articulated arm means.

13. The vessel of claim 12, wherein said articulated arm means is telescopable and/or demountable whereby respectively to allow selective longitudinal repositioning and/or demounting of said pipelay stinger means.

14. The vessel of claim 1, wherein said pipelay stinger means is pivotally coupled to the downstream end of said common support means in a manner allowing said pipelay stinger means to pivot about a substantially horizontal axis aligned transverse the longitudinal axis of said vessel for pivoting movement of said pipelay stinger means in a substantially vertical plane substantially parallel to a further substantially vertical plane including the longitudinal axis of said vessel.

15. The vessel of claim 1, wherein said common support means comprises a ramp means mounting a carriage means controllably traversable laterally across said ramp means, said carriage means mounting both said radius control means and said pipe straightening means, said ramp means being coupled to the remainder of said vessel in a manner allowing controllable inclination of said common support means, whereby the controllable traversing of said carriage means laterally across said ramp means enables level winding of said length of pipe at least during de-spooling thereof from said reel in pipelaying operation of said vessel.

16. The vessel of claim 15, wherein said pipelay stinger means is coupled to said carriage means for traversing movement conjointly therewith.

17. A method of operating a reel pipelaying ship which includes radius control means and pipe straightening means both mounted on a common support means which may be controllably inclined with respect to a nominal or actual horizontal in order to increase the launch angle of a length of pipe laid by said vessel, relative to said nominal or actual horizontal, in pipelaying operation thereof, said method being characterised in the steps of providing a pipelay stinger means extending sternwards of said vessel, and laying said length of pipe by way of said pipelay stinger means, having arranged said pipelay stinger means to increase said launch angle relative to said nominal or actual horizontal.

18. The method of claim 17, wherein said pipelay stinger means is arranged to be curved in a substantially vertical plane to present pipe-supporting contact points which support said length of pipe during pipelaying operation of said vessel at angles which vary from a relatively lesser elevation above horizontal adjacent the upstream end of said pipelay stinger means to a relatively greater elevation above horizontal adjacent the downstream end of said pipelay stinger means.

19. A curved pipelay stinger means characterised in that said curved pipelay stinger means is formed as a cantilever mounting an endless pipe conveyor means disposed along the length of said cantilever to present pipe-supporting contact points therealong which collectively define the curve of said curved pipelay stinger means.

20. The pieplay stinger means of cliam 19, wherein said endless pipe conveyor means comprises an endless chain of mutually pivotally linked pipe supporting elements, said elements being slidably mounted on an upper surface of said pipelay stinger means, said endless chain being suspended beneath said upper surface to complete the path of said endless pipe conveyor means around said pipelay stinger means.

21. The pipelay stinger means of claim 20, wherein said pipe supporting elements are roller-mounted on said upper surface of said pipelay stinger means.

22. The pipelay stinger means of claim 20, wherein each said pipe supporting element preferably comprises at least one pipe-cradling element disposed transverse the path of movement of said endless chain on said upper surface to cradle the length of pipe in the passage of said length of pipe over or through said pipelay stinger means.

23. The pipelay stinger means of claim 22, wherein each said pipe-cradling element is V-shaped or U-shaped.

24. A reel pipelaying vessel comprising at least one reel for selectively spooling and de-spooling a length of pipe thereon, radius control means for imparting a substantially uniform radius of curvature to said length of pipe at least during de-spooling of said pipe from said reel in pipelaying operation of said vessel, and pipe straightening means downstream of said radius control means in the direction of de-spooling of said length of pipe from said reel in pipelaying operation of said vessel, wherein said radius control means and said pipe straightening means are both mounted on a common support means, said common support means being coupled to the remainder of said vessel in a manner allowing said common support means to be controllably inclined with respect to a nominal or actual horizontal, characterised in that said vessel includes a pipelay stinger means extending sternwards of said vessel and being located downstream of said radius control means and said straightening means in the direction of de-spooling of said length of pipe from said reel in pipelaying operation of said vessel, said pipelay stinger means being arranged to increase the launch angle of said length of pipe, relative to said nominal or actual horizontal, from said vessel in pipelaying operation of said vessel; wherein said pipelay stinger means is curved and is formed as a cantilever mounting an endless pipe conveyor means disposed along the length of said cantilever to present pipe-supporting contact points therealong which collectively define the curve of said curved pipelay stinger means; and said endless pipe conveyor means comprises an endless chain of mutually pivotally linked pipe supporting elements, said elements being slidably mounted on an upper surface of said pipelay stinger means, said endless chain being suspended beneath said upper surface to complete the path of said endless pipe conveyor means around said pipelay stinger means.

25. The vessel of claim 24, wherein said pipe supporting elements are roller-mounted on said upper surface of said pipeplay stinger means.

26. The vessel of claim 24, wherein each said pipe supporting element preferably comprises at least one pipe-cradling element disposed transverse the path of movement of said endless chain on said upper surface to cradle the length of pipe in the passage of said length of pipe over or through said pipelay stinger means.

27. The vessel of claim 26, wherein each said pipe-cradling element is V-shaped or U-shaped.

28. A reel pipelaying vessel comprising at least one reel for selectively spooling and de-spooling a length of pipe thereon, radius control means for imparting a substantially uniform radius of curvature to said length of pipe at least during de-spooling of said pipe from said reel in pipelaying operation of said vessel, and pipe straightening means downstream of said radius control means in the direction of de-spooling of said length of pipe from said reel in pipelaying operation of said vessel, wherein said radius control means and said pipe straightening means are both mounted on a common support means, said common support means being coupled to the remainder of said vessel in a manner allowing said common support means to be controllably inclined with respect to a nominal or actual horizontal, characterised in that said vessel includes a pipelay stinger means extending sternwards of said vessel and being located downstream of said radius control means and said straightening means in the direction of de-spooling of said length of pipe from said reel in pipelaying operation of said vessel, said pipelay stinger means being arranged to increase the launch angle of said length of pipe, relative to said nominal or actual horizontal, from said vessel in pipelaying operation of said vessel;

wherein said pipelay stinger means is pivotally coupled to the downstream end of said common support means in a manner allowing said pipelay stinger means to pivot about a substantially horizontal axis aligned transverse the longitudinal axis of said vessel for pivoting movement of said pipelay stinger means in a substantially vertical plane substantially parallel to a further substantially vertical plane including the longitudinal axis of said vessel.

29. The vessel of claim 28, wherein said pipelay stinger means is pivotally coupled as aforesaid through the intermediary of an articulated arm means.

30. The vessel of claim 29, wherein said articulated arm means is telescopable and/or demountable whereby respectively to allow selective longitudinal repositioning and/or demounting of said pipelay stinger means.

31. The vessel of claim 28 wherein said common support means comprises a ramp means mounting a carriage means controllably traversable laterally across said ramp means, said carriage means mounting both said radius control means and said pipe straightening means, said ramp means being to the remainder of said vessel in a manner allowing controllable inclination of said common support means, whereby the controllable traversing of said carriage means laterally across said ramp means enables level winding of said length of pipe at least during de-spooling thereof from said reel in pipelaying operation of said vessel.

32. The vessel of claim 31, wherein said pipelay stinger means is coupled to said carriage means for traversing movement conjointly therewith.

33. A curved pipelay stinger means characterised in that said curved pipelay stinger means is formed as a cantilever mounting an endless pipe conveyor means disposed along the length of said cantilever to present pipe-supporting contact points therealong which collectively define the curve of said curved pipelay stinger means; wherein said endless pipe conveyor means comprises an endless chain of mutually pivotally linked pipe supporting elements, said elements being slidably mounted on an upper surface of said pipelay stinger means, said endless chain being suspended beneath said upper surface to complete the path of said endless pipe conveyor means around said pipelay stinger means.

34. The pipelay stinger means of claim 33, wherein said pipe supporting elements are roller-mounted on said upper surface of said pipelay stinger means.

35. The pipelay stinger means of either one of claim 33, wherein each said pipe supporting element preferably comprises at least one pipe-cradling element disposed transverse the path of movement of said endless chain on said upper surface to cradle the length of pipe in the passage of said length of pipe over or through said pipelay stinger means.

36. The pipelay stinger means of claim 35, wherein each said pipe-cradling element is V-shaped or U-shaped.

* * * * *